(12) United States Patent
Papanastasiou et al.

(10) Patent No.: US 12,261,034 B1
(45) Date of Patent: Mar. 25, 2025

(54) ION ANALYSIS APPARATUS AND METHOD

(71) Applicant: BRUKER SWITZERLAND AG, Faellanden (CH)

(72) Inventors: Dimitris Papanastasiou, Faellanden (CH); Oliver Raether, Faellanden (CH); Niels Goedecke, Faellanden (CH)

(73) Assignee: BRUKER SWITZERLAND AG, Faellanden (CH)

( * ) Notice: Subject to any disclaimer, the term of this patent is extended or adjusted under 35 U.S.C. 154(b) by 0 days.

(21) Appl. No.: 18/799,273

(22) Filed: Aug. 9, 2024

(51) Int. Cl.
  *H01J 49/42* (2006.01)
  *G01N 27/622* (2021.01)
  *H01J 49/06* (2006.01)

(52) U.S. Cl.
  CPC ........ *H01J 49/4215* (2013.01); *G01N 27/622* (2013.01); *H01J 49/062* (2013.01); *H01J 49/4225* (2013.01)

(58) Field of Classification Search
  CPC .. H01J 49/4225; H01J 49/4215; H01J 49/062; G01N 27/622
  USPC ........................................................ 250/281
  See application file for complete search history.

(56) References Cited

U.S. PATENT DOCUMENTS

| | | | |
|---|---|---|---|
| 6,483,109 B1 | 11/2002 | Reinhold | |
| 6,545,268 B1* | 4/2003 | Verentchikov | H01J 49/40 250/281 |
| 2010/0108880 A1* | 5/2010 | Stoermer | H01J 49/0072 250/283 |
| 2023/0108254 A1 | 4/2023 | Remes | |

FOREIGN PATENT DOCUMENTS

EP    3 531 122 A1    8/2019

* cited by examiner

*Primary Examiner* — Kiet T Nguyen
(74) *Attorney, Agent, or Firm* — DP IP GROUP; Franco S. De Liguori

(57) ABSTRACT

An ion analysis apparatus includes an ionization source that generates a beam of ions and a trapping device that axially transfers the ions downstream. A first quadrupole mass filter receives the ions from the trapping device and transfers at least a first subset of the received ions. A segmented linear quadrupole ion trap performs a first processing step on the at least first subset of ions and transfers the processed ions. A second quadrupole mass filter receives the processed ions transferred from the segmented linear quadrupole ion trap and transfers at least a second subset of the processed ions. A collision cell receives and performs a second processing step on the at least second subset of processed ions. A mass analyzer performs mass analysis of the ions processed by the collision cell.

20 Claims, 67 Drawing Sheets

ION ANALYSIS APPARATUS AND METHOD

RELATED APPLICATIONS

This application claims priority of European Patent Application No. EP24154819.7, filed Jan. 30, 2024, and European Patent Application No. EP24175272.4, filed May 10, 2024, which are both hereby incorporated by reference in their entirety.

FIELD

The present invention relates to an ion spectrometer, for example a mass spectrometer.

BACKGROUND INFORMATION

Conventional mass spectrometers are typically configured for bottom-up workflows, for example for complex analytes such as biological molecules (also known as biomolecules), based on MS2 type of experiments whereby a single fragmentation step is performed on one or more precursor ions selected by a first mass analyzer, typically a quadrupole mass filter, while the mass-to-charge ratios of the product (also known as fragment) ions are measured by a second mass analyzer.

SUMMARY OF THE INVENTION

A first aspect provides an ion analysis apparatus, comprising:
  an ionization source configured to generate a beam of ions;
  a trapping device configured to receive the beam of ions and to axially transfer ions downstream;
  a first quadrupole mass filter configured to receive the ions transferred from the trapping device and to transfer at least a first subset of the received ions;
  a segmented linear quadrupole ion trap configured to receive the at least first subset of ions transferred from the first quadrupole mass filter, to perform a first processing step on the received at least first subset of ions and to transfer the processed ions;
  a second quadrupole mass filter configured to receive the processed ions transferred from the segmented linear quadrupole ion trap and to transfer at least a second subset of the processed ions;
  a collision cell configured to receive the at least second subset of ions transferred from the second quadrupole mass filter, to perform a second processing step on the received at least second subset of ions and to transfer the processed ions;
  a mass analyzer configured to receive the processed ions from the collision cell and to mass analyze the received processed ions.

A second aspect provides an ion analysis method, comprising:
  generating a beam of ions;
  receiving, by a trapping device, the beam of ions and axially transferring ions downstream; mass filtering, by a first quadrupole mass filter, at least a first subset of the transferred ions; performing, by a segmented linear quadrupole ion trap, a first processing step on the mass filtered at least first subset of ions;
  mass filtering, by a second quadrupole mass filter, at least a second subset of the processed at least first subset of ions;
  performing, by a collision cell, a second processing step on the mass filtered at least second subset of ions; and
  mass analyzing, by a mass analyzer, the processed at least second subset of ions.

DETAILED DESCRIPTION OF THE INVENTION

The first aspect provides an ion analysis apparatus, comprising:
  an ionization source configured to generate a beam of ions;
  a trapping device configured to receive the beam of ions and to axially transfer ions downstream;
  a first quadrupole mass filter configured to receive the ions transferred from the trapping device and to transfer at least a first subset of the received ions;
  a segmented linear quadrupole ion trap configured to receive the at least first subset of ions transferred from the first quadrupole mass filter, to perform a first processing step on the received at least first subset of ions and to transfer the processed ions;
  a second quadrupole mass filter configured to receive the processed ions transferred from the segmented linear quadrupole ion trap and to transfer at least a second subset of the processed ions;
  a collision cell configured to receive the at least second subset of ions transferred from the second quadrupole mass filter, to perform a second processing step on the received at least second subset of ions and to transfer the processed ions;
  a mass analyzer configured to receive the processed ions from the collision cell and to mass analyze the received processed ions.

Additionally and/or alternatively, the first aspect provides a mass spectrometer comprising:
  an ionization source;
  an trapping device;
  a first quadrupole mass filter;
  a segmented linear ion trap;
  a second quadrupole mass filter;
  a collision cell;
  a mass analyser; and
  a controller;
  wherein the ionization source, the trapping device, the first quadrupole mass filter, the segmented linear ion trap, the second quadrupole mass filter, the collision cell and the mass analyser are fluidically coupled in series; and
  wherein the controller is configured to control (for example, synchronously and/or simultaneously) processing of respective ions in the trapping device, the first quadrupole mass filter, the segmented linear ion trap, the second quadrupole mass filter and the collision cell.

A new design architecture of a mass spectrometer is desirable to increase the depth of analysis for different classes of molecules, to characterize their structure, topology, to maximize sequence coverage, determine binding domains in conjugates and to investigate molecular complexes and their stoichiometry. The analytical power to accomplish such in-depth characterization of biomolecular ions requires performing tandem mass spectrometry using multiple steps of mass selection, with each step followed by tailored means for activating and/or dissociating the selected ions. Such multi-stage multidimensional workflows are preferably performed at the highest scan rates possible to enable efficient coupling with front-end on-line separation methods, such as liquid chromatography (LC) or capillary electrophoresis (CE), used extensively for separating complex samples prior to mass analysis. In addition, high scan rates will also allow performing multiple scans to improve signal-to-noise levels of product ions through extended averaging, thus addressing limitations in analyzing highly congested mass spectra by increasing the confidence in annotations (i.e. identifications of the ions). Top-down approaches or the analysis of more complex analytes requires new instrumentation offering a plethora of ion processing options and the ability to schedule multifaceted data dependent acquisition (DDA) workflows to increase the depth of the analysis.

The new design architecture disclosed herein to enhance identification and accomplish new levels in ion molecular structure characterization and sequence coverage. The new geometry (i.e. design architecture) combines a series of ion optical elements including a high capacity trapping region (e.g. i.e. an ion trap or a first ion trap) configured with one or more adjacent ion activation-dissociation regions, a first quadrupole mass filter for mass selecting analyte ions, a linear ion trap (i.e. a second ion trap), preferably a segmented linear quadrupole ion trap, for activating and/or dissociating the mass selected ions by various means including electrons, photons, reagent ions, activated neutrals, collisions with buffer gas molecules and combinations thereof (MS2/MS3), a second quadrupole mass filter for selectively transmitting one or more of the activated analyte ions and/or dissociation products of the analyte ions, followed by an additional collision cell for dissociating ions (MS3/MS4) to form the final product ion species, and ultimately a mass analyzer, preferably a time-of-flight analyzer equipped with at least one reflectron unit, for ion detection of the final product ion species. A wide range of MSn (for example n=1, 2, 3 and/or 4) modes of operation or workflows can be supported with this new geometry, incorporating the standard MS2 experiments known in the art, for example by using either the segmented linear quadrupole ion trap alone or using the collision cell alone to fragment mass elected analyte ions and tailor the desired MS2 method of ion activation-dissociation to a specific class of analyte.

In one example mode of operation (referred to herein as a survey mode), both the segmented linear quadrupole ion trap and the collision cell are operated without applying activation or fragmentation to the analyte ions, while both the first and second quadrupole mass filters are operated in transmission (also known as pass-through) mode, providing a panoramic view of the analytes present in the sample (i.e. information on the analytes at the MS level). Such panoramic view of the analytes across a wide range of mass-to-charge ratios, and at any point in time during an LC/CE analysis, is termed a survey scan. Typically, survey scan information (i.e. information at the MS level) is used in an automated manner to drive a subsequent series of MS2 experiments (i.e. MS2 scans), where different analytes are mass selected and fragmented sequentially, based on the information at the MS level. In turn, this provides information at the MS2 level. For example, one or more analyte ions detected from the information at the MS level may be sequentially (i.e. in turn) mass selected, fragmented and their respective product ions detected, thereby providing information on the one or more analyte ions at the MS2 level. Survey scans can be performed with the trapping region (i.e. the first ion trap) operated in accumulation mode and by controlling the number of charges accumulated dynamically. Most preferably, survey scans are performed with the trapping region operated in pass-through mode where analyte ions are simply transmitted through the trapping region without being stored and accumulated, therefore, eliminating mass discrimination effects typically observed under high space charge loads, such as for complex samples.

In one example, in a first scan, precursor ions are fragmented in the collision cell, thereby generating MS2 product ions from the precursor ions, and a first mass spectrum of the MS2 product ions acquired by the mass analyser, whereby MS2 product ions may be identified from the first mass spectrum. In one example, in a second scan (for example successive to the first scan), precursor ions are fragmented in the activation-dissociation region, thereby generating MS2 product ions from the precursor ions, and one or more of the MS2 product ions identified from the first mass spectrum selected (i.e. mass filtered) using the first quadrupole mass filter for processing in the linear quadrupole ion trap, the second quadrupole mass filter and/or the collision cell, followed by mass analysis of the final product ions. In this way, information provided at the MS2 level from fragmentation relatively downstream in the first scan is used for fragmentation relatively upstream in the second scan, thereby enabling up to full processing of these product ions and thereby providing information at the MS3, MS4 and/or MS5 levels, in real time. Alternatively, and/or additionally, in the second scan, the precursor ions may be fragmented in the linear quadrupole ion trap and one or more of the MS2 product ions identified from the first mass spectrum selected (i.e. mass filtered) using the second quadrupole mass filter for processing in the collision cell, followed by mass analysis of the final product ions.

In one example mode of operation (referred to herein as a first MS3 mode), the new design architecture disclosed in the present invention further enables MS3 experiments to be performed at the highest scan rate possible. This is accomplished by processing information at the MS2 level and further using this information at the MS2 level to subsequently drive a series of MS3 and/or MS4 experiments (i.e. MS3 and/or MS4 scans) by selecting MS2 product ions in an automated manner. This is preferably accomplished in real time during the same LC/CE run whereby MS2 product ions are identified and subsequently mass selected for further processing at the MS3 and MS4 levels, based on the information at the MS2 level and information at the MS3 level, respectively. It should be understood that real time during the same LC/CE run means sufficiently fast for the same analytes of the same sample during the same LC/CE separation to be analyzed, such as within the same chromatographic peak, and hence the scan rate is chromatographically compatible. Conventional mass spectrometers do not enable such real time MS/MS2/MS3/MS4 workflows, which is enabled in the new design architecture by the arrangement of the ion optical elements thereof and their corresponding control. Alternatively, independent targeted MS3 LC/CE runs can be designed offline whereby the list of product ions is defined based on post-processing of the first DDA MS2 LC/CE data set.

In one example, the trapping device is configurable to operate in an ion transmission mode, for example wherein ions received therein are axial transferred therefrom, without trapping or accumulation (i.e. pass through). In one example, the trapping device is configurable to operate in an ion accumulation mode, for example wherein ions continue to be received and accumulate therein while accumulated ions remain retained therein. Axial transfer of the accumulated ions therefrom may be gated, for example as packets. In one example, the trapping device (i.e. the first ion trap) is configured with (i.e. comprises) an ion accumulation region that receives an incoming beam (continuous or pulsed) of ions, accumulates the incoming ions and axially transfers (also known as ejects) packets of the accumulated ions to the downstream ion optical elements sequentially i.e. the packets of the accumulated ions are transferred in sequence. Particularly, by transferring the packets of ions axially (relative to the accumulation direction), temporal sequencing of the packets is preserved, without mixing of the packet of ions to be transferred and the accumulating ions. In this way, incoming ions may be accumulated while a packet of previously accumulated ions is being transferred (i.e. accumulation and transfer of different ions is concurrent or simultaneous), without mixing of the ions. Further, such accumulation and transfer are compatible with ion mobility separation that may be optionally performed in the trapping device, as described below. In contrast, by transferring (also referred to as ejecting) the packets of ions orthogonally (relative to the accumulation direction), radial excitation of the ions is required and controlling radial ejection becomes particularly problematic, especially because the intensity of the incoming ion beam in a typical LC/MS experiment varies (often rapidly) over time and space charge secular frequency shifts occur across the entire m/z range. Incomplete radial ejection may result in mixing of the packet of ions to be transferred, which may result in non-optimal DDA selection of precursor ions and/or loss of information. Axial ejection does not require excitation of the ions and thus not susceptible to such intensity variation and/or mixing issues. Further, the axial space charge capacity is considerably greater than the radial capacity of RF trapping devices. Thus, axial ejection is superior to orthogonal ejection. Hence, axial ejection mitigates or eliminates issues of orthogonal ejection while having a greater space charge capacity, thereby at least partly enabling the real time MS/MS2/MS3/MS4 workflows described herein.

Segmented Linear Quadrupole Ion Trap

In one example, the segmented linear quadrupole ion trap is as described in WO 2017/134436 A1, the subject matter of which is incorporated by reference herein in entirety.

In one example, the segmented linear quadrupole ion trap comprises:
- at least two discrete trapping regions for processing ions;
- a RF electrical potential generator for producing two RF waveforms, and arranged to apply each to a pair of pole electrodes of the linear ion trap forming a RF trapping field component to trap ions radially;
- a multi-output DC electrical potential generator for producing multiple DC field components superimposed to the RF field component and distributed across the length of the linear ion trap to control ions axially;
- a control unit configured to switch the DC electrical potentials and corresponding DC field components collectively forming a first trapping region of the at least two discrete trapping regions that is populated with ions to alter ion potential energy from a first level to a second level, and to enable a first ion processing step in at least one of the first and second levels; and
- wherein the control unit is configured to switch DC electrical potential(s) at the second level at/of one side of the first trapping region to a value less than the minimum DC electrical potential of the first trapping region thereby permitting the release of ions confined therein for movement along the axis of the linear ion trap by acceleration away from the first trapping region.

In one example, the segmented linear quadrupole ion trap comprises:
- at least two discrete trapping regions for processing ions;
- a RF electrical potential generator for producing two RF waveforms and arranged to apply each to a pair of pole electrodes of the linear ion trap forming a RF trapping field component to confine ions radially;
- a multi-output DC electrical potential generator (103, 300) for producing multiple DC field components superimposed to the RF field component and distributed across the length of the linear ion trap to control ions axially; and
- a control unit configured to switch the DC electrical potentials and corresponding DC field components collectively forming a first trapping region of the at least two discrete trapping regions that is populated with ions axially confined therein to alter ion potential energy from a first ion potential energy level to a second ion potential energy level by simultaneously changing the DC electrical potentials of the first trapping region between a first DC electrical potential level and a second DC electrical potential level, and to enable a first ion processing step in at least one of the first and second ion potential energy levels.

In one example, the segmented linear quadrupole ion trap comprises:
- at least two discrete trapping regions for processing ions;
- a RF electrical potential generator for producing two RF waveforms, and arranged to apply each to a pair of pole electrodes of the linear ion trap forming a RF trapping field component to confine ions radially;
- a multi-output DC electrical potential generator or producing multiple DC field components superimposed to the RF field component and distributed across the length of the linear ion trap to control ions axially;
- a control unit configured to switch the DC electrical potentials and corresponding DC field components collectively forming a first trapping region of the at least two discrete trapping regions that is populated with ions axially confined therein to alter ion potential energy from a first ion potential energy level to a second ion potential energy level by simultaneously changing the DC electrical potentials of the first trapping region between a first DC electrical potential level and a second DC electrical potential level, and to enable a first ion processing step in at least one of the first and second ion potential energy levels; and
- wherein the control unit is configured to switch one or more of the DC electrical potentials at the second ion potential energy level at one side of the first trapping region to a value less than the minimum DC electrical potential of the first trapping region thereby permitting the release of ions confined therein for movement along the axis of the linear ion trap by acceleration away from the first trapping region.

In one example, the control unit is further configured to switch at least one DC field component of the multiple DC field components collectively forming the first trapping region between three different DC electrical potential levels.

In one example, the control unit is further configured to switch at least one DC field component of the multiple DC field components to transfer ions from the first trapping region to a second trapping region of the at least two discrete trapping regions to enable a second processing step.

In one example, the control unit is further configured to switch a plurality of the DC field components, from among the multiple DC field components, which collectively form a second trapping region of the at least two discrete trapping regions to alter the potential energy of ions stored therein from the first level to the second level.

In one example, the control unit is further configured to switch at least one DC field component of the multiple DC field components collectively forming the second trapping region between three different DC electrical potential levels.

In one example, the RF waveforms comprise substantially rectangular voltage pulse trains.

In one example, the segmented linear quadrupole ion trap comprises a pair of pole electrodes configured to receive a beam of particles that are injected through at least one of the two discrete trapping regions populated with ions at a first potential energy level In one example, said particles that are injected in the absence of a collision gas within said at least one of the two discrete trapping regions.

In one example, the control unit is further configured to switch a plurality of the multiple DC field components to release ions from the first trapping region toward a second trapping region with sufficient kinetic energy to perform collision induced dissociation.

In one example, the control unit is further configured to switch at least one of the DC field components to eject processed ions toward a mass analyzer for measuring mass-to-charge ratio.

In one example, the segmented linear quadrupole ion trap is configured with at least two trapping regions and to enable processing of ions in at least one of the two trapping regions.

In one example, one of the at least two trapping regions is configured to receive electrons from an external electron source to activate ions trapped therein. In one example, the ion analysis apparatus comprises a power supply configured to drive the segmented linear quadrupole ion trap using a pair of antiphase rectangular waveforms.

In one example, processing of a first packet of ions ejected from the trapping device, or a mass selected fraction of the first packet of ions (mass selected using the first quadrupole mass filter), is performed downstream of the trapping device in the segmented linear quadrupole ion trap and/or in the collision cell. In one example, in parallel to this processing (i.e. concurrently, simultaneously), the trapping device accumulates a second packet of ions, thus enhancing the duty cycle of the mass spectrometer.

MS2

In one example, the mass spectrometer is configured to activate and/or dissociate the incoming ions and/or the accumulated ions. For example, the trapping device may include and/or be coupled to an activation-dissociation region, for example operated at approximately the same pressure, whereby the ions may be activated and/or dissociated via collisions with buffer gas molecules and/or other means, for example UV photons. In one example, the activation-dissociation region, for activating-dissociating at least a fraction of the ions produced in the ionization source, is disposed before the trapping device (i.e. between the ionization source and the trapping device and hence upstream of the trapping device and upstream of the first quadrupole mass filter), within the trapping device, and/or after the trapping device (i.e. between the trapping device and the first quadrupole mass filter and hence downstream of the trapping device and upstream of the first quadrupole mass filter), thus enabling high scan rate multi-stage tandem MSn experiments by utilizing the downstream ion optical elements, specifically the first and second quadrupole mass filters, for mass selection of the activated and/or dissociated ions. In one example, the ion analysis apparatus comprises ion activation-dissociation region adjacent to the trapping device and upstream of the first quadrupole mass filter. In one preferred example, the activation-dissociation region is disposed before the trapping device or after the trapping device. If the trapping device comprises and/or is an IMS, activation-dissociation of the precursor ions in an activation-dissociation region upstream thereof enables ion mobility separation of the MS2 product ions generated from the precursor ions in the activation-dissociation region, whereby ion mobility separated MS2 product ions are transferred downstream to the first quadrupole mass filter. That is, the precursor ions are first activated-dissociated and the generated MS2 ions subsequently separated by ion mobility, whereby the MS2 product ions preserve the IMS separation of the MS2 product ions. If the trapping device comprises and/or is an IMS, activation-dissociation of the precursor ions in an activation-dissociation region downstream thereof enables activation-dissociation of the ion mobility separated precursor ions, thereby generating MS2 product ions from the ion mobility separated precursor ions, whereby MS2 product ions of the ion mobility separated precursor ions are transferred downstream to the first quadrupole mass filter. That is, the precursor ions are first separated by ion mobility and these ion mobility separated ions subsequently activated-dissociated, whereby the MS2 product ions preserve the IMS separation of the precursor ions. In one example, the activation-dissociation region is not disposed within the trapping device.

MS3

By enabling ion activation and/or dissociation before or after the trapping device configured with an ion accumulation region, the new design architecture enables subsequent mass selection of product ions at the MS2 level using the first quadrupole mass filter, MS3 activation-dissociation of at least a fraction of the MS2 product ions in the downstream segmented linear quadrupole ion trap, followed by mass selection of the MS3 product ions using the second quadrupole mass filter for selectively transmitting at least a fraction of these MS3 product ions (i.e. fragments and/or activated ions), and ultimately MS4 collision induced dissociation (CID) performed in the collision cell, to form the final product species, which are subsequently mass analyzed, preferably by a time-of-flight mass analyzer. Different modes of operation or workflows can be supported with this new design architecture, for example, MS2 experiments including a single step of ion activation-dissociation are facilitated using (a) the activation-dissociation region coupled to the trapping device configured with an accumulation region alone, (b) the segmented linear quadrupole ion trap alone, or (c) using the collision cell alone. Different sequential and/or alternating MS-survey scans and MS2 scans can therefore be performed based on any of the three possible activation-dissociation regions available in the new design architecture, thus enabling advanced workflows to be developed, which are optimized for the analysis of different classes of complex analytes.

Similarly, unique workflows incorporating MS3 scans can be implemented by combining any two of the three activation-dissociation regions available, namely, at least one of the ion activation-dissociation regions adjacent to the trapping device, the segmented linear quadrupole ion trap and the collision cell.

In one example mode of operation (referred to herein as a second MS3 mode), MS2 is performed using one of the activation-dissociation regions coupled to the trapping device, while at least a fraction of mass selected product ions using the first quadrupole mass filter is subjected to MS3 activation-dissociation in the segmented linear quadrupole ion trap using electrons, photons or other means of dissociation.

In one example mode of operation (referred to herein as a third MS3 mode), MS2 is performed in the segmented linear quadrupole ion trap on at least a fraction of the analyte ions selected using the first quadrupole mass filter, while the MS3 mass selection and MS3 CID steps are performed using the second quadrupole mass filter and the second collision cell, respectively. Alternative combinations are possible, for example by performing MS2 using one of the activation-dissociation region adjacent to the trapping device followed by mass selection and MS3 collisional activation using the collision cell. Complex analytical methods or DDA MSn experiments can therefore be designed that incorporate different ion activation-dissociation modes in successive and/or subsequent scans.

The family of scans comprising the DDA method (i.e. a scan cycle or a cycle) may include one or more sequential MS-survey scans to drive a series of MS2 scans, followed by a series of MS3 scans. In any of the modes of operation, analyte ions, intermediate and final product ions are all mass analyzed by the mass analyzer, preferably a time-of-flight mass analyzer.

MS4

In one example mode of operation (referred to herein as a first MS4 mode), MS4 experiments can be performed at high repetition rates. A survey scan requires that both the segmented linear quadrupole ion trap and the collision cell are operated without causing activation or fragmentation of the analyte ions, while both the first and the second quadrupole mass filters are operated in transmission or pass-through mode, providing the necessary list of analyte ions for driving the subsequent MS2, MS3 and/or MS4 experiments. Such MS-survey scan information is generated first and followed by a series of MSn scans, preferably using a time-of-flight mass analyzer disposed downstream of the collision cell. To determine the mass-to-charge ratio of the fragment ions subjected to MS3 analysis, the MS-survey scan is followed by one or more MS2 scans whereby the m/z ratio of the MS2 fragments is measured using a time-of-flight mass analyzer. Preferably, the MS2 scan is performed using the activation-dissociation region of the trapping device and this information at the MS2 level is further utilized to define the isolation window of the first quadrupole mass filter selecting ions for the MS3 fragmentation stage, which is typically performed in the segmented linear quadrupole ion trap. In one example, the MS3 fragmentation stage is performed by reacting mass selected MS2 fragment ions with externally injected low-energy electrons, for example in the segmented linear quadrupole ion trap. In one example, larger proteins or protein fragments will undergo charge reduction upon electron capture to form radical species without producing an information rich MS3 fragmentation mass spectrum. Enhanced information can be accomplished in an MS4 experiment performed by using the second quadrupole mass filter to select at least one charge state from the charge reduced ion population, which can be further collisionally activated and/or dissociated in the collision cell. In this example where electrons are used for performing the MS3 fragmentation step, the mass window selected to drive the second quadrupole mass filter can be calculated by the mass of the MS2 fragment subjected to reactions with electrons and undergoing charge reduction. The same applies in electron induced dissociation (EID) where the charge state of an analyte of fragment increases via electron detachment (electron ionization). Different MSn workflows can be supported by the new instrument architecture where one or more sequential MS, MS2, MS3 and MS4 scans forming a cycle are combined and applied sequentially for the analysis of analyte ions, specifically to enhance the depth of the analysis for characterizing structurally complex molecules.

Ion Mobility Separation

In one example, the trapping device comprises an ion mobility separation device including an ion mobility separation region for separating ions according to their ion mobilities, for example at a pressure level above 0.1 mbar (0.01 kPa). In one example, the trapping device comprises and/or is a trapped ion mobility spectrometer comprising: an ion storage region for storing and/or accumulating the beam of ions; and an ion mobility analyzer region for separating and transferring, optionally selectively transferring, separated ions therefrom. In one preferred example, the trapping device is a trapped ion mobility spectrometer configured with a first trapping region for accumulating ions and a second trapping region for receiving the accumulated ions, separating the received ions and releasing the separated ions sequentially according to their low-field (i.e. ion) mobilities. In one example, the ion mobility separation device comprises an ion mobility gate to enable mobility-selection of the ion mobility separated ions that are to be transferred downstream to the first quadrupole mass filter. In this way, a fraction of the ion mobility separated ions may be selectively transferred downstream to the first quadrupole mass filter.

Scans

In one example, the ion analysis apparatus is configured to perform a first scan including performing one or more first processing steps in the segmented linear quadrupole ion trap and/or one or more second processing steps in the collision cell, performing one or more mass selection steps in the first and/or second quadrupole mass filters and optionally, performing one or more ion mobility selection steps in the trapping device, wherein the trapping device comprises and/or is a trapped ion mobility spectrometer.

In one example, the ion analysis apparatus is configured to perform a second scan including performing one or more first processing steps in the segmented linear quadrupole ion trap and/or one or more second processing steps in the collision cell, performing one or more mass selection steps in the first and/or second quadrupole mass filters and optionally, performing one or more ion mobility selection steps in the trapping device, wherein one or more of the first processing steps, the second processing steps, the mass selection steps and/or the ion mobility selection steps of the first scan and of the second scan are mutually different.

Mass Analyzer

In one example, the mass analyzer comprises and/or is an orthogonal time-of-flight mass analyzer including at least one reflectron unit.

MSn Workflow

A preferred MSn workflow, including an ion mobility separation step, includes the steps of:
  (a) collisional activation for unfolding, desolvating or dissociating ions via collisions or photons in one of the ion activation-dissociation regions adjacent to the trapped ion mobility spectrometer and upstream of the first quadrupole mass filter;
  (b) separation and selection of activated product ions or MS2 fragments by gating mobility separated ions using the ion mobility gate and/or by selecting the m/z ratio of product ion or fragments using the first quadrupole mass filter;

(c) MS3 activation-dissociation in the segmented linear quadrupole ion trap of at least a fraction of the product ions or MS2 fragments using electrons, photons or other means of ion activation-dissociation known in the art;

(d) MS3 selection of the activated ions (charge-reduced or ionized species) or MS3 fragments according to their m/z ratios using the second quadrupole mass filter;

(e) MS4 collisional activation-dissociation of the selected species; and (f) mass analysis of the final product ions using a time-of-flight mass analyzer.

Any of one or more of the above steps can be omitted to reduce the MS4 DDA workflow to an MS3 or to an MS2 experiment.

Most preferably, an experimental cycle includes an MS-survey scan, followed by one or more consecutive MS2 scans, which are subsequently followed by one or multiple MS3 and MS4 scans applied sequentially. Once such a cycle incorporating MS, MS2, MS3 and MS4 scans is completed, the MSn DDA method cycle is re-initiated by selecting a new precursor or analyte ion or by selecting a new fragment ion generated at the MS2 level, or by selecting a new fragment ion generated at the MS3 level while keeping the same MS and MS2 steps. In such DDA workflows, the mobility/mass-to-charge selection processes are performed using the ion mobility gate and/or the first and/or the second quadrupole mass filter.

Consecutive steps of mass selection and ion activation/dissociation allow for characterizing targeted regions, interaction interfaces or domains of macromolecular ions in greater depth in terms of sequence and with greater detail in terms of structure, which would otherwise be inaccessible using the standard MS2 workflows. Moreover, the new instrument architecture allows for performing MSn (for example n=1, 2, 3 and/or 4) experiments at the maximum possible scan rate, which can exceed 10 Hz, improving signal-to-noise through averaging whilst also accommodating front-end online separation methods.

Preferably, the MSn workflows disclosed here are developed in the context for data dependent acquisition (DDA) analytical workflows. DDA methods include processing cycles, with each cycle combining a survey scan followed a consecutive number of MS2 scans. Advanced DDA methods can be developed with the new design architecture, where a survey scan is used to generate information for driving the MS2 scans, while information generated from the MS2 scans can be further processed in real time to drive the MS3 and MS4 scans.

The new design architecture enables performing an MS2 CID step in the collision cell as part of a series of MS2 scans, and then allows reproducing the same set of CID fragment ions by applying a CID step on the same analyte population in a different region of the geometry, for example in the collisional activation regions adjacent to the trapping device, as part of a series of MS3 scans. This approach allows using all ion optical elements downstream of the trapping device to support more involved MS3 and MS4 scans, while maintaining the highest-speed MS2 CID scan rate possible executed in the collision cell.

In one example, the second quadrupole mass filter is replaced by an RF-only ion guide, wherein the RF ion guide is one of a quadrupole, hexapole, octupole or a higher-order field RF ion guide, with mass selection steps at the MS3 or higher levels enabled by the segmented linear quadrupole ion trap.

Controller

It should be understood that the ion analysis apparatus comprises a controller configured to control, for example synchronously and/or simultaneously (i.e. in parallel, concurrently), the ionization source, the ion trap, the first quadrupole mass filter, the segmented linear ion trap, the second quadrupole mass filter and/or the collision cell, for example to control processing of respective ions therein. In one example, the controller comprises a processor and a memory and optionally, control electronics. It should be understood that the ion analysis apparatus comprises one or more power supplies, electrically coupled to the ionization source, the ion trap, the first quadrupole mass filter, the segmented linear ion trap, the second quadrupole mass filter and/or the collision cell, for example wherein the controller is configured to control the one or more power supplies to control processing of respective ions.

Transferring Ions

In one example, the first quadrupole mass filter, the segmented linear quadrupole ion trap, the second quadrupole mass filter and/or the collision cell are configured to transfer the ions, for example for a survey scan.

In one example, the first quadrupole mass filter is configured to receive the ions transferred from the trapping device and to transfer the received ions, for example without mass filtering or substantially without mass filtering. In this way, the first quadrupole mass filter behaves as an ion guide, for transfer of the ions.

In one example, the segmented linear quadrupole ion trap is configured to receive the ions transferred from the first quadrupole mass filter and to transfer the received ions, for example without performing the first processing step. In this way, the segmented linear quadrupole ion trap behaves as an ion guide, for transfer of the ions.

In one example, the second quadrupole mass filter is configured to receive the ions transferred from the trapping device and to transfer the received ions, for example without mass filtering or substantially without mass filtering. In this way, the second quadrupole mass filter behaves as an ion guide, for transfer of the ions.

In one example, the collision cell is configured to receive the ions transferred from the first quadrupole mass filter and to transfer the received ions, for example by modulating transfer of the received ions. For example, if the collision cell is coupled to a time-of-flight (TOF) mass analyzer, signals may be applied to the collision cell to modulate or bunch the ions into packets and to synchronize the arrival time of these packets with the TOF extraction pulse, for example to enhance the duty cycle of the TOF analyzer. In this way, the collision cell behaves as an ion guide, for transfer of the ions.

In one example, the first quadrupole mass filter, the segmented linear quadrupole ion trap, the second quadrupole mass filter and/or the collision cell are configured to transfer ions downstream. In one example, the first quadrupole mass filter, the segmented linear quadrupole ion trap, the second quadrupole mass filter and/or the collision cell are configured to transfer ions upstream.

Example Scan Modes

Tables 1 to 4 summarise example scan modes for exemplary embodiments. Preferred scan modes in bold. Accumulation or IMS is preferred. Transfer indicates that the ions are transferred by that ion optical element, without additional processing. For the linear quadrupole ion trap, MSn+1 ion activation and/or dissociation of MSn (e.g. n=1 or n=2 or n=3) product ions, generating MSn+1 product ions from MSn product ions and mass selection of MSn+1 product ions and MSn+2 ion activation and/or dissociation of the mass selected MSn+1 product ions requires two steps of ion activation-dissociation and may require an accumulation step in the linear quadrupole ion trap). Accumulation and IMS may be combined, IMS used alone or accumulation used alone.

Storing-Trapping and/or Accumulating Ions in the Collision Cell

As described below in more detail, the collision cell may be used not only to collisionally activate, thermalize and/or modulate transfer of ions but additionally and/or alternatively, to store-trap and/or accumulate ions. In this way, the relatively larger space charge capacity of the collision cell may be used to store-trap and/or accumulate ions. Additionally and/or alternatively, the collision cell may be used to store-trap and/or accumulate mass filtered ions, for example mass filtered by the first quadrupole mass filter and/or the second quadrupole mass filter, preferably by the first quadrupole mass filter.

In one example, the ion analysis apparatus is configured to repeatedly perform a first processing step on the ions in the segmented linear quadrupole ion trap and to repeatedly perform a second processing step on the ions in the collision cell, by performing a first processing step on the ions in the segmented linear quadrupole ion trap, storing-trapping and/or accumulating the processed ions (optionally, filtered by the second quadrupole mass filter) in the collision cell, transferring the stored-trapped and/or accumulated ions upstream (optionally, filtered by the second quadrupole mass filter) back to the segmented linear quadrupole ion trap, performing another first processing step on the ions in the segmented linear quadrupole ion trap and transferring these processed ions downstream (optionally, filtered by the second quadrupole mass filter) back to the collision cell for another second processing step. The first processing step and storing-trapping and/or accumulating may be repeated within an experimental cycle. In this way, different first processing steps may be performed on the ions and/or a sufficiently large number of ions may be stored-trapped and/or accumulated for a particular first processing step, for example another or a final first processing step, before transferring the processed ions to the mass analyzer via the second quadrupole mass filter and the collision cell.

The collision cell is configured to receive the at least second subset of ions transferred from the second quadrupole mass filter, perform the second processing step on the received at least second subset of ions and to transfer the processed ions, for example downstream or upstream. In one example, the second subset of ions is or is substantially the first subset of ions. For example, the collision cell may thus store-trap and/or accumulate the first subset of ions, which are filtered by the first quadrupole mass filter and subsequently, transferred to the collision cell via the segmented linear quadrupole ion trap and the second quadrupole mass filter.

In one example, the second processing step includes collisionally activating, thermalizing, storing-trapping, accumulating and/or modulating transfer of the received at least second subset of ions. That is, the collision cell may be used not only to collisionally activate, thermalize and/or modulate transfer of ions but additionally and/or alternatively, to store-trap and/or accumulate ions.

In one example, the collision cell is configured to store-trap and/or accumulate the at least second subset of ions transferred from the second quadrupole mass filter. For example, the processed ions transferred from the segmented linear quadrupole ion trap may be filtered by the second quadrupole mass filter and subsequently, stored-trapped and/or accumulated in the collision cell.

In one example, the collision cell is configured to store-trap and/or accumulate a plurality of the at least second subsets of ions transferred from the second quadrupole mass filter. For example, processed ions transferred from the segmented linear quadrupole ion trap may be filtered by the second quadrupole mass filter and subsequently, stored-trapped and/or accumulated in the collision cell, repeatedly during (i.e. within) an experimental cycle. In this way, a relatively larger number of ions may be stored-trapped and/or accumulated in the collision cell during an experimental cycle.

In one example, the collision cell is configured to transfer the processed ions downstream, for example to the mass analyzer.

In one example, the collision cell is configured to transfer the processed ions upstream, for example via the second quadrupole mass filter to the segmented linear quadrupole ion trap.

In one example, the collision cell is configured to transfer the processed ions upstream, for example via the second quadrupole mass filter to the segmented linear quadrupole ion trap, and subsequently, to transfer the further processed ions downstream, for example to the mass analyzer, during (i.e. within) an experimental cycle.

In one example, the collision cell configured to receive the at least second subset of ions transferred from the second quadrupole mass filter, to perform a second processing step on the received at least second subset of ions and to transfer the processed ions upstream.

In one example, the second quadrupole mass filter is configured to receive the processed ions transferred from the collision cell and to transfer at least a third subset of the processed ions upstream.

In one example, the segmented linear quadrupole ion trap is configured to receive the at least third subset of ions transferred from the second quadrupole mass filter, to perform a first processing step on the received at least third subset of ions and to transfer the processed ions downstream.

In one example, the segmented linear quadrupole ion trap and/or the collision cell are configured to repeatedly respectively perform the first processing step and the second processing step on ions transferred therebetween.

In one example, the ion analysis apparatus comprises:
the ionization source configured to generate the beam of ions;
the trapping device configured to receive the beam of ions and to axially transfer ions downstream;
the first quadrupole mass filter configured to receive the ions transferred from the trapping device and to transfer at least the first subset of the received ions;
the segmented linear quadrupole ion trap configured to receive the at least first subset of ions transferred from the first quadrupole mass filter, to perform the first processing step, for example a first first processing step, on the received at least first subset of ions and to transfer the processed ions;
the second quadrupole mass filter configured to receive the processed ions transferred from the segmented linear quadrupole ion trap and to transfer at least the second subset of the processed ions;
the collision cell configured to receive the at least second subset of ions transferred from the second quadrupole mass filter, to perform the second processing step on the received at least second subset of ions and to transfer the processed ions; and the mass analyzer configured to receive the processed ions from the collision cell and to mass analyze the received processed ions;

wherein the second processing step includes collisionally activating, thermalizing, storing-trapping, accumulating and/or modulating transfer of the received at least second subset of ions;

wherein the collision cell is configured to store-trap and/or accumulate the at least second subset of ions transferred from the second quadrupole mass filter and/or the processed ions and to transfer the stored-trapped and/or accumulated ions upstream to the second quadrupole mass filter;

wherein the second quadrupole mass filter is configured to receive the stored-trapped and/or accumulated ions transferred from the collision cell and to transfer at least a third subset of the stored-trapped and/or accumulated ions upstream to the segmented linear quadrupole ion trap; and wherein the segmented linear quadrupole ion trap is configured to receive the at least third subset of ions transferred from the second quadrupole mass filter, to perform a first processing step (for example, a second first processing step) on the received at least third subset of ions and to transfer the processed ions downstream to the second quadrupole mass filter;

optionally, wherein the segmented linear quadrupole ion trap and/or the collision cell are configured to repeatedly respectively perform the first processing step and the second processing step on ions transferred therebetween, for example including performing another or a final first processing step in the segmented linear quadrupole ion trap and transferring these processed ions to the mass analyzer via the second quadrupole mass filter and the collision cell, whereby a sufficiently large number of processed ions may be stored-trapped and/or accumulated in the collision cell before the another or final first processing step is performed in the segmented linear quadrupole ion trap on these stored-trapped and/or accumulated processed ions.

In one example, the ion analysis apparatus comprises:

the ionization source configured to generate the beam of ions;

the trapping device configured to receive the beam of ions and to axially transfer ions downstream;

the first quadrupole mass filter configured to receive the ions transferred from the trapping device and to transfer at least the first subset of the received ions;

the segmented linear quadrupole ion trap configured to receive the at least first subset of ions transferred from the first quadrupole mass filter and to transfer the at least first subset of ions;

the second quadrupole mass filter configured to receive the at least first subset of ions transferred from the segmented linear quadrupole ion trap and to transfer the first subset of the ions;

the collision cell configured to receive the first subset of ions transferred from the second quadrupole mass filter, to perform a first second processing step on the received first subset of ions and to transfer the processed ions; and wherein the collision cell is configured to perform at least one additional second processing step on another subset of ions and to transfer the processed ions;

the mass analyzer configured to receive the processed ions from the collision cell and to mass analyze the received processed ions;

wherein the second processing step, for example the first second processing step, includes collisionally activating, thermalizing, storing-trapping and/or accumulating of the received at least first subset of ions;

wherein the collision cell is configured to store-trap and/or accumulate the at least first subset of ions transferred from the second quadrupole mass filter and/or processed ions and to transfer the stored-trapped and/or accumulated and/or processed ions upstream to the second quadrupole mass filter;

wherein the second quadrupole mass filter is configured to receive the stored-trapped and/or accumulated and/or processed ions transferred from the collision cell and to transfer at least a second subset of the stored-trapped and/or accumulated and/or processed ions upstream to the segmented linear quadrupole ion trap; and wherein the segmented linear quadrupole ion trap is configured to receive the at least second subset of ions transferred from the second quadrupole mass filter, to perform a first processing step, for example a first first processing step, on the received at least second subset of ions and to transfer the processed ions back downstream to the second quadrupole mass filter;

wherein the second quadrupole mass filter is configured to receive the second subset of ions and to transfer at least a third subset of the ions to the collision cell; and wherein the collision cell is configured to store-trap and/or accumulate the at least third subset of ions transferred from the second quadrupole mass filter and to perform a third processing step;

wherein the third processing step includes collisionally activating, thermalizing, storing-trapping, accumulating and/or modulating transfer of the received at least third subset of ions.

In one example, accumulation of mass selected ions using the quadrupole mass filter is performed in the collision cell. In one example, the mass selected ions are stored in the collision cell while the accumulation period is controlled by deflecting the incoming beam of ions at specified time intervals, which are calculated in real time based on the space charge capacity of downstream ion optical elements, for example the collision cell, and in relation to the ion intensity, or the ion current of the mass selected ions measured in the MS-survey scan. In one example, controlling the accumulation period allows to optimally load the collision cell, receiving mass selected analyte ions originally entrained in the continuous beam of ions. In one example, the accumulated mass selected ions are thermalized in the collision cell and are transferred back to the segmented linear ion trap for MS2 activation-dissociation or for MSn experiments. In one example, transferring ions upstream is made possible by switching the direction of the axial DC gradient established across the collision cell. In one example, MS2 product ions generated in the segmented linear ion trap are subsequently transferred back to the collision cell and ultimately ejected toward the TOF mass analyzer for measuring mass-to-charge.

Accumulating mass selected ions in the collision cell instead of the trapping device may be preferred, for example, when the space charge capacity of the collision cell is greater than the capacity of the trapping device. The signal-to-noise ratio of MS and MS2 mass spectra originating from larger populations of ions is higher, leading to enhanced sensitivity and to an increased number of fragment ion identifications. Accumulation is made possible by the collision gas present in the collision cell, which is typically operated under static pressure conditions at approximately 0.01 mbar.

An advantage of accumulating ions in the collision cell as opposed to accumulating ions in the trapping device is that in the former case the accumulated population will comprise mass selected ions only that can solely occupy the charge capacity of the collision cell, while in the latter case the capacity of the trapping device will accommodate a wide range of ions produced in the ionization source.

Accumulating mass selected ions in the collision cell instead of the segmented linear ion trap may be preferred, for example, if pressure in the segmented linear ion trap is controlled dynamically using one or more gas pulse valves and when the accumulation period exceeds the residence time of the gas in the trapping volume of the segmented linear ion trap. Extended accumulation periods to improve signal-to-noise and detect low abundance ions is more conveniently performed in a device operated under static pressure conditions.

Different types of MS activation-dissociation experiments can be performed in this exemplary workflow. For example, the accumulated mass selected ions can be transferred back through the second quadrupole mass filter to the segmented linear ion trap for electron- or photon-based fragmentation. Alternatively, mass selected ions can be ejected from the collision cell back to the segmented linear ion trap with sufficient kinetic energy to undergo collision induced dissociation. In addition, mass selection using the second quadrupole mass filter is available for fast MS3 or higher MSn workflows when ions are transferred back from the collision cell to the segmented linear ion trap.

Method

The second aspect provides an ion analysis method, comprising:
- generating a beam of ions;
- receiving, by a trapping device, the beam of ions and axially transferring ions downstream;
- mass filtering, by a first quadrupole mass filter, at least a first subset of the transferred ions;
- performing, by a segmented linear quadrupole ion trap, a first processing step on the mass filtered at least first subset of ions;
- mass filtering, by a second quadrupole mass filter, at least a second subset of the processed at least first subset of ions;
- performing, by a collision cell, a second processing step on the mass filtered at least second subset of ions; and
- mass analyzing, by a mass analyzer, the processed at least second subset of ions.

The second aspect may include any step as described with respect to the first aspect.

Additionally and/or alternatively, the second aspect provides an ion analysis method, comprising:
- generating a beam of ions;
- receiving the beam of ions and axially transferring ions downstream;
- mass filtering at least a first subset of the transferred ions;
- performing a first processing step on the mass filtered at least first subset of ions;
- mass filtering at least a second subset of the processed at least first subset of ions;
- performing a second processing step on the mass filtered at least second subset of ions; and
- mass analyzing the processed at least second subset of ions.

Additionally and/or alternatively, the second aspect provides an ion analysis method, comprising:
- generating a beam of ions;
- receiving the beam of ions and axially transferring ions downstream;
- mass filtering the transferred ions;
- performing a first processing step on the mass filtered ions;
- mass filtering the processed ions;
- performing a second processing step on the mass filtered ions; and
- mass analyzing the processed ions.

Definitions

Processing of ions in the segmented linear quadrupole ion trap may include radially confining ions (for example, using a pair of antiphase RF waveforms applied to the poles of the quadrupole) and optionally, axially manipulating ions (for example using DC potentials forming axial gradients for transferring ions between different segments and/or for transmitting the ions through DC and/or RF potentials forming barriers for trapping and/or ejecting ions).

Processing of ions in the segmented linear quadrupole ion trap may additionally and/or alternatively include activating and/or dissociating ions by various means including collisions with buffer gas molecules, reactions with photons, variable energy electrons, reactive neutrals and/or reagent ions of like- or opposite-polarity.

Processing of ions in the segmented linear quadrupole ion trap may additionally involve MSn multi-stage tandem ion activation-dissociation with different methods of ion activation-dissociation methods applied in every stage of the MSn experiment preferably in different segments of the linear ion trap. Combinations of ion activation-dissociation methods in each stage of MSn experiment are also enabled by the controller.

In one example, the first processing step includes: storing-trapping, accumulating, isolating and/or activating-dissociating the received at least first subset of ions; preferably storing-trapping, isolating and activating-dissociating the received at least first subset of ions; more preferably storing-trapping and activating-dissociating the received at least first subset of ions.

Processing of ions in the collision cell may include collisional cooling or thermalization, transferring thermalized ions to downstream optics (i.e. upstream) and/or fragmentation via energetic collisions with buffer gas molecules. Additionally and/or alternatively, processing of ions in the collision cell may include storing-trapping and/or accumulating ions (including collisional cooled or thermalized ions and/or fragmented ions). Optionally, the stored-trapped and/or accumulated ions are transferred upstream, for example to the segmented linear quadrupole ion trap via the second quadrupole filter. If the collision cell is coupled to a time-of-flight (TOF) mass analyzer, processing may also involve applying additional signals to modulate or bunch the processed ions into packets and to synchronize the arrival time of these packets with the TOF extraction pulse to enhance the duty cycle of the TOF analyzer.

Processing of ions in the collision call may additionally and/or alternatively include the application of at least one additional RF signal and further modulating this signal to form an axial barrier, to selectively eject ions from the collision cell whilst all ions across a wide range of massto-charge ratios exhibit similar flight times from the collision cell to the extraction region of the TOF analyzer.

In one example, the second processing step includes collisionally activating, thermalizing, storing-trapping, accumulating and/or modulating transfer of the received at least second subset of ions.

Ion activation may include reacting ions with electrons to form radical ions in lower charge states due to electron capture or in higher charge states due to electron detachment (ionization), which may further lead to dissociation of the radical ions forming fragments, with or without supplemental collisional or IR activation, collisionally activating ions to increase their internal energy at levels below or above the dissociation threshold, using IR activation to increase the internal energy of the ions at levels below or above their dissociation threshold, collisionally activating ions to induce unfolding that may lead to conformational annealing, and also reacting ions with UV photons to form product/fragment ions.

A single scan involves receiving ions from the ionization source in the trapping device, using the trapping device either in pass-through mode or in accumulation mode and/or in ion mobility separation mode, transferring at least a fraction of the ions through the first quadrupole mass filter, processing the ions in the segmented linear quadrupole ion trap, transferring at least a fraction of ions through the second quadrupole mass filter, processing the ions in the collision cell, and acquiring a mass spectrum. Multiple mass spectra may be acquired during a single scan, especially when a high-speed time-of-flight (TOF) mass analyzer is used for ion detection since the duration of each scan can be several ms long and a TOF mass spectrum is acquired in the microsecond time scale. Individual scans are performed sequentially and may overlap in time since ions can be processed simultaneously in the different ion optical elements of the new design architecture. Such parallel processing of the ions in highly desirable to achieve the highest duty cycle possible. A single scan may comprise a survey scan, providing accurate ion intensity and mass-to-charge ratio information over a wide range of analyte present in a sample. A single scan may additionally and/or alterntatively comprise an MSn ion processing workflow where n=2, 3 and 4, providing product ion information that can be linked back to specific analytes detected in MS-survey scans. A single cycle may comprise at least one survey scan, followed by one or more MS2 scans. A single cycle may also comprise one or more MS3 scans, following the one or more MS2 scans, which are based on MS-survey scan information. A single cycle may also comprise one or more MS4 scans following the one or more MS3 scans, which are subsequently linked back to the one or more MS2 and MS-survey scans. The ion activation-dissociation region adjacent to the trapping device includes regions upstream or downstream of the trapping device, including DC and/or RF electrodes and additional RF ion guides operable at a higher pressure and disposed upstream and/or operable at a lower pressure and disposed downstream of the trapping device. In one example, the ion analysis apparatus comprises one or more RF ion guides between the trapping device and the first quadrupole mass filter, and/or between the first quadrupole mass filter and the segmented linear ion trap.

Instrument duty cycle measures the percentage of the ion beam efficiently utilized by the mass spectrometer and is defined as the ratio of the efficiently utilized fraction of the ion signal detected by the mass spectrometer and used for generating m/z information enabling the identification and characterization of molecular ions relative to the total ion signal produced in the ionization source. The duty cycle of an ion optical element measures the percentage of the ion beam efficiently utilized by the io optical element and is defined as the ratio of the efficiently utilized fraction of the ion signal processed by the ion optical element. For example, duty cycle can also be estimated based on the timing characteristics of a switched DC lens deflecting the incoming beam of ions in and out of the trapping device, and for example, for 20 ms deflection and 80 ms accumulation time, the duty cycle of the trapping device becomes 80%.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1:
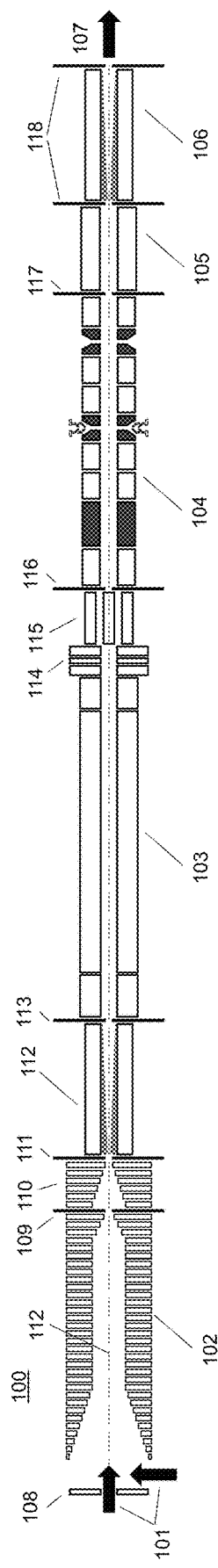
FIG. 1 schematically depicts a mass spectrometer according to an exemplary embodiment.

FIG. 1 shows a mass spectrometer 100 according to an exemplary embodiment.

The ion analysis apparatus 100 comprises:
an ionization source 101 configured to generate a beam of ions;
a trapping device 102 configured to receive the beam of ions and to axially transfer ions downstream;
a first quadrupole mass filter 103 configured to receive the ions transferred from the trapping device 102 and to transfer at least a first subset of the received ions;
a segmented linear quadrupole ion trap 104 configured to receive the at least first subset of ions transferred from the first quadrupole mass filter 103, to perform a first processing step on the received at least first subset of ions and to transfer the processed ions;
a second quadrupole mass filter 105 configured to receive the processed ions transferred from the segmented linear quadrupole ion trap 104 and to transfer at least a second subset of the processed ions;
a collision cell 106 configured to receive the at least second subset of ions transferred from the second quadrupole mass filter 105, to perform a second processing step on the received at least second subset of ions and to transfer the processed ions;
a mass analyzer 107 configured to receive the processed ions from the collision cell and to mass analyze the received processed ions.

A beam of ions 101 is introduced axially or perpendicularly to the ion optical axis of the trapping device 102.

Preferably, the trapping device 102 comprises a set of ring electrodes supplied with a pair of antiphase sinusoidal RF waveforms forming alternating dipole fields to confine ions radially. Radial trapping can also be established using quadrupole fields formed by a quadrupole electrode structure to increase radial compression of the ion beam. Higher order RF multipoles are yet another alternative, increasing the space charge capacity of the trapping device. Combining a higher-order RF field at the entrance-end of the device and across the trapping region accumulating ions with a lower-order RF field at the exit-end to enhance transmission through the differential aperture 109 is highly desirable. The number of charges 101 that flow into the trapping device 102 can be controlled by switching the DC potential applied to electrode 108 between a transmission level and a deflection level. A population of charges across a wide range of mass-to-charge ratios can be accumulated and stored in the trapping device 102, confined radially by the RF field and axially by appropriate DC potentials applied to the electrode stack. The injection period whereby ions are allowed to flow into the trapping device and accumulate can be adjusted by controlling the duration of a DC potential applied to electrode 108 to match the capacity of the trapping device 102 and to avoid ion losses and uncontrolled fragmentation typically observed when confining a high space charge load. Preferably, the operating pressure of the trapping device 102 is >0.1 mbar. Most preferably the trapping device is operated within a pressure range of 1 and 10 mbar controlled by a mechanical pump and a valve to adjust pumping speed. Alternatively, lower pressures can be accomplished, for example 0.01 mbar or lower using a turbomolecular pump. In the case of a trapping device operated at >0.1 mbar, ions are focused through a differential aperture 109 into an ion funnel 110 operated at lower pressure and through a second differential aperture 111 into an RF ion guide 112 designed with an axial DC gradient.

The beam of ions from the ionization source can be re-directed into the trapping device 102 using the DC potential applied to electrode 108 as soon as the accumulated population stored in the trapping device 102 is ejected to downstream optics for further processing. The accumulation period can be matched to the downstream processing period, thus improving the duty cycle of the method considerably. In another preferred mode of operation, the trapping device 102 is operated in transmission or pass-through mode to avoid mass and/or mobility related discrimination effects observed when trapping a high number of charges, thus providing accurate information on ion abundance, and providing accurate quantification of analytes across the entire range of mass-to-charge ratios. Most preferably, the pass-through mode is applied to MS-survey scans, typically followed by MSn (n=2, 3, 4) scans where trapping of ions in the trapping device is essential for bunching the ion beam, improving duty cycle and enhancing the overall sensitivity of the method.

A differential aperture 113 and additional pumping is provided to reduce pressure in the first quadrupole mass filter 103 disposed further downstream and typically operated at <10⁴ mbar pressure established by a turbomolecular pump. The first quadrupole receives a bunched population of ions and can either selectively transmit a subset of the ions over a narrow mass range or transmit a wide range of mass-to-charge ratios, depending on the method applied. Wide mass range transmission is desirable in MS-survey scans, preferably with the trapping device operated in pass-through mode, while narrow m/z windows or single charge state selection of high mass ions, e.g. proteins, are desirable for fast MSn experiments with the trapping device operated in trapping mode. The high-speed MSn workflows are enabled by the new instrument architecture disclosed in the present invention.

A set of DC lenses 114 and an additional RF ion guide 115 is disposed between the first quadrupole mass filter 103 and the segmented linear quadrupole ion trap 104. Preferably, the segmented linear quadrupole ion trap is differentially pumped while the differential pumping volume is defined by differential apertures 116 and 117. Processing of ions in the segmented linear quadrupole ion trap 104 includes radially confining ions by a set of rectangular RF waveforms applied to the quadrupole rods. Individual DC signals are applied to each of the quadrupole segments for manipulating ions axially. Additional resolving DC signals and AC waveforms with a single or multiple frequency components can be applied to different segments to isolate, collisionally activate, dissociate, and selectively park ions at different positions in a-q coordinates of the stability diagram. Processing of the ions in the segmented linear quadrupole ion trap 104 also includes activating and or dissociating ions via with electrons, photons, reactive neutrals and/or reagent ions of like- or opposite-polarity. These activation-dissociation tools can be applied sequentially or simultaneously during a single scan with ion isolation steps applied in-between the activation-dissociation steps to enhance the level of structural characterization and maximize sequencing information of complex biomolecular ions.

A second quadrupole mass filter 105 is disposed downstream of the segmented linear quadrupole ion trap 104 to enable fast selection of fragment ions produced upstream. Although mass selection capabilities are also available in the linear ion trap, the isolation step in trapping mode remains slow compared to performing an isolation step using the second quadrupole mass filter 105, which can transmit selected mass-to-charge ratios in the micro-second time scale, thus reducing scan time and increasing duty cycle.

The collision cell 106 can be used for collisional activation leading to dissociation products detected using a mass analyzer 107. The collision cell is operated approximately at 0.01 mbar pressure and the collision or buffer gas is confined by two lenses electrodes with differential apertures 118 disposed at the entrance and exit of the device. An axial DC field is necessary to drive ions forward while the exit lens 118 is supplied with DC and/or RF modulating signals to control ejection of the ions towards the mass analyzer 107. In addition, the collision cell also thermalizes analyte and fragment ions forming a collimated ion beam to enhance the mass resolving power of the mass analyzer 107, preferably the mass resolving power of a time-of-flight mass analyzer.

Figure 2:
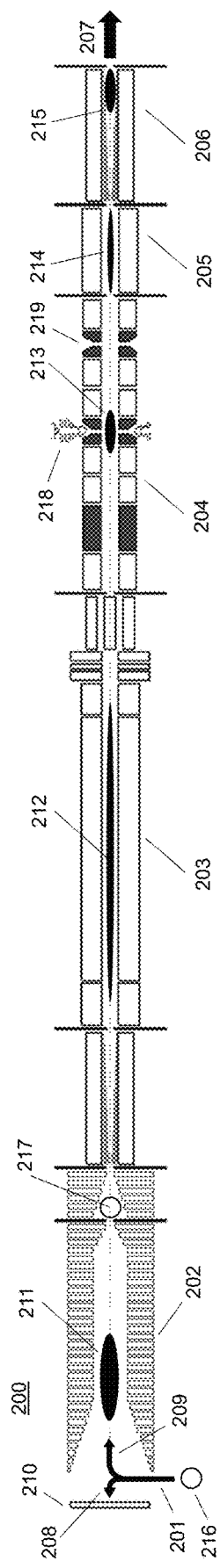
FIG. 2 schematically depicts a mass spectrometer according to an exemplary embodiment, in use.

FIG. 2 shows a mass spectrometer 200 according to an exemplary embodiment. The mass spectrometer 200 is generally as described with respect to the mass spectrometer 100, detailed description of which is omitted for brevity. A beam of ions 201 is received by the trapping device 202 configured with an accumulation region to store a large population of ions 211. The ion beam is modulated by a switched DC signal applied to electrode 210 deflecting ions into 209 or out of 208 of the trapping device 202. The number of ions accumulated in the trapping device 202 is determined by the timing characteristics of the switched DC signal. Typical accumulation times range from <1 ms to >100 ms, depending on the concentration of the analyte and the intensity of the incoming beam of ions. The intensity of the incoming beam of ions can be measured periodically during an analysis, preferably at the beginning of each cycle comprising multiple scans, to define the accumulation period. The intensity of the incoming ion beam can be measured by performing an MS-survey scan and/or by collecting the ion current on one of the electrodes of the geometry, preferably electrode 208 or any alternative electrode structure upstream of the trapping device. If multiple analyte ions are processed within a cycle, an equal number of different accumulation periods is preferred and adjusted according to the ion intensity of each analyte measured in the survey scan. All subsequent MSn scans scheduled for each analyte are therefore executed with the optimum number of charges. This is accomplished by dynamically controlling the switched DC signal applied to electrode 210 in every scan to optimally fill the trapping device 202.

A first ion activation-dissociation region 216 located upstream of the trapping device 202 and/or a second ion activation-dissociation region 217 located downstream can be used to generate MS2 fragments from at least a subset of ions produced in the ionization source. If the upstream ion activation-dissociation region is utilized, the accumulation region 211 will be primarily filled with MS2 fragments, depending on the extent of fragmentation induced, for example via energetic collisions with background gas molecules or via interactions with externally injected UV photons. Alternatively, analyte ions can be accumulated and subsequently fragmented in the ion activation-dissociation region 217 located downstream of the trapping device 202. In this exemplary embodiment, MS2 fragment ions are always generated upstream of the first quadrupole mass filter 203.

The quadrupole mass filter 203 can selectively transmit at least a subset of the ions 212 according to their mass-to-charge ratio. In a preferred method, a first MS-survey scan is performed with the quadrupole mass filter 203 configured to transmit ions over a wide range of mass-to-charge ratios 212. Multiple sequential MS-survey scans maybe necessary to generate high signal-to-noise mass spectra containing high-fidelity isotopic distributions to facilitate spectral annotations or assignments, especially for high mass analytes observed in higher charge states. The MS-survey scan precedes the MS2 fragmentation step, which can be performed before or after the trapping device in regions 216 and 217, while the quadrupole mass filter 203 is configured to transmit all MS2 fragment ions distributed over a wide range of mass-to-charge ratios 212. Similarly, multiple sequential MS2 scans maybe necessary to generate high signal-to-noise fragmentation spectra containing high-fidelity isotopic distributions to facilitate spectral annotations.

In this preferred method or mode of operation, subsequent MS3 scans can be configured in real time by utilizing MS2 scan information, for example by selecting a particular MS2 fragment ion using the first quadrupole mass filter 203, which can be transferred and processed further in the segmented linear quadrupole ion trap 204. FIG. 2 shows a mass selected group of MS2 fragment ions 213 stored in one of the linear ion trap segments facilitating reactions with electrons injected from an external source 218. As an example of an MS3 step in such a high-speed MSn ion activation-dissociation workflow, multiply charged proteins can be reacted with near-zero kinetic energy electrons producing a series of charge-reduced MS2 radical fragment ions, which typically undergo dissociation to produce the MS3 counterparts. An additional MS4 stage of fragmentation is enabled in this new instrument geometry at the highest speed possible by mass selecting product ions 214 generated in the segmented linear quadrupole ion trap, either from the series of charge-reduced MS2 radical fragment ions and/or from their MS3 dissociation products, using the second quadrupole mass filter 205. MS4 fragments 215 can be generated and thermalized in the collision cell 206 by raising the DC offset of the segmented linear quadrupole ion trap 204 relative to the DC offset of the collision cell, thus increasing the kinetic energy of the mass selected ions 214 above the dissociation threshold. Fragment ions 215 are ultimately bunched at the exit of the collision cell and released toward a time-of-flight mass analyzer 207.

In the case of charge-reduced and ionized MS2 fragment or product ions selected by the first quadrupole mass filter 203 and further activated via kinetic energy-controlled ion-electron reactions in the segmented linear quadrupole ion trap 204, the mass-to-charge window of the second quadrupole mass filter 205 can be calculated directly from the mass of the MS2 fragment ions undergoing charge reduction or ionization, therefore, no additional real time processing of the MS3 mass spectrum is required increasing the speed of the analysis further. In contrast, selection of MS3 fragment ions requires additional real time processing of the MS3 ion population. To maximize the speed of the analysis, real time calculations of the features of the MS and MSn mass spectra are performed in the ms time scale, preferably in less than 50 ms, and most preferably in less than 10 ms.

Different types of ion-activation dissociation can be exercised in the segmented linear quadrupole ion trap 204 at the MS3 stage, for example by injecting UV or IR photons through the ion trapping volume in a dedicated segment 219 configured with windows for optical access. Other types of fragmentation can be envisaged at the MS3 stage known in prior art.

Table 5 summarises example scan modes for the ion analysis apparatus 100, as described with reference to FIGS. 3, 4 and 5. Preferred scan modes in bold. Accumulation or IMS is preferred. Transfer indicates that the ions are transferred by that ion optical element, without additional processing. For the linear quadrupole ion trap, MSn+1 ion activation and/or dissociation of MSn (e.g. n=1 or n=2 or n=3) product ions, generating MSn+1 product ions from MSn product ions and mass selection of MSn+1 product ions and MSn+2 ion activation and/or dissociation of the mass selected MSn+1 product ions requires two steps of ion activation-dissociation and may require an accumulation step in the linear quadrupole ion trap). Accumulation and IMS may be combined, IMS used alone or accumulation used alone.

Figure 3:
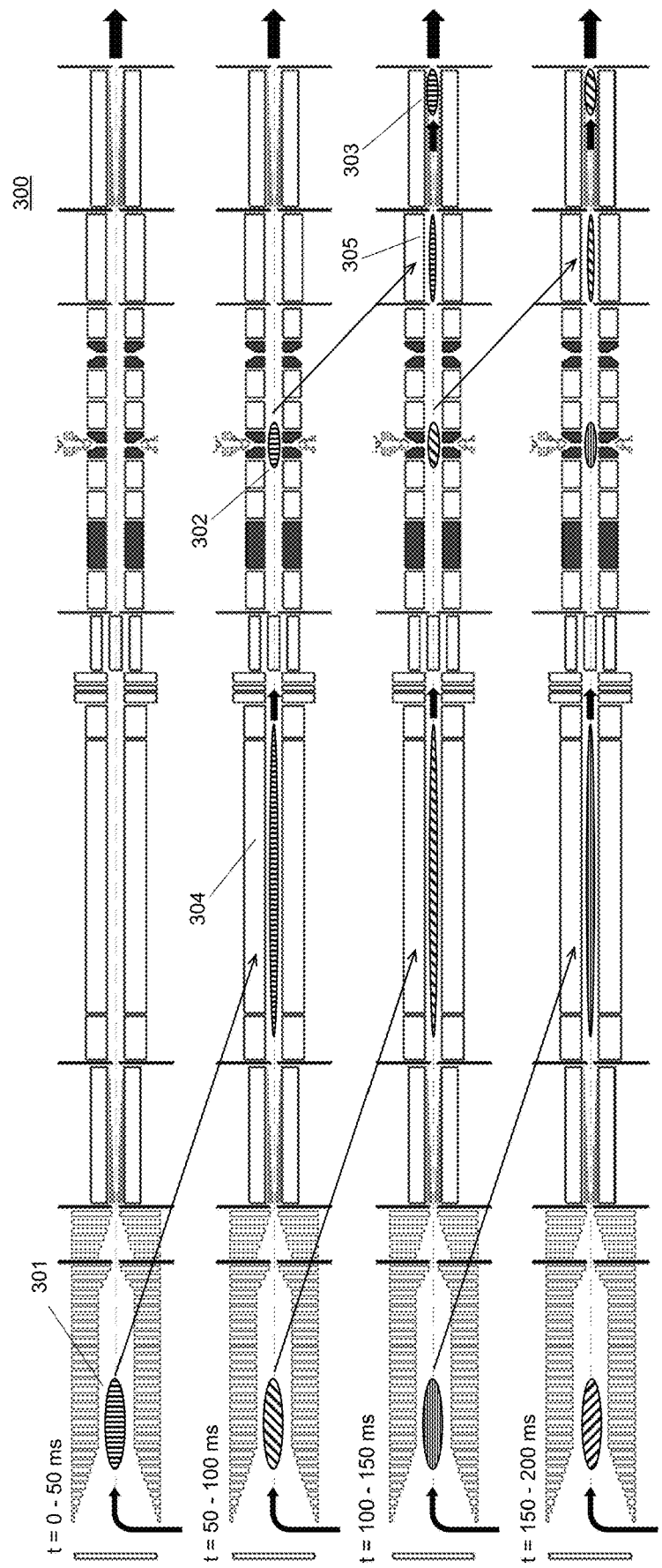
FIG. 3 schematically depicts a method according to an exemplary embodiment.

FIG. 3 shows an example of a series of MS4 scans 300 performed in parallel and visualized using 50 ms long snapshots, according to an exemplary embodiment, for example acquired using the mass spectrometer 100 or 200. The period of a single scan is ~105 ms long. Each MS4 scan involves transferring a subset of the ions generated in the ionization source through the ion optical elements of the new design architecture to the mass analyzer and to the detector, and includes a 50 ms long accumulation period performed in the trapping device 301, which is further configured with a fragmentation region to perform the MS2 step, an additional 50 ms ion-electron reaction period for the MS3 stage performed in the segmented linear quadrupole ion trap 302, and a 5 ms period for the MS4 stage and extraction to TOF performed in the collision cell 303. The first 304 and second 305 quadrupole mass filters are configured to perform the MS3 and MS4 mass selection steps, respectively. The parallelization of consecutive scans whereby the accumulation period of a subsequent scan overlaps in time with the processing steps of a preceding scan performed in the segmented linear quadrupole ion trap and the collision cell enables to operate at a repetition rate of 20 Hz. The repetition rate of the MS4 experiment is determined by the slowest operation or function performed within a single scan, and in this example, this is determined by both the 50 ms accumulation period and the 50 ms ion-electron reaction time. Higher repetition rate MS4 experiments are possible by reducing the accumulation time and increasing the reaction rate between electrons and ions, for example. Preferably, individual scans within each cycle can be configured with different accumulation periods to optimize the population of ions stored in the trapping device, determined by the intensity of the analytes measured in a preceding MS-survey scan. A preceding MS-survey scan is ideally performed with the trapping device 301 operated in pass-through mode to enable precise quantitation of the analytes. Most preferably, the flow of ions from the ionization source into the first trapping region is uninterrupted with the trapping device duty cycle approaching 100%.

In a DDA workflow, the MS4 scans shown in FIG. 3 are preceded by a series of MS-survey scans, and also a series of MS2 and MS3 scans, jointly forming an experimental cycle.

Figure 4:
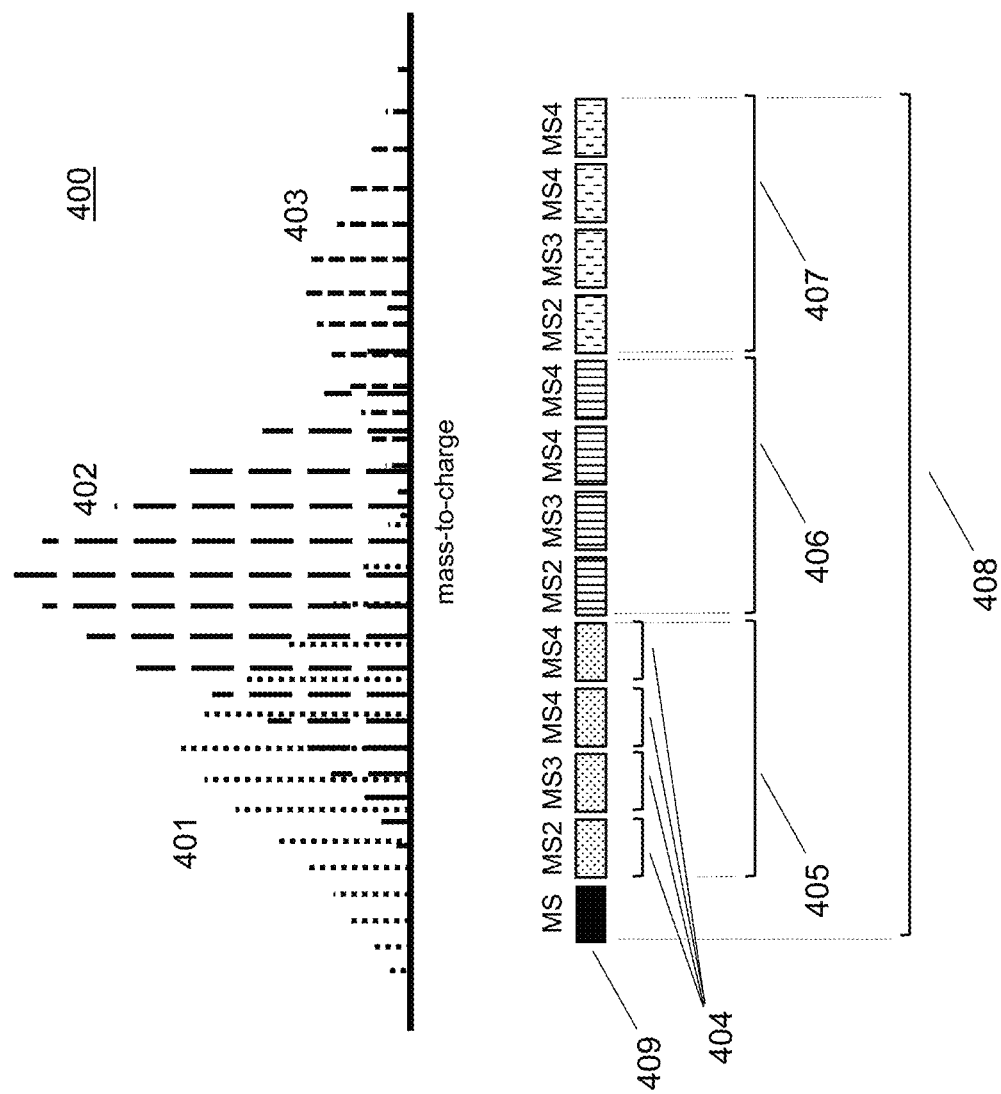
FIG. 4 schematically depicts a method according to an exemplary embodiment.

FIG. 4 shows a method 400 according to an exemplary embodiment, for performing an MS4 analysis on a complex sample. In a typical analytical workflow, analytes are separated by LC/CE and subsequently ionized by electrospray ionization. The example of the mass spectrum 400 includes three coeluting charge state envelopes 401, 402 and 403, each corresponding to different multiply charged analytes.

A single cycle 408 comprises at least one leading MS-survey scan 409 followed by a series of MSn sub-cycles, 405, 406 and 407, with each sub-cycle dedicated to at least one analyte or at least one precursor ion charge state from the respective charge state envelopes 401, 402 and 403 observed in the leading MS-survey scan 409. The first step in every cycle is the generation of an MS-survey scan 409 to identify the different analyte species present in the mass spectrum as well as their abundance. This calculation is performed in real-time and specifically in the case of high-mass high-charge state analytes, a fast charge-state deconvolution algorithm is required to extract the features of the mass spectrum and define instrument parameters in subsequent scans. Preferably, for samples with high dynamic range in analyte concentration precise quantitation is accomplished by operating the trapping device in pass-through mode when performing the MS-survey scans.

Following the leading MS-survey scan 409, a single, or most preferably, a series of MS2 scans is scheduled next in the DDA method whereby individual charge-states selected using the first quadrupole mass filter are, for example, collisionally activated in the segmented linear quadrupole ion trap or in the collision cell. Real-time or offline processing of the resulting MS2 spectrum is then required to identify fragment ions in the MS2 spectrum that can be further interrogated or processed by additional MS3/MS4 stages of fragmentation. In case real-time processing of the features of the MS2 mass spectrum is feasible, the method is scheduled to initiate a series of MS3 scans. This is accomplished, for example, by collisionally activating the ions in any of the two fragmentation regions coupled to the trapping device and using the first quadrupole mass filter to transfer selected MS2 fragments to the segmented linear quadrupole ion trap enabling the MS3 fragmentation step, selecting from an array of alternative dissociation methods.

A single, or most preferably, a series of MS3 scans is performed whereby mass selected MS2 fragments are subjected to reactions with electrons, photons or other fragmentation means known in the art. MS3 mass spectra are generated using the mass analyzer, preferably a time-of-flight analyzer, while the features of the MS3 spectra can also be processed in real-time by fast algorithms to drive the MS4 fragmentation stage. Alternatively, the MS3 products can be predicted directly from the MS2 mass spectrum and the MS4 experiment can be scheduled without reading/processing MS3 information in real time.

The MS4 step may involve mass selection of MS3 product ions using the second quadrupole mass filter and collisional activation in the collision call producing a plethora of MS4 fragments. Typically, a single sub-cycle, for example sub-cycle 405, includes multiple MS4 scans to improve signal-to-noise through averaging and address the low fragment ion intensity at this final stage of the analytical workflow. MS3 and MS4 experiments may also require an accumulation step prior to being executed, to raise the ion population to levels sufficiently high to produce a detectable signal. Ions can be accumulated prior to executing the MS3/MS4 fragmentation stage in one of the segments of the linear quadrupole ion trap.

In the case of offline processing of MS2 data sets, a second targeted LC/CE run can be performed on the same sample where the mass-to-charge ratio of the MS2 fragment ions scheduled for MS3 and MS4 processing are defined in the DDA method prior to the analysis.

Preferably, individual scans 404 performed sequentially within each of the sub-cycles 405, 406 and 407 are configured to overlap, thus enhancing instrument duty cycle, similarly to the workflow disclosed in the description of FIG. 3.

Reduced versions of the MS4 workflow are also disclosed, for example, MS3 scans where MS2 CID is followed by MS3 EID, or MS2 CID followed by MS3 UVPD, with the MS3 step always performed in the segmented linear quadrupole ion trap, while the first quadrupole mass filter is used for selecting the MS2 fragments subjected for further processing. In yet another example, the MS3 fragmentation stage can be performed in the collision cell, while the MS2 fragmentation stage is performed in the segmented linear quadrupole ion trap, in which case the second quadrupole mass filter is used for selecting the MS2 fragments subjected for further processing. A wide range of different ion activation-workflows are enabled by the new instrument architecture disclosed in the present invention and these can be mixed and matched to design novel DDA analytical workflows to optimize the analysis of different classes of analytes.

More specifically, the analysis of complex glycan or glycopeptide samples requires an MS2 collision induced dissociation (CID) fragmentation stage followed by MS3 electron induced dissociation (EID) stage applied to selected MS2 CID fragments to fully characterize molecular structure, glycan topology and/or amino acid sequence. This is made possible by scheduling a DDA method with the MS2 scans configured with the first quadrupole mass filter performing the mass selection of precursor or analyte ions, and with the segmented linear ion trap or the collision cell enabling the subsequent MS2 CID step. The following MS3 scans are configured with the activation-dissociation region coupled to the trapping device producing the MS2 CID fragments, which are subsequently mass selected using the first quadrupole mass filter, and with the segmented linear ion trap enabling the MS3 EID fragmentation stage. The MS3 fragmentation stage is enabled by reading the features of the MS2 spectra in real time and defining the instrument parameters, such as the position of the first quadrupole mass filter and/or the reaction time of the EID step applied in the subsequent MS3 scans. Typically, a survey scan precedes the MS2 and MS3 scans and their corresponding sub-cycles, jointly forming a DDA cycle. The DDA method involves applying such cycles sequentially for processing and characterizing all or most of the analytes present in a complex sample.

Figure 5:
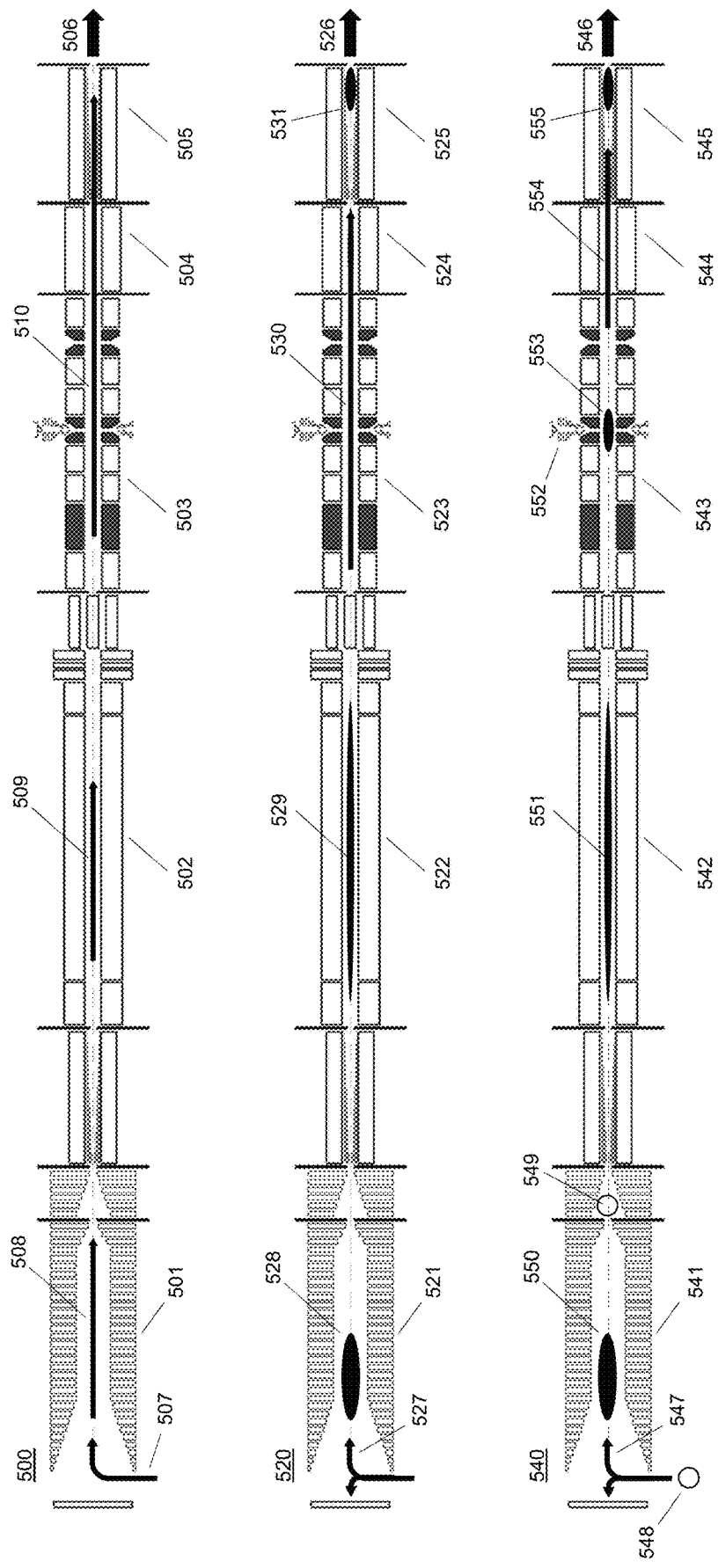
FIG. 5 schematically depicts a method according to an exemplary embodiment.

An exemplary description of the different scans comprising a single cycle in the DDA MS3 method disclosed above is provided with reference to FIG. 5. In the MS-survey scan 500, a continuous beam of ions 507 is received in the trapping region 501 operated in pass-through mode 508, eliminating space charge capacity limitations and associated mass discrimination effects. All precursor or analyte ions 509 are transferred through the first quadrupole mass filter 502 without mass selection. Similarly, all ions 510 are transferred through the segmented linear ion trap 503, the second quadrupole mass filter 504 and the collision cell 505 towards a mass analyzer, preferably a time-of-flight analyzer 506 producing a panoramic view of the mass spectrum with representative ion abundances for the different analytes present in complex sample and in the corresponding incoming beam of ions 507. A single or multiple TOF spectra are generated during the MS-survey scan, which is typically faster compared to the ensuing MSn scans.

The accumulation period in the ensuing MS2 CID scan or sequential MS2 CID scans 520 is determined by the total ion intensity, or the total ion current measured in the MS-survey scan 500 to optimally load the trapping device 521, now operated in trapping mode, receiving analyte ions 528 from the ionization source. According to this preferred DDA MS3 method, the first quadrupole mass filter 522 is scheduled to select a first analyte based on the relative ion intensity of all analytes identified in the MS-survey scan 500. In untargeted analytical workflows, the first analyte to be selected is typically the most abundant species but other selection criteria known in the art can be applied, for example, selection rules can be applied based on the charge state of the analyte and/or a specified mass range of interest. Mass selected analyte ions 530 are transferred through the segmented linear quadrupole ion trap 523 and the second quadrupole mass filter 524 and subjected to CID in the collision cell 525. MS2 CID fragment ions 531 are subsequently gated or ejected towards the mass analyzer 526 and an MS2 CID spectrum with fragment ion information corresponding to a specific analyte is generated.

Real time or offline data processing of the MS2 CID data allows scheduling the subsequent MS3 scans in the same LC/CE run or in a second LC/CE run, respectively. Most preferably, fast processing of the MS2 CID mass spectra allows for defining the MS3 scan 540 performed in the same run whereby the incoming beam of ions 547 is fragmented via collisions in one of the two activation-dissociation regions 548, 549 of the trapping device 541. Similarly to the MS2 CID scan 520, the amount of ions 550 stored in the trapping device 541 is determined by the total ion intensity, or the total ion current measured in the MS-survey scan 500. The first quadrupole mass filter 542 is now scheduled to select MS2 fragment ions 551 based on a different set of selection criteria compared to the selection criteria applied in the MS2 CID scans. For example, quadrupole mass selection may be based on a predefined list of m/z values corresponding to tri-saccharides or penta-saccharides when glycan or glycopeptides are analyzed. Other selection rules can be applied for driving the first quadrupole mass filter 542 in the MS3 scans known in the art. Mass selected MS2 CID fragment ions 553 are subsequently stored in the segmented linear quadrupole ion trap 543 and subjected to MS3 EID by injecting into the linear ion trap a 35 eV electron beam from an external source of electrons 553. All MS3 EID fragment ions are subsequently transferred 554 through the second quadrupole mass filter 544 to the collision cell 545 and bunched 555 prior to ejection towards the mass analyzer 546.

The description with reference to FIG. 5 concerns a set of three individual scans that may comprise a single cycle in a DDA MS2 CID MS3 EID workflow. Each scan within a sub-cycle or a cycle can be performed multiple times to optimize the quality of the generated mass spectra, while multiple sub-cycles or cycles are applied sequentially for the analysis of different analytes delivered by the front-end separation method and/or the ionization source. Preferably, multiple sub-cycles with each sub-cycle containing the MS2 and MS3 steps can be performed to process multiple analytes identified in a leading MS-survey scan. Variations of this workflow are envisaged, tailored to different classes of analytes, for example by performing ECD or UVPD instead of EID at the MS3 fragmentation stage. In another variation of this method, operating the trapping device in trapping mode during the MS-survey scan maybe desirable to enhance the sensitivity of the measurement for low concentration samples. Most preferably, the continuous flow of ions into the trapping region remains uninterrupted when transitioning between MS-survey and MSn scans, with the duty cycle of the trapping device approaching 100%.

In yet another MSn workflow supported by the new design architecture, the analysis of complex samples containing antibodies or Fab units requires multiple survey scans to improve statistics, followed by multiple MS2 CID or MS2 ECD scans to produce intact light-chain or N-terminus b-type ions from both the light-chain and the heavy-chain, all containing the hypervariable domains, also known as complementarity determining regions (CDRs 1, 2 and 3) responsible for antigen binding. De novo sequencing these regions is of paramount importance for the development of new therapeutics. In the case of a DDA method configured with MS2 CID scans, the subsequent MS3 scans include MS2 CID in either of the two collisional activation regions coupled to the trapping device, followed by mass selection using the first quadrupole mass filter, and ultimately the MS3 fragmentation stage performed in the segmented linear quadrupole ion trap that may involve reactions with electrons such as ECD, EID, or interactions with photons, such as UVPD or other types of dissociation known in the art. The MS2 ECD fragmentation stage of the MS2 scans, and the MS3 ECD/EID fragmentation stage of the MS3 scans may also include a collisional activation step that can be realized by resonance excitation or beam-type CID performed in the segmented linear quadrupole ion trap or in the collision cell respectively. Such MS3 collisional activation scans can be configured into MS4 scans by adding a mass selection step, for example by using the isolation capabilities of the segmented linear quadrupole ion trap or, most preferably the second quadrupole mass filter.

More advanced workflows can be supported by the new design architecture whereby the light-chain produced in an MS2 CID scan is further processed by MS3 ECD and MS4 CID, while within the same cycle and starting with the same precursor/analyte ion, the b-type heavy chain fragment produced in a subsequent MS2 CID scan is further processed by MS3 UVPD. In addition, ion accumulation can be performed in the segmented linear quadrupole ion trap before executing the MS3/MS4 scans to enhance signal-to-noise levels in the resulting mass spectra.

Figure 6:
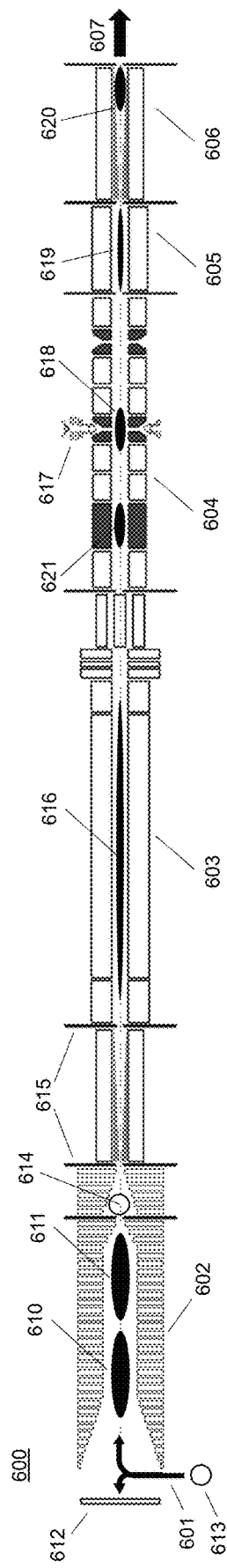
FIG. 6 schematically depicts a mass spectrometer according to an exemplary embodiment, in use.

According to a preferred geometry of an ion analysis apparatus 600 and method of operation of the present invention shown in FIG. 6, a beam of ions 601 is received by the trapping device 602 configured to operate as a trapped ion mobility spectrometer having an accumulation region to store a large population of ions 610 and a mobility separation region where the accumulated ions are separated according to differences in their ion mobilities 611. The incoming beam of ions 601 maybe modulated by a switched DC signal applied to electrode 612 deflecting ions into or out of the trapped ion mobility spectrometer 602. The number of ions accumulated in the trapped ion mobility spectrometer is determined by the timing characteristics of the switched DC signal. The mass spectrometer 600 is generally as described with respect to the mass spectrometer 100 and/or 200, detailed description of which is omitted for brevity.

Most preferably, the processing period in MS-survey and MSn scans is equal to the accumulation period leading to 100% duty cycle in the trapping device. Under these conditions the DC potential applied to electrode 612 is static, maintaining a continuous flow of ions from the ionization source into the trapping device, while the latter acts as a buncher converting the continuous flow of ions into packets delivered to downstream ion optical elements for processing, mass analysis and detection.

A first ion activation region 613 located upstream of the trapped ion mobility spectrometer 602 and/or a second ion activation region 614 located downstream can be used to generate MS2 fragments from at least a subset of ions produced in the ionization source. Analytes or fragment ions separated in the trapped ion mobility spectrometer 602 can be selected according to their ion mobility by switching the DC signal applied to an electrode-gate 615 between a transmission potential and a stopping potential. Mobility selected ions can be mass selected 616 in the first quadrupole mass filter 603 and subjected to further processing in the segmented linear quadrupole ion trap 604, for example by injecting electrons from an external source 617 to generate fragments 618. An additional mass selection step can be performed on fragment ions 619 using the second quadrupole mass filter 605, while collisional activation and bunching of product ions 620 can be realized in the collision cell 606, while mass analysis is preferably performed using a time-of-flight mass analyzer 607.

Whilst processing ions by ExD or by UVPD in one of the segments in the segmented linear quadrupole ion trap, a subsequent fraction of the ions from the same or a subsequent packet ejected from the trapped ion mobility spectrometer can be stored in an upstream segment, thus increasing the duty cycle of the analysis.

All the DDA methods and scan-cycle combinations disclosed so far are directly applicable to mobility selected ions, similarly to the description provided for mass selected ions, by utilizing the new instrument architecture disclosed in FIG. 6.

Table 6 summarises example scan modes for the ion analysis apparatus 600. Preferred scan modes in bold. Accumulation or IMS is preferred. Transfer indicates that the ions are transferred by that ion optical element, without additional processing. For the linear quadrupole ion trap, MSn+1 ion activation and/or dissociation of MSn (e.g. n=1 or n=2 or n=3) product ions, generating MSn+1 product ions from MSn product ions and mass selection of MSn+1 product ions and MSn+2 ion activation and/or dissociation of the mass selected MSn+1 product ions requires two steps of ion activation-dissociation and may require an accumulation step in the linear quadrupole ion trap). Accumulation and IMS may be combined, IMS used alone or accumulation used alone.

Figure 7:
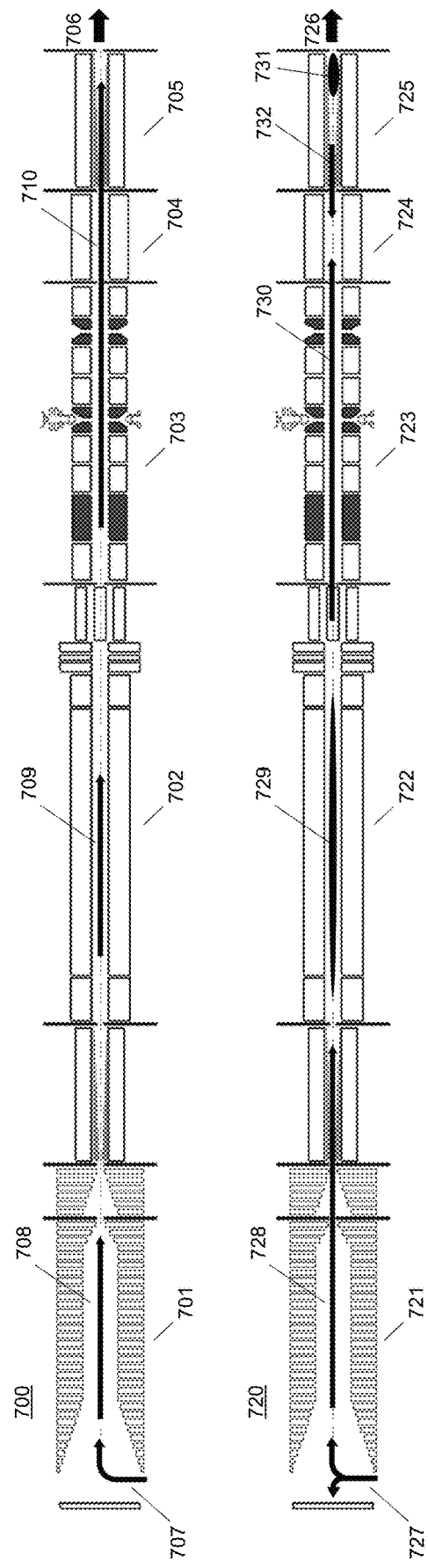
FIG. 7 schematically depicts a mass spectrometer according to an exemplary embodiment, in use.

An exemplary description of the different scans comprising a single cycle in yet another DDA MS2 method is provided with reference to FIG. 7.

In the MS-survey scan 700 (see also FIG. 9 Example 1), a continuous beam of ions 707 is received in the trapping device 701 operated in pass-through mode 708, eliminating space charge capacity limitations and associated mass discrimination effects. All precursor or analyte ions 709 are transferred through the first quadrupole mass filter 702 without mass selection. Adjustments to the RF waveform amplitude are desirable to control the low mass cut off of the device and transmit only the higher mass analyte ions. Similarly, all ions or the higher m/z fraction including the charge state envelopes of analyte ions 710 are transferred through the segmented linear ion trap 703, the second quadrupole mass filter 704 and the collision cell 705 towards a mass analyzer, preferably a time-of-flight analyzer 706 producing a panoramic view of the mass spectrum with representative ion abundances for the different analytes present in complex sample and in the corresponding incoming beam of ions 707. A single or multiple TOF spectra are generated during the MS-survey scan, which is typically faster compared to the ensuing MSn scans, while the exit lens of the collision cell can be modulated between a trapping potential and an ejection potential with a repetition rate equal to the repetition rate of the TOF extraction pulse to improve the duty cycle of the method.

Figure 9:
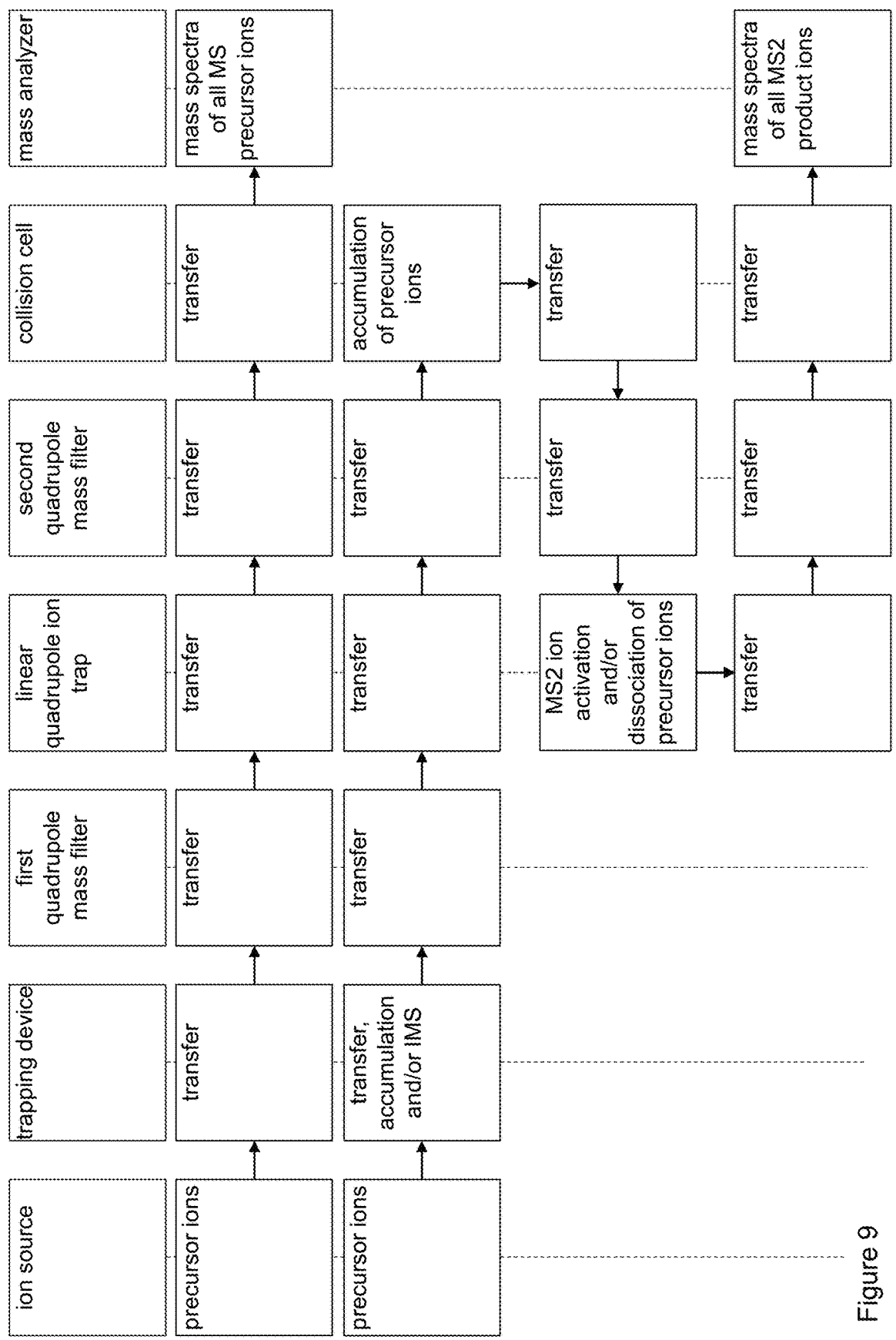
FIG. 9 schematically depicts methods according to exemplary embodiments.
Figure 9:
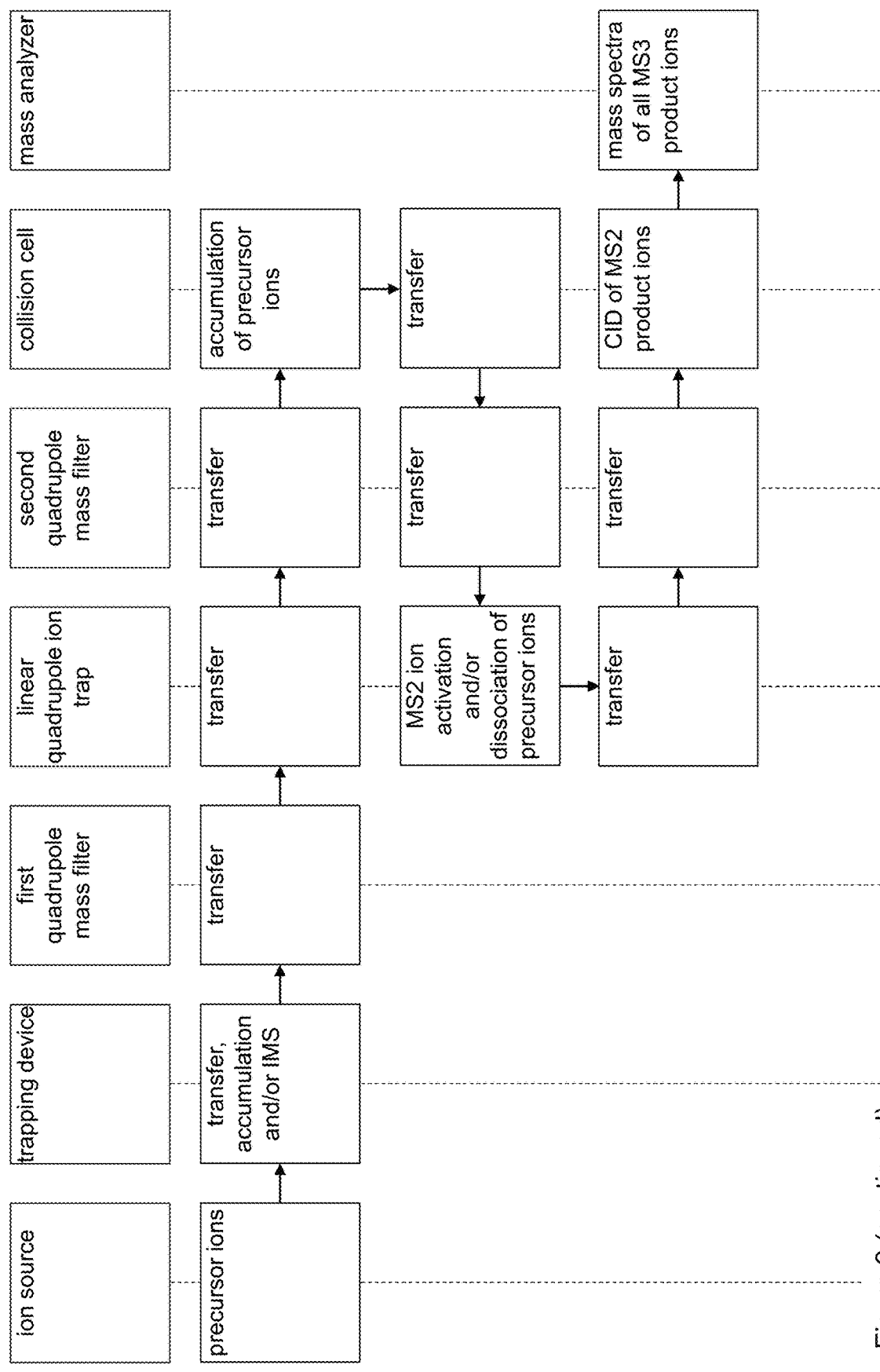
Figure 9:
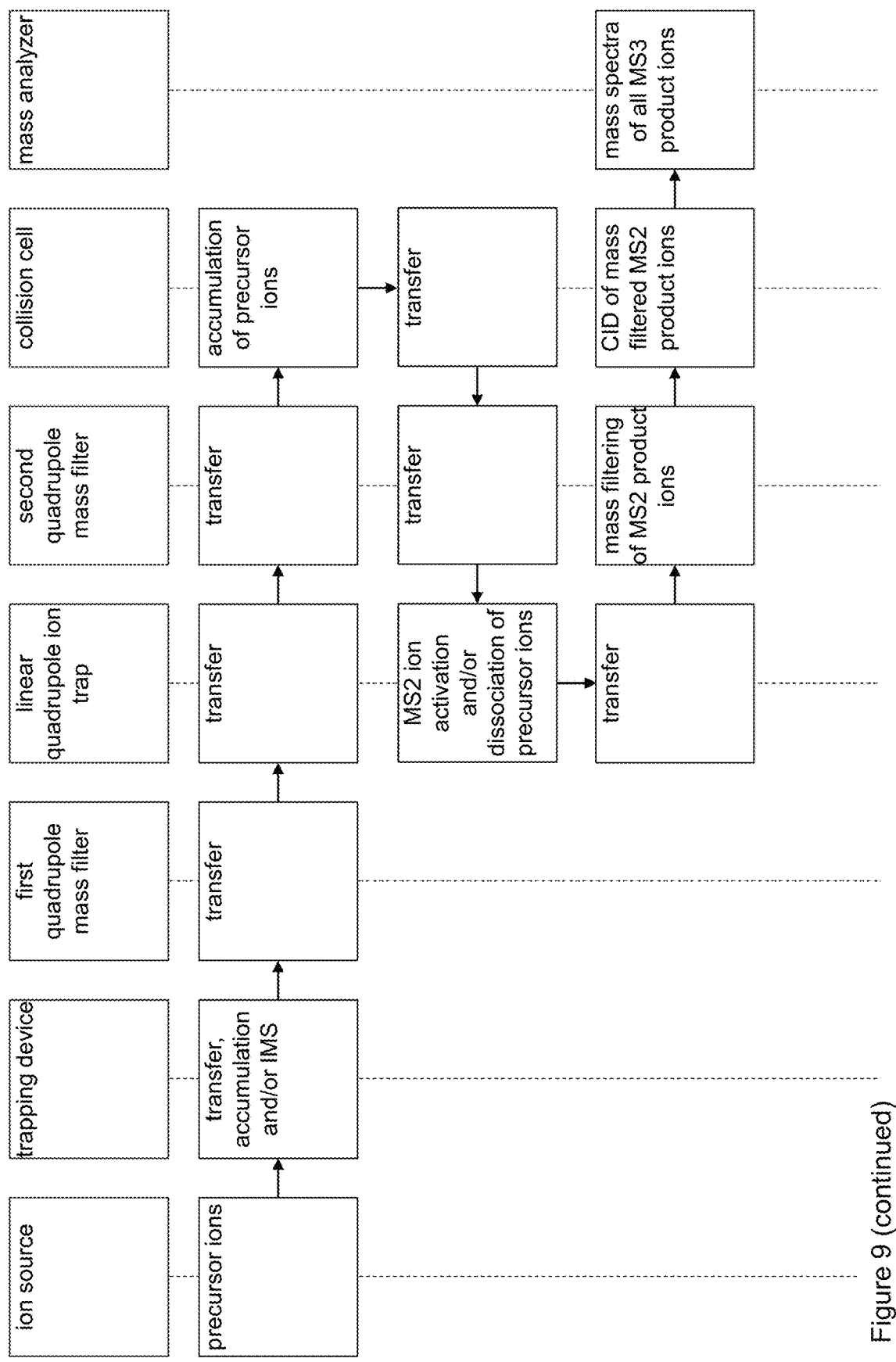
Figure 9:
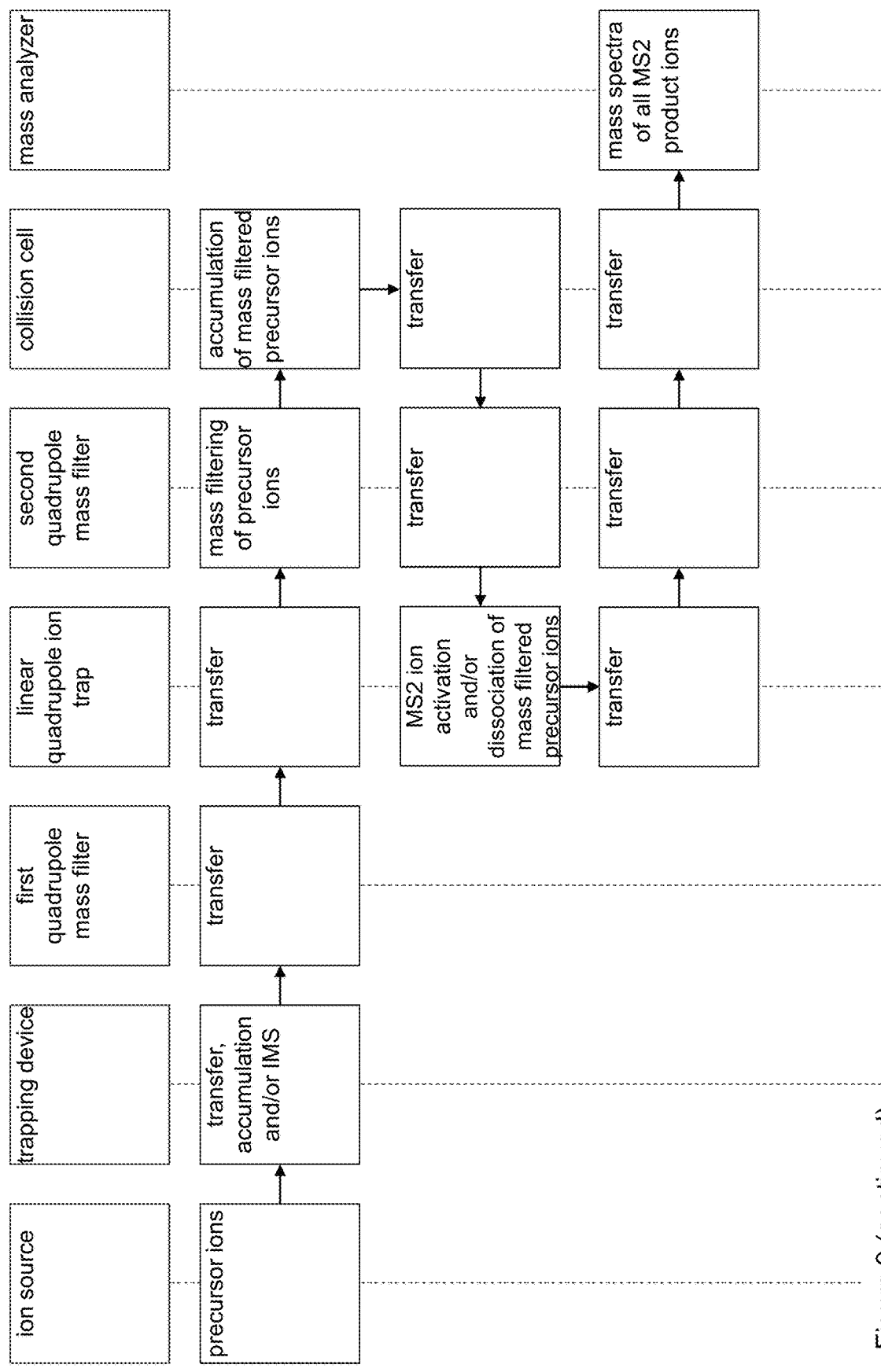
Figure 9:
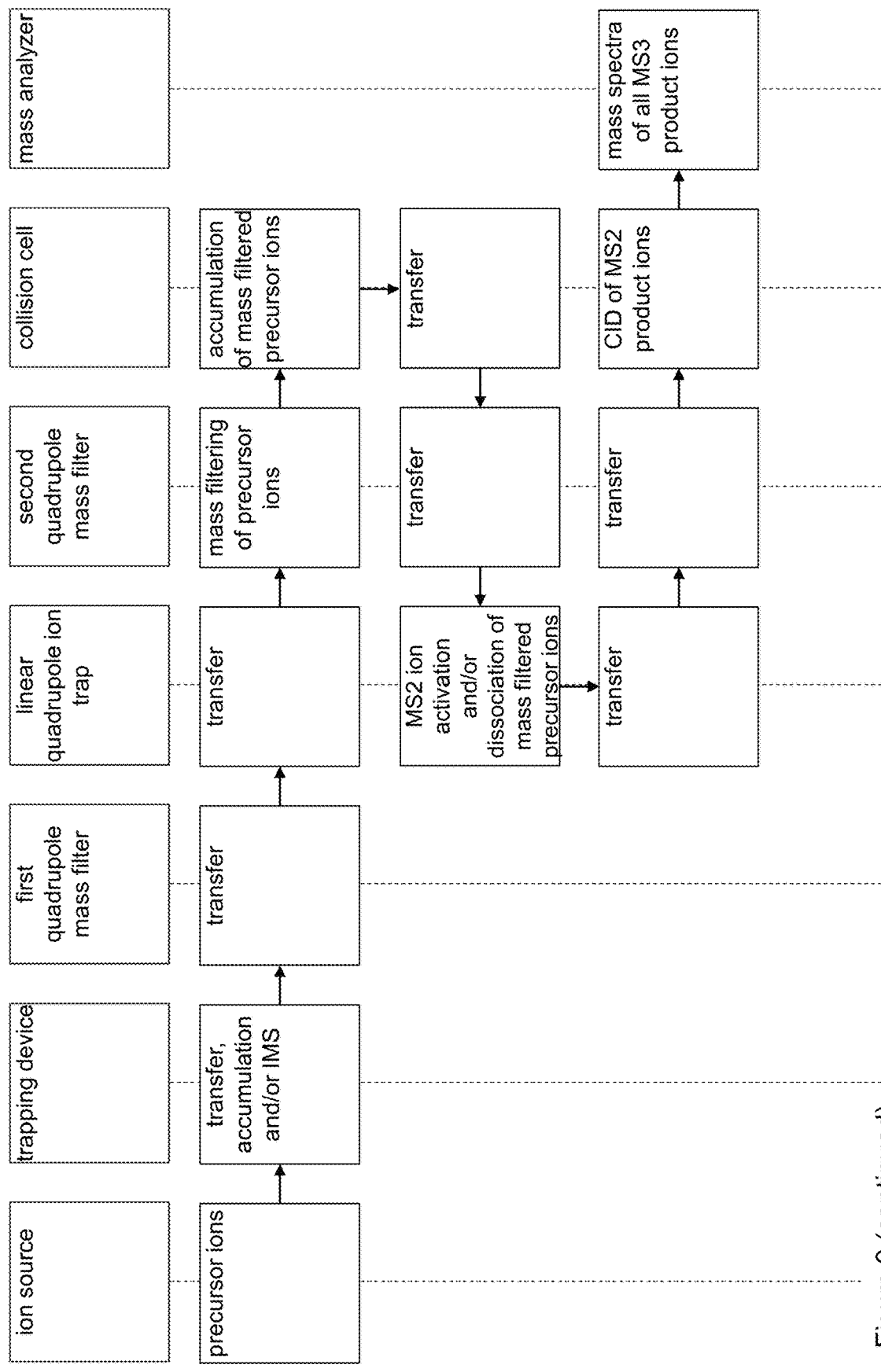
Figure 9:
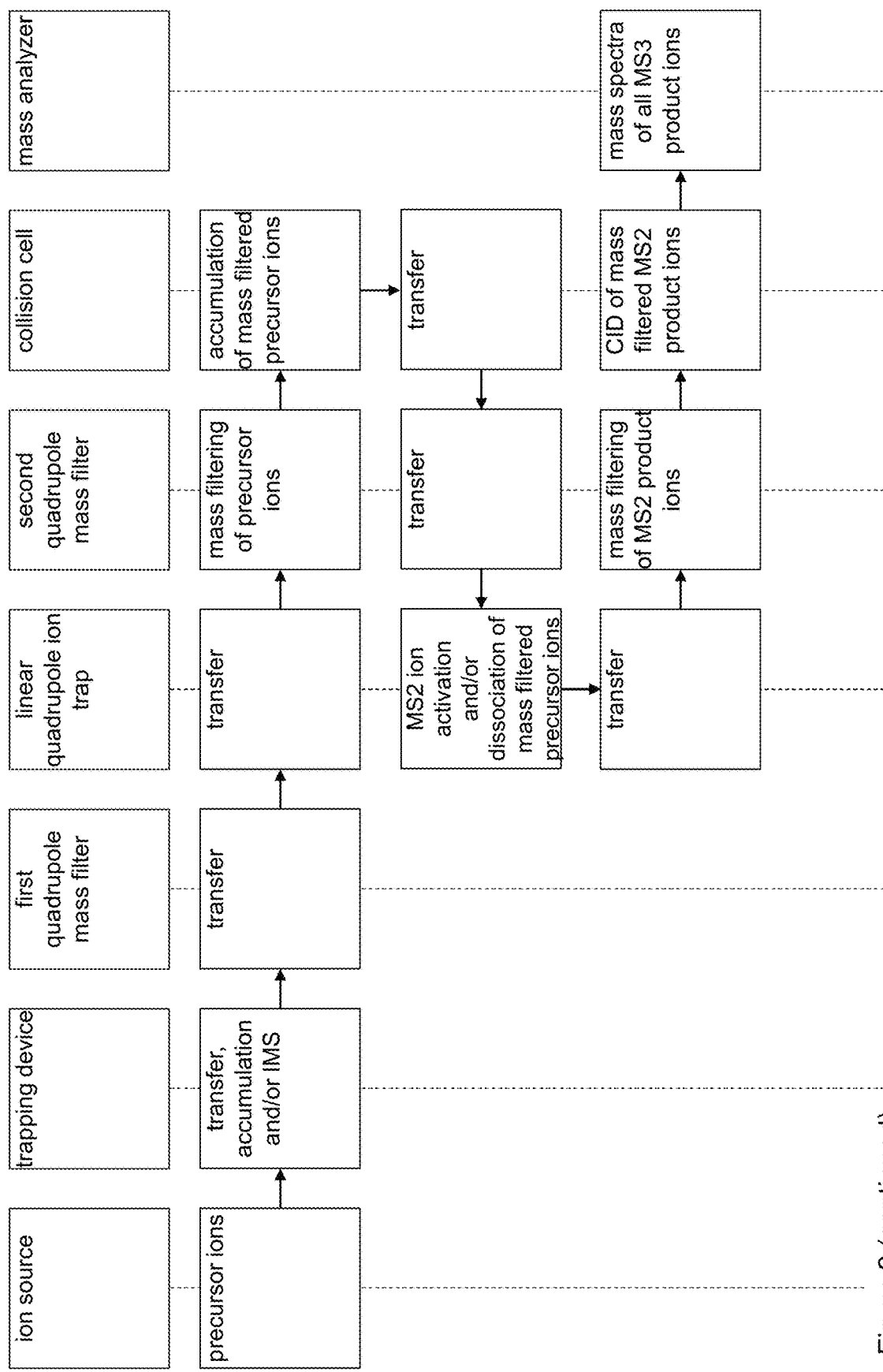
Figure 9:
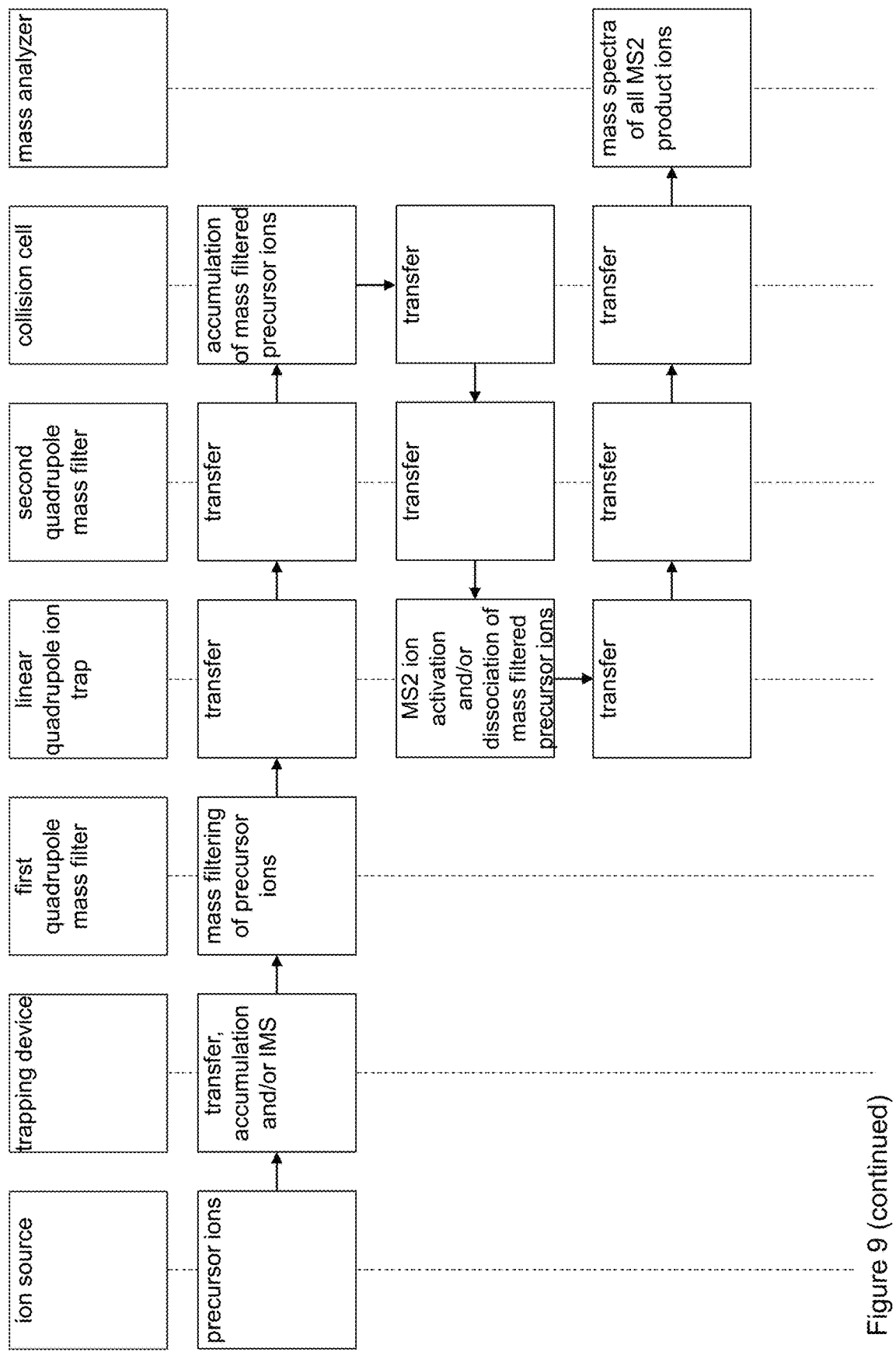
Figure 9:
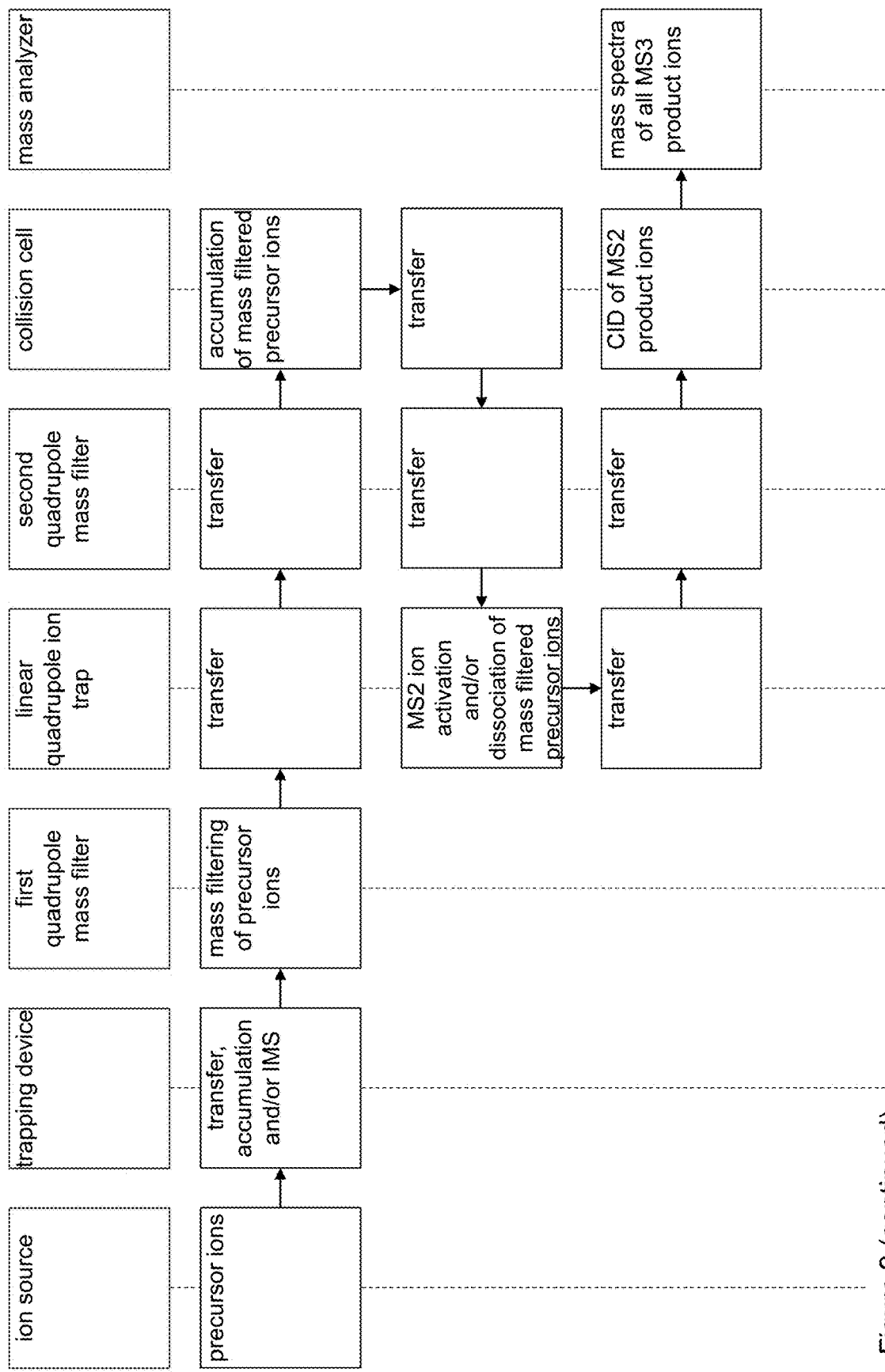
Figure 9:
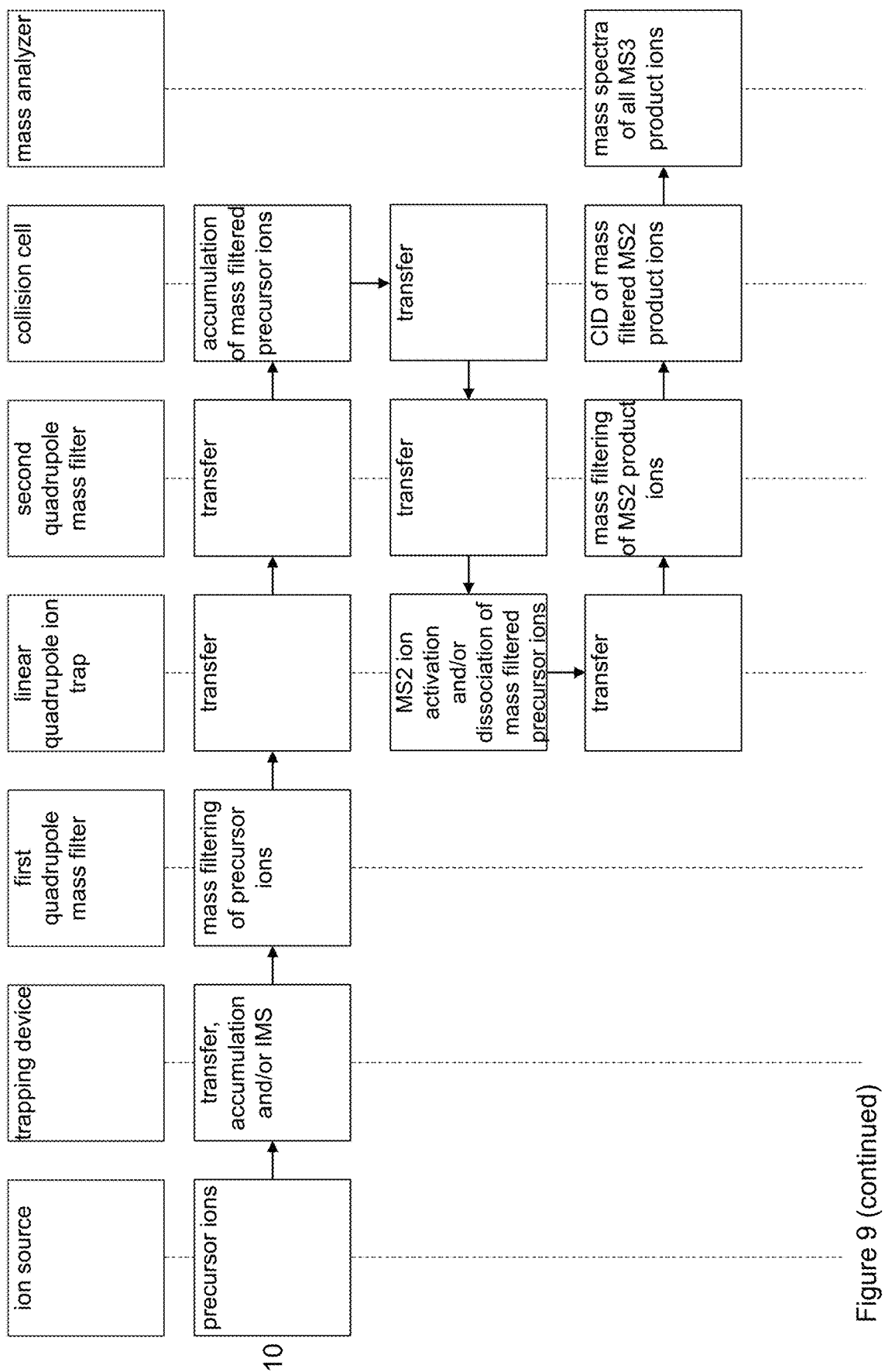
Figure 9:
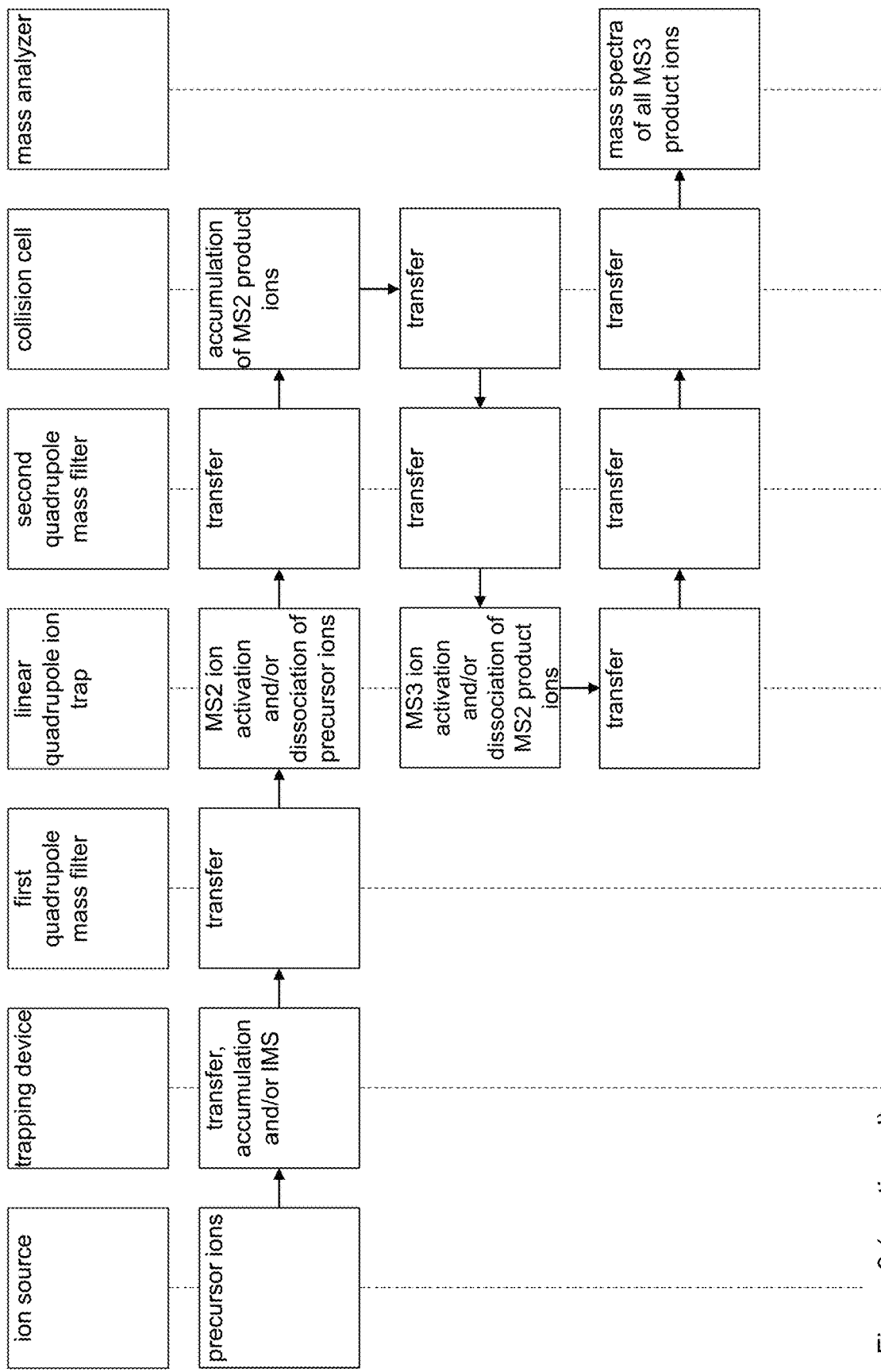
Figure 9:
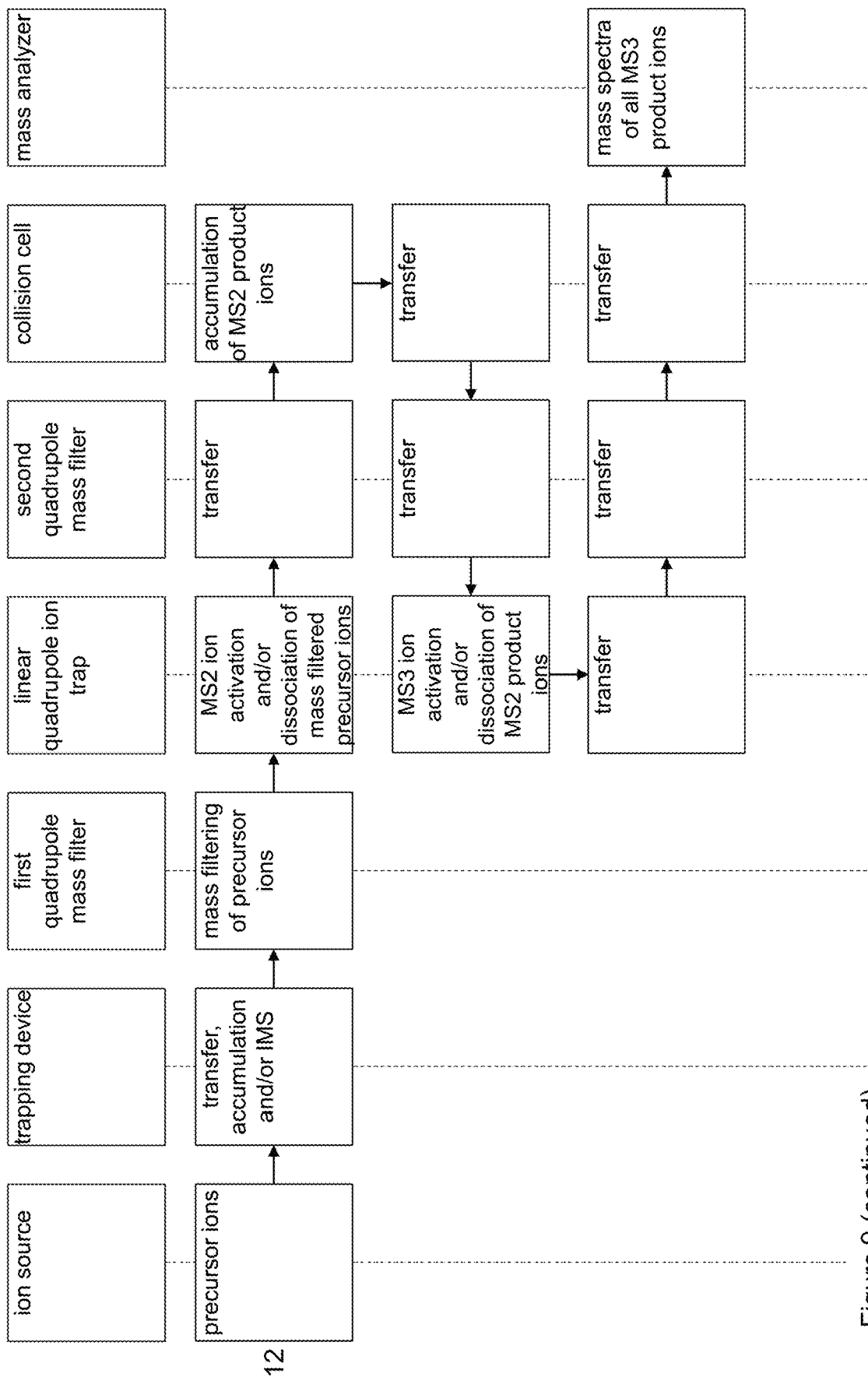
Figure 9:
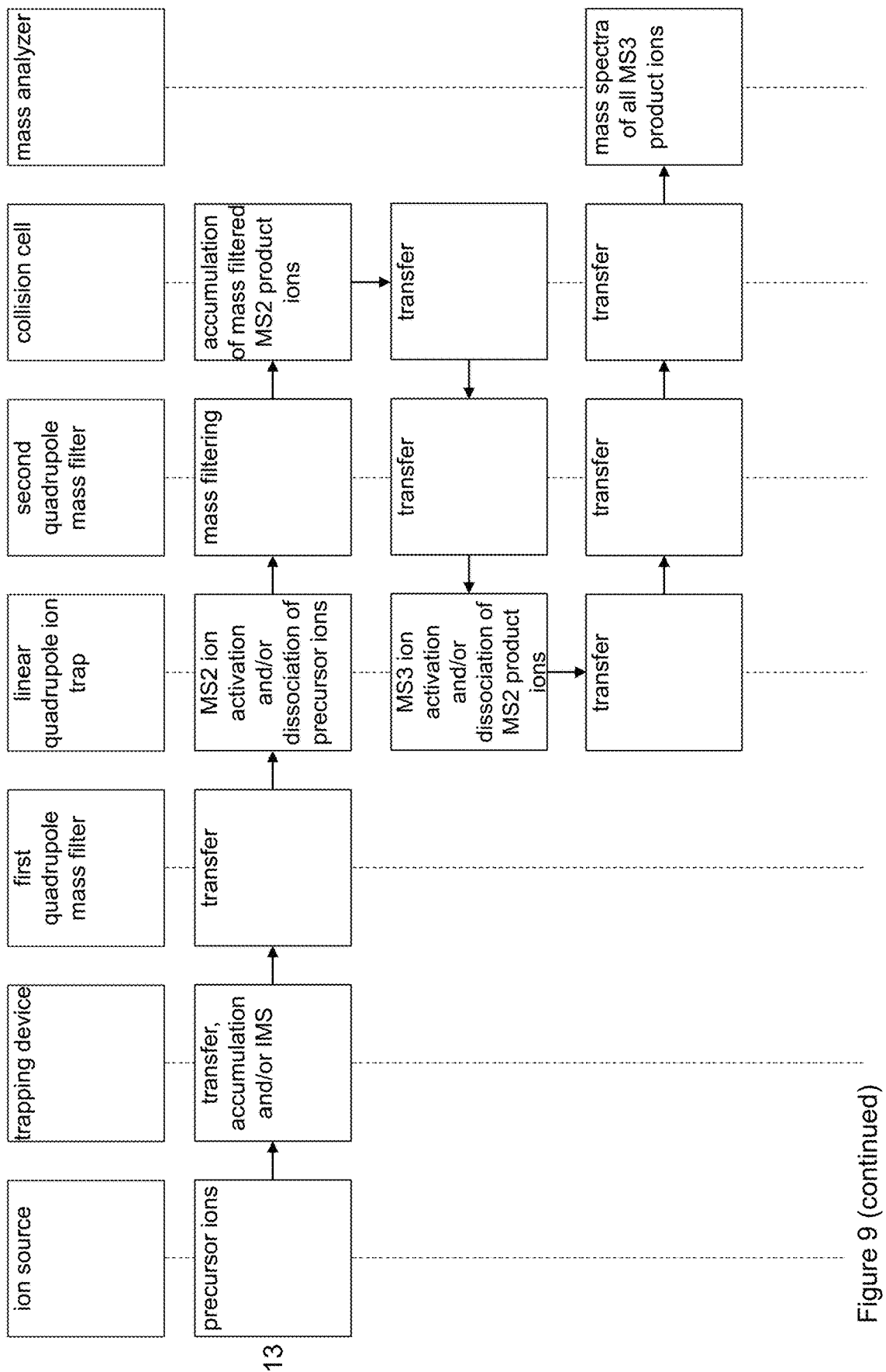
Figure 9:
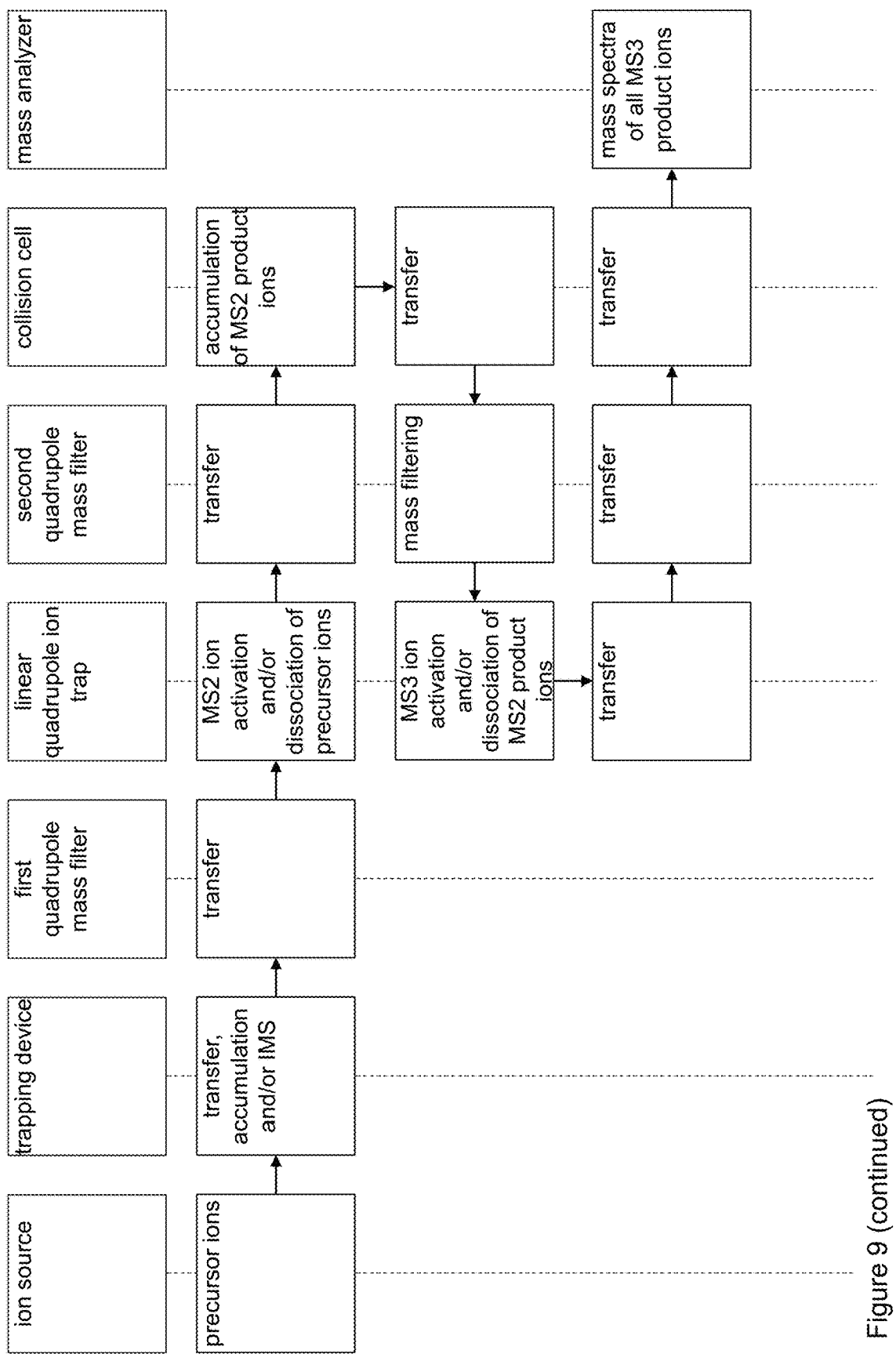
Figure 9:
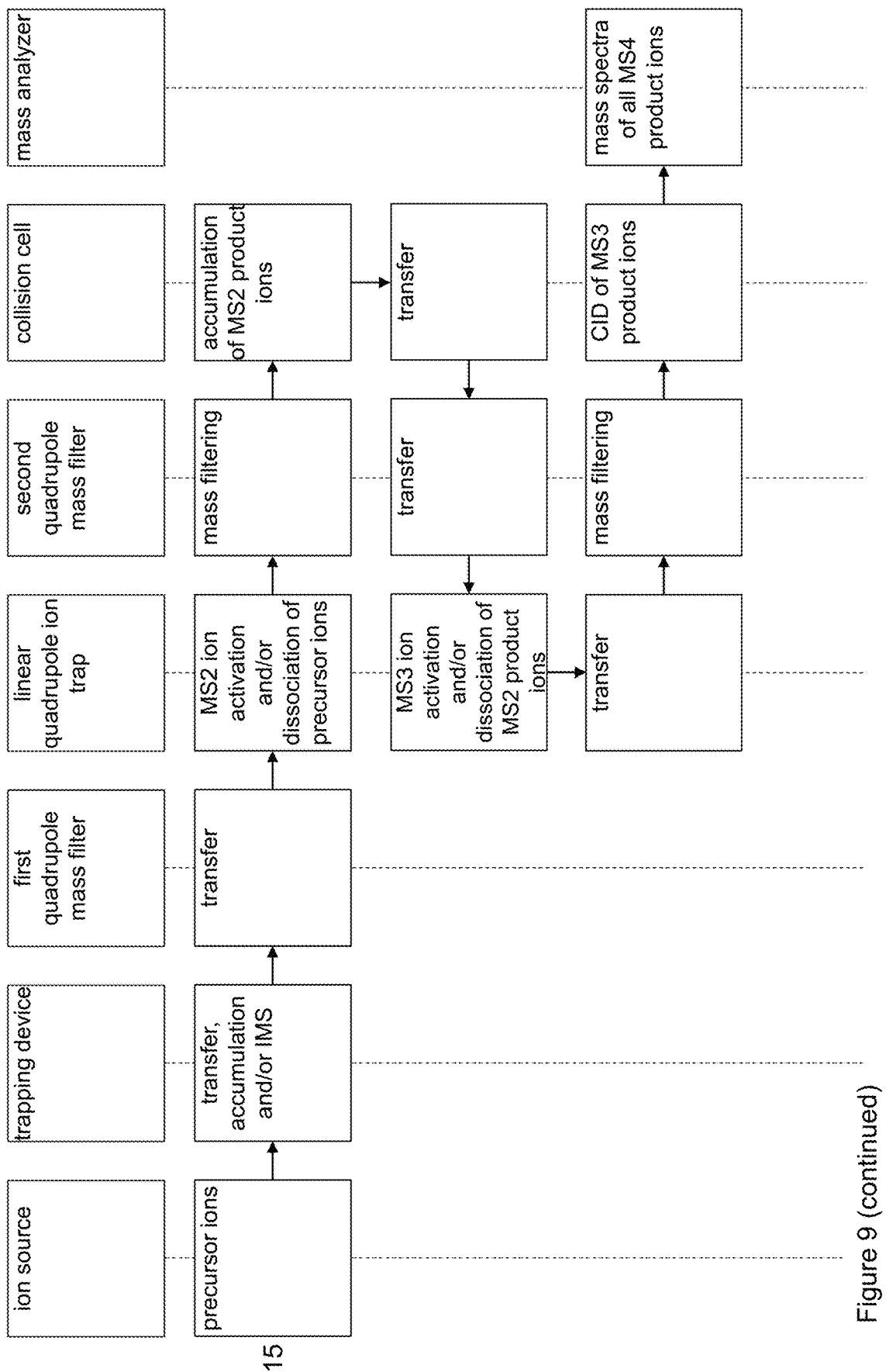
Figure 9:
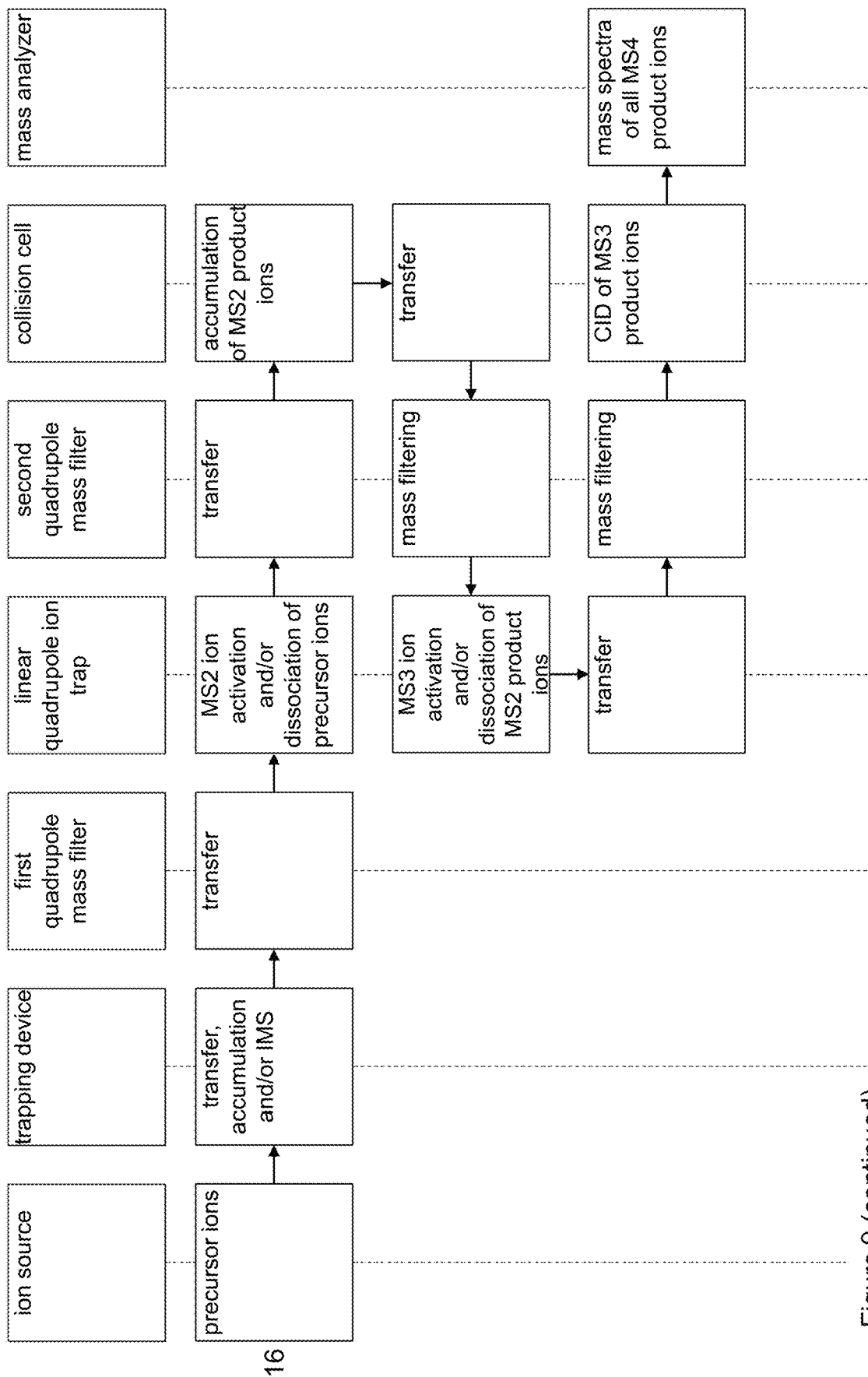
Figure 9:
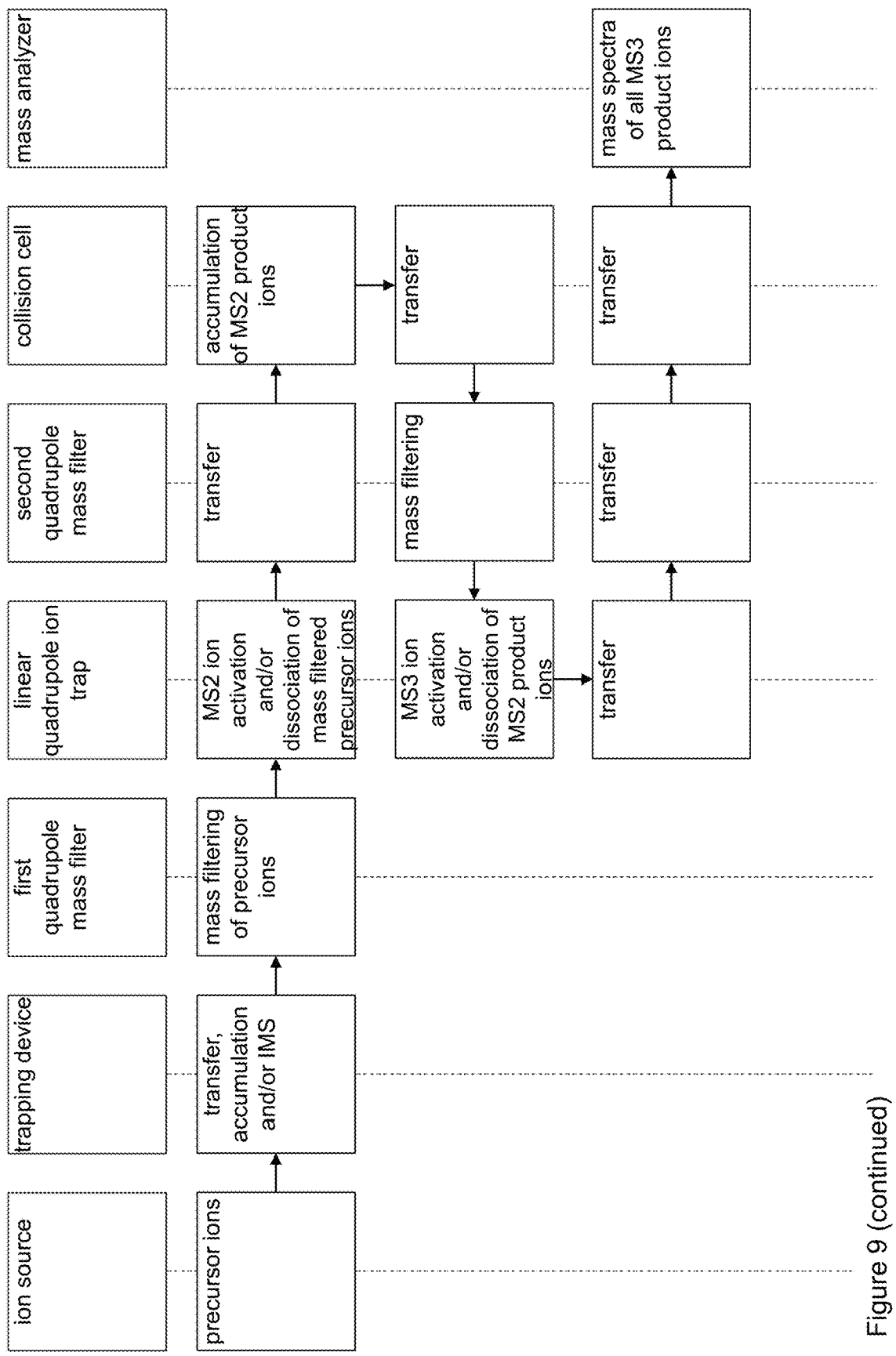
Figure 9:
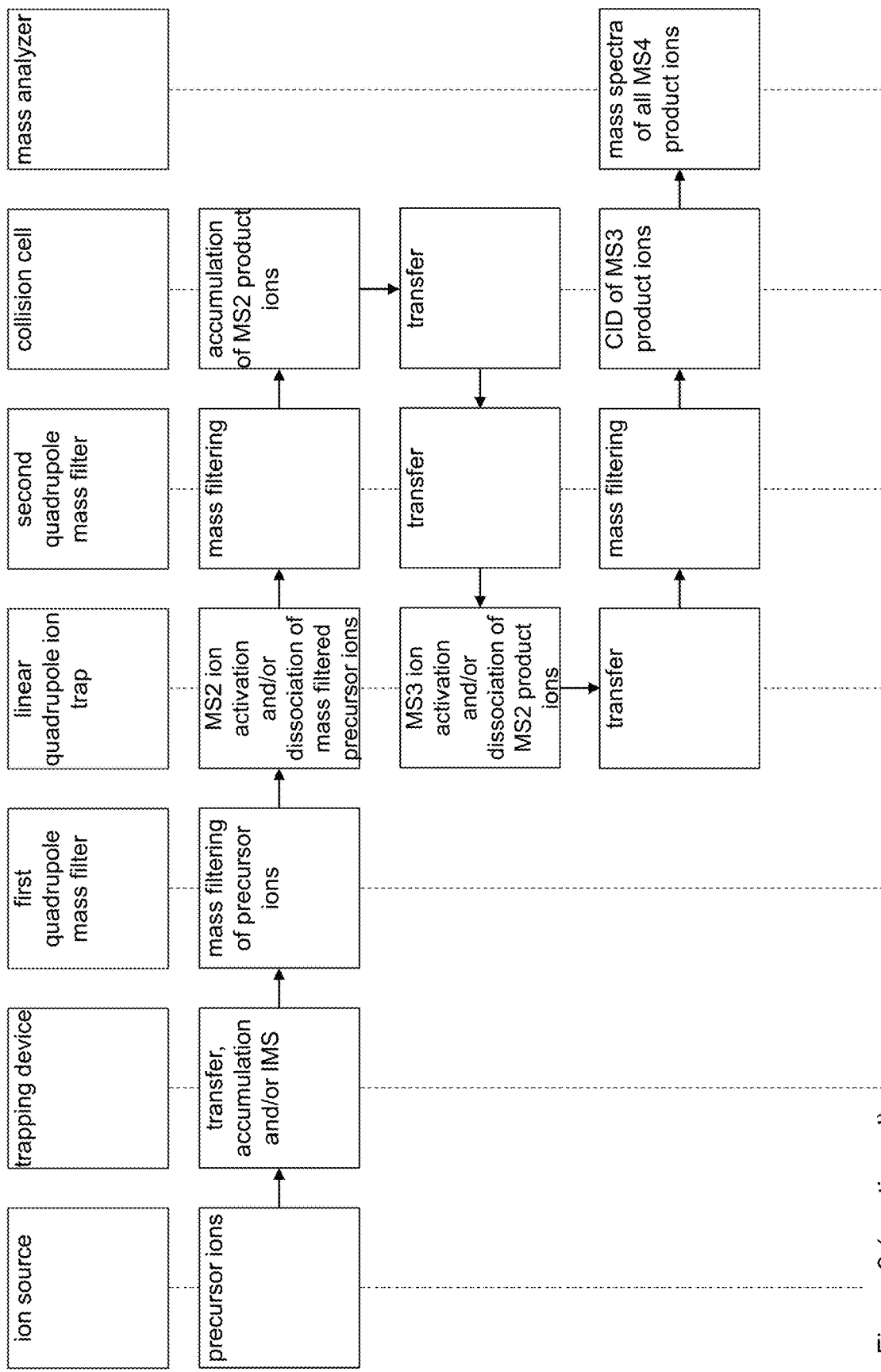
Figure 9:
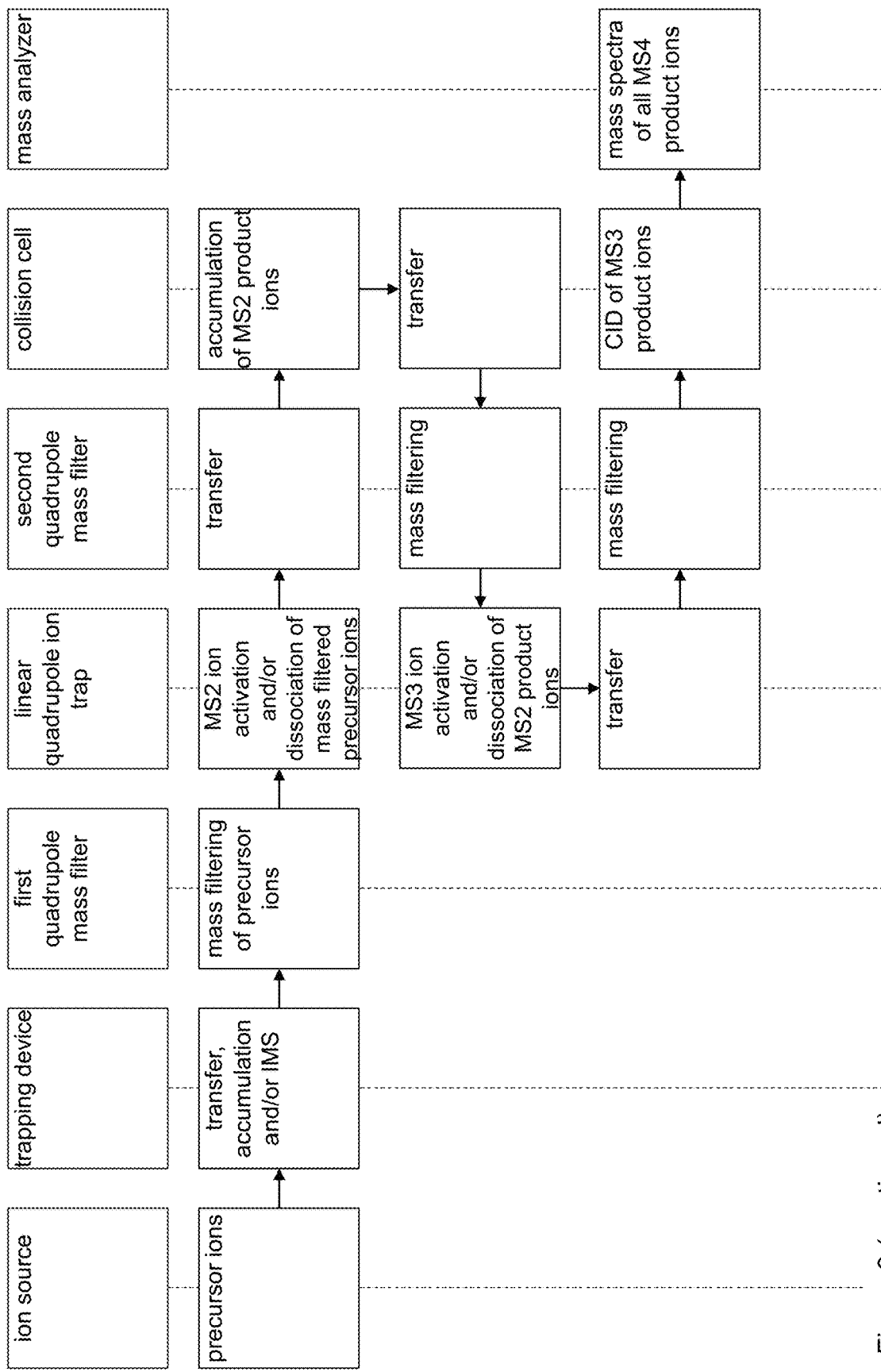
Figure 9:
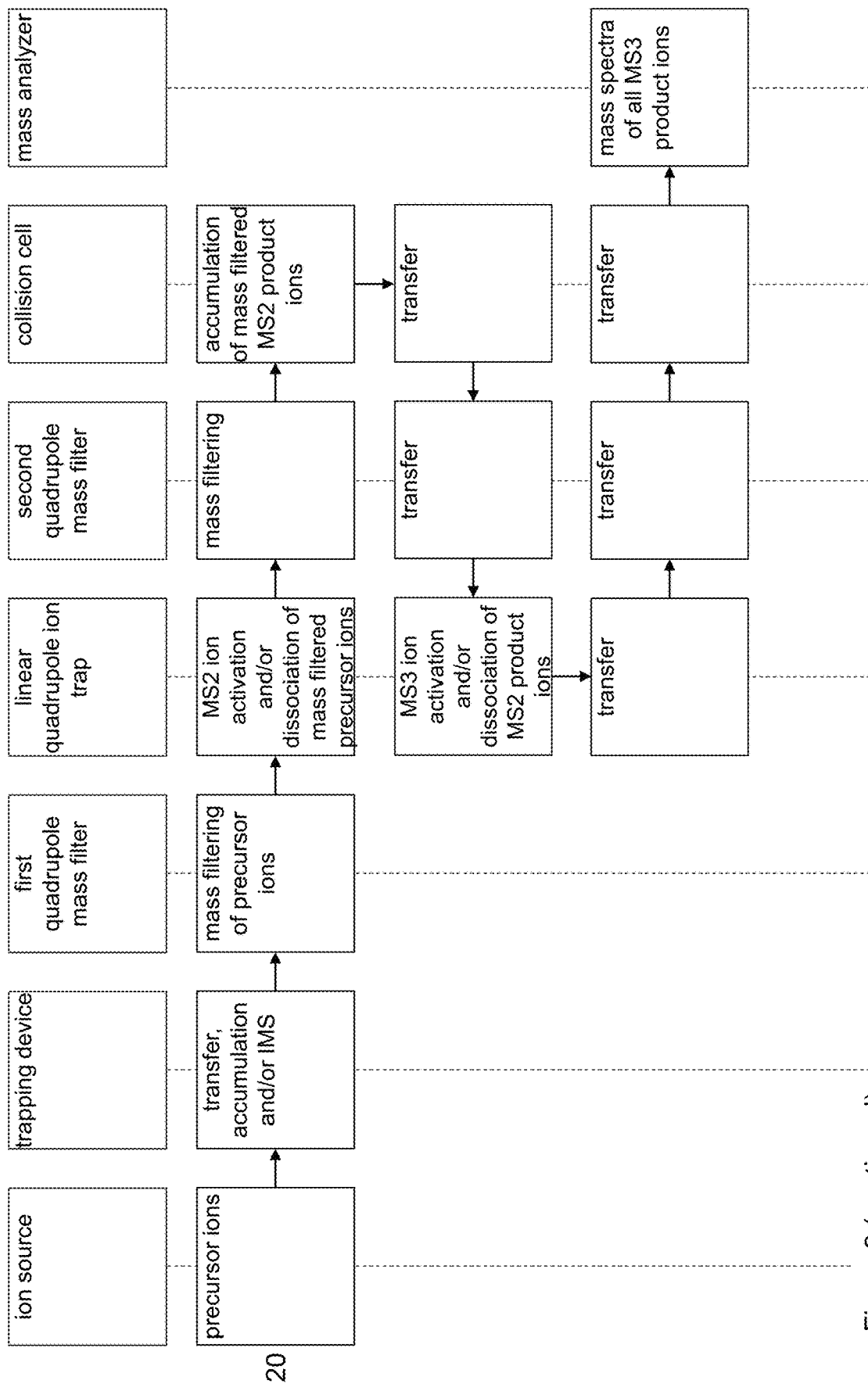
Figure 9:
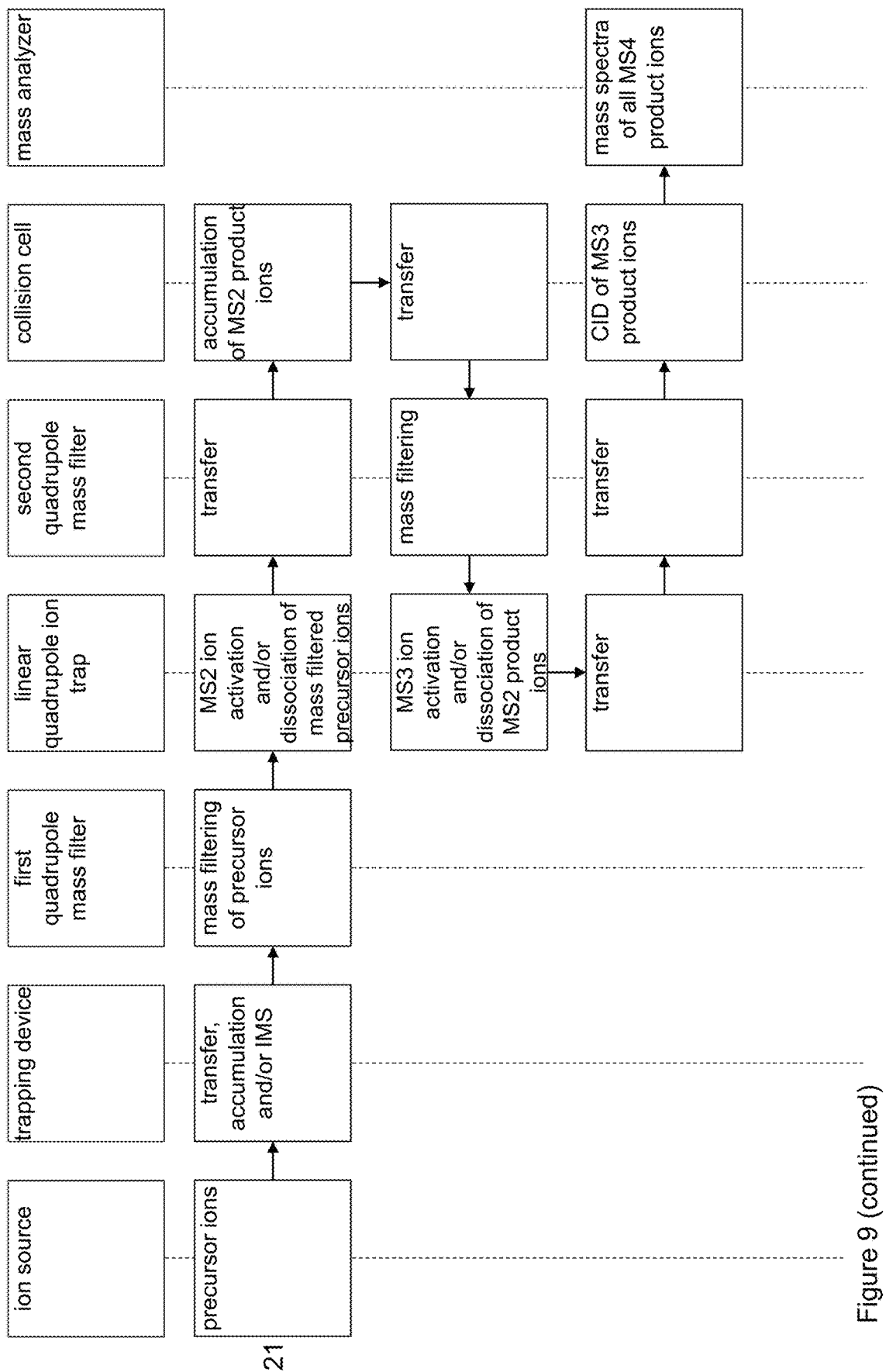
Figure 9:
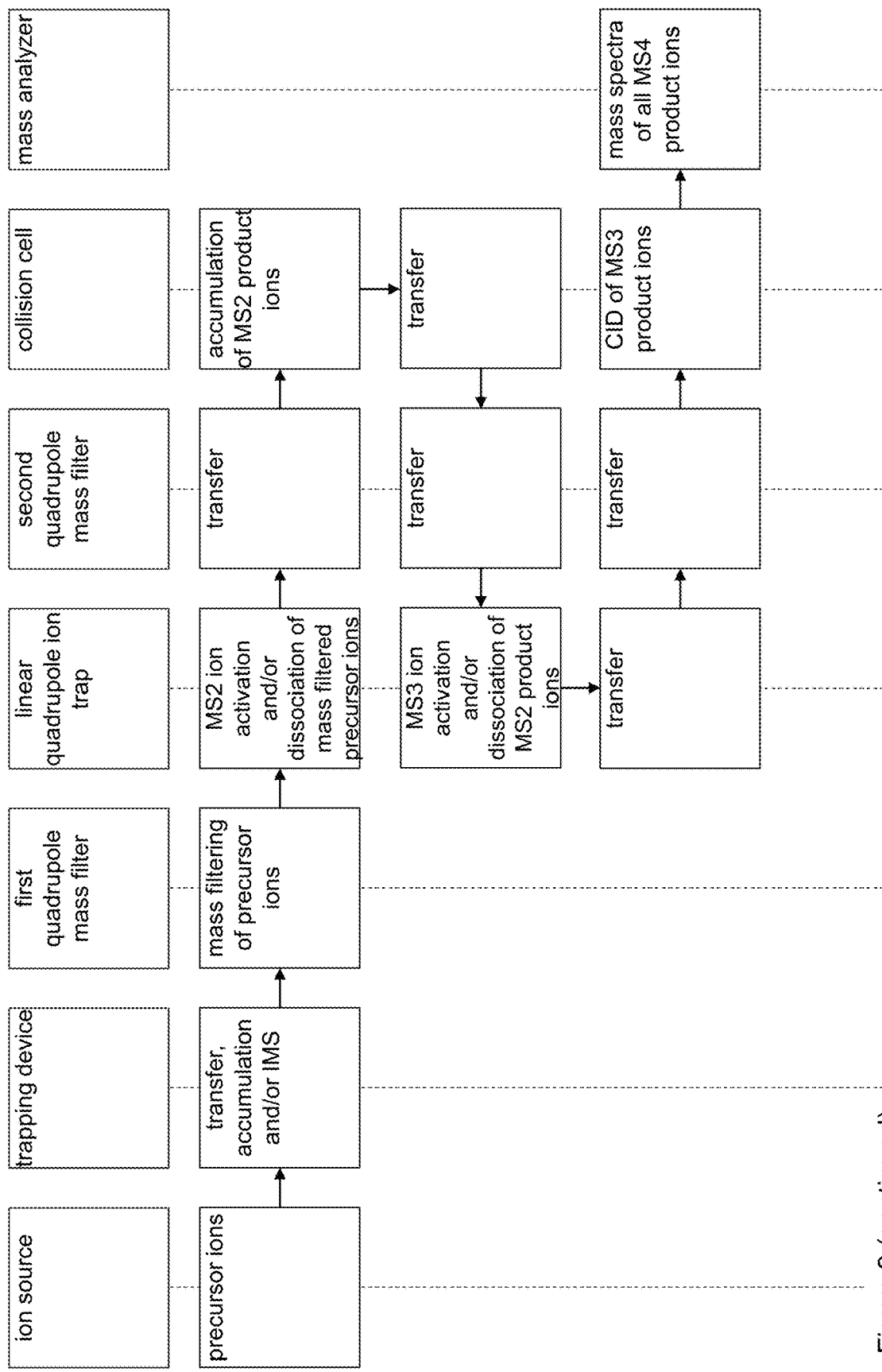
Figure 9:
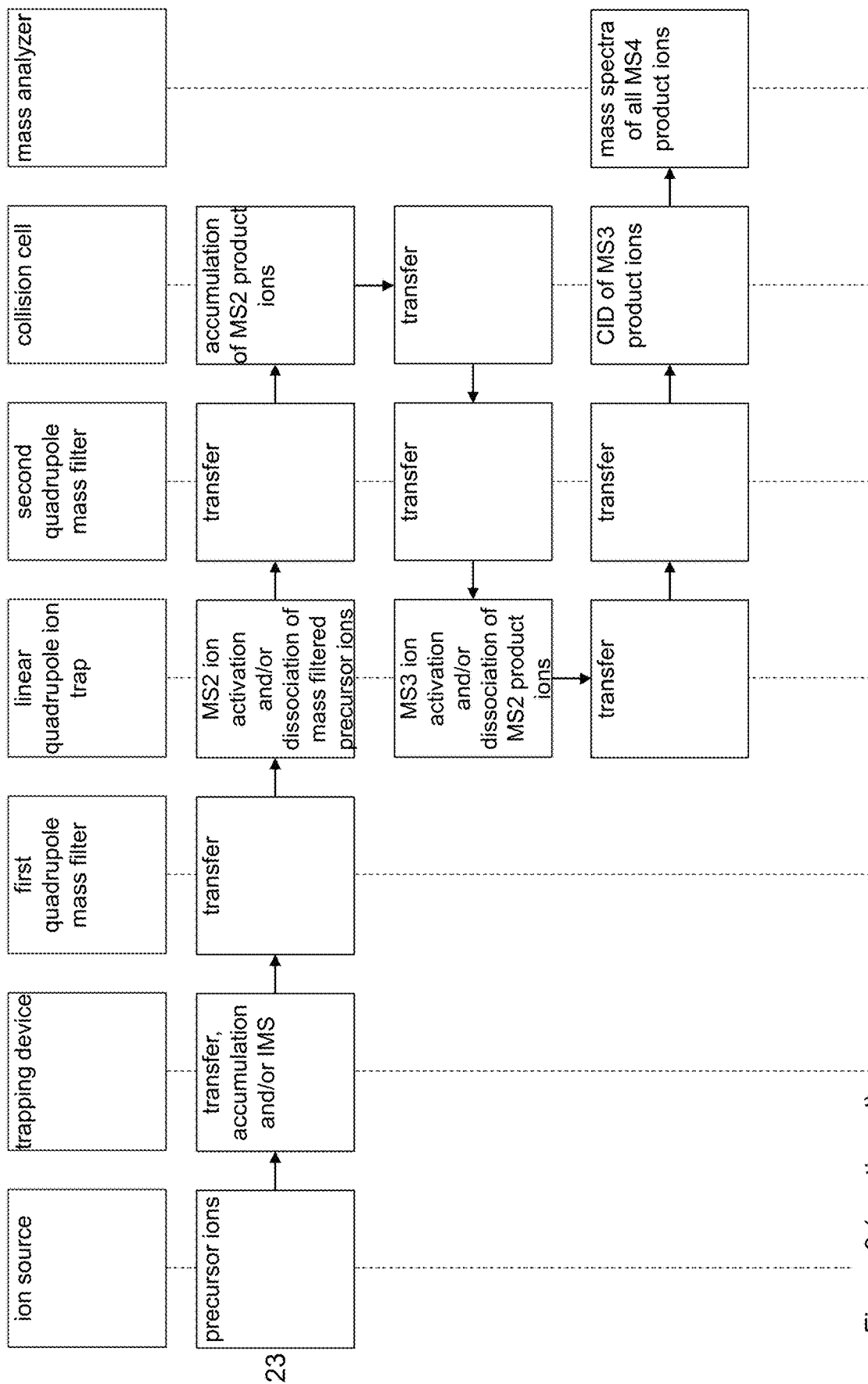
Figure 9:
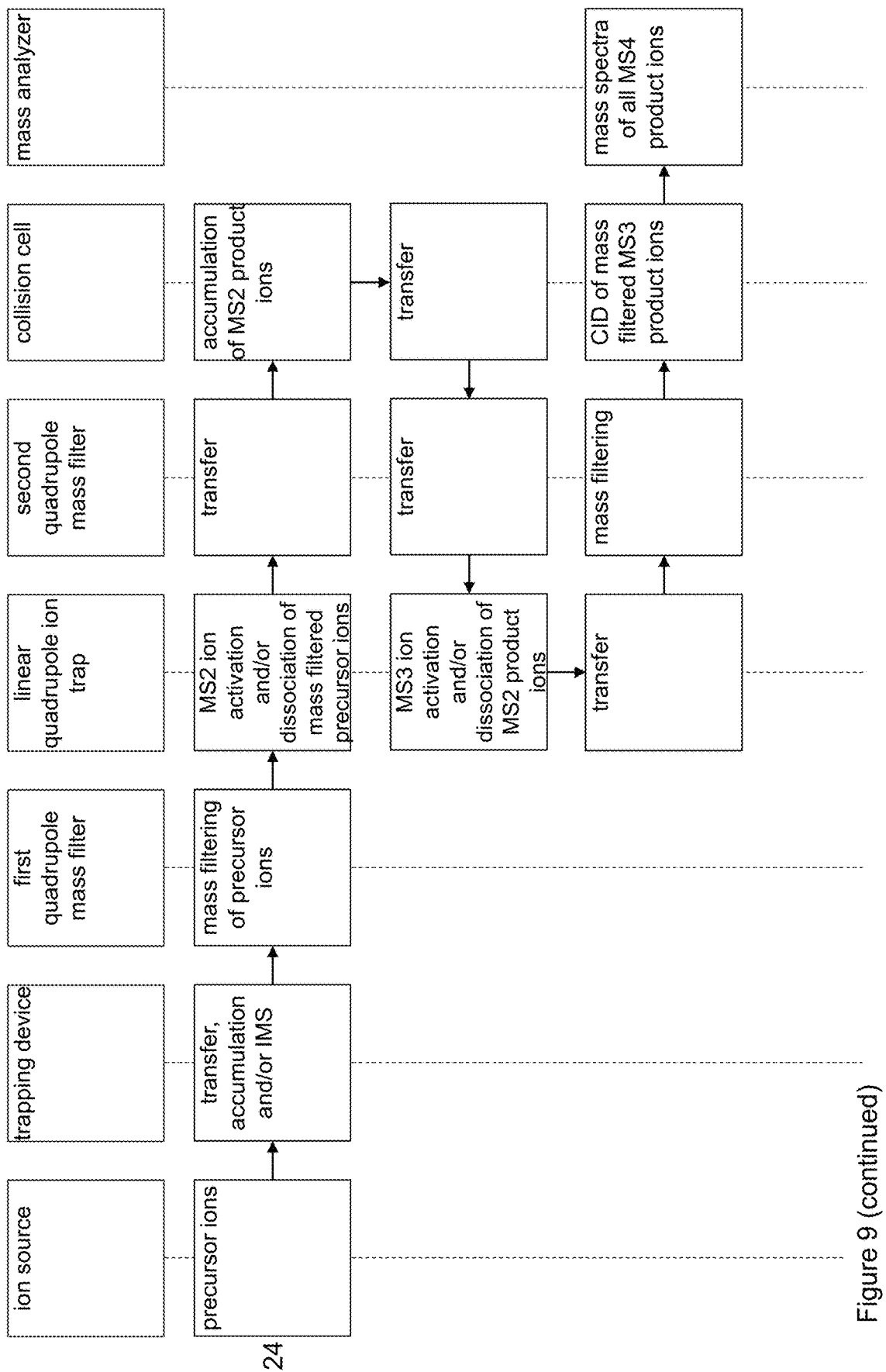
Figure 9:
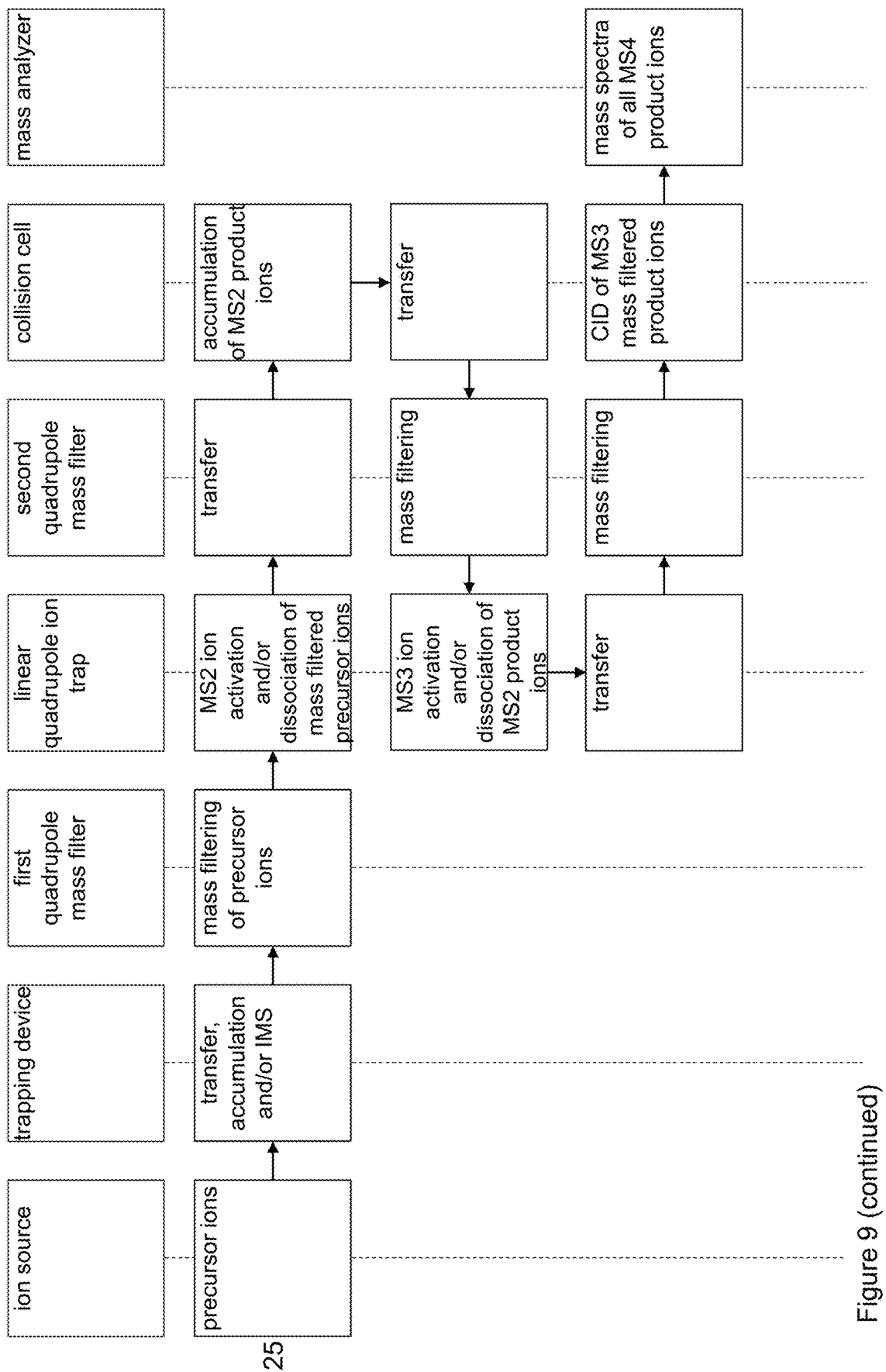
Figure 9:
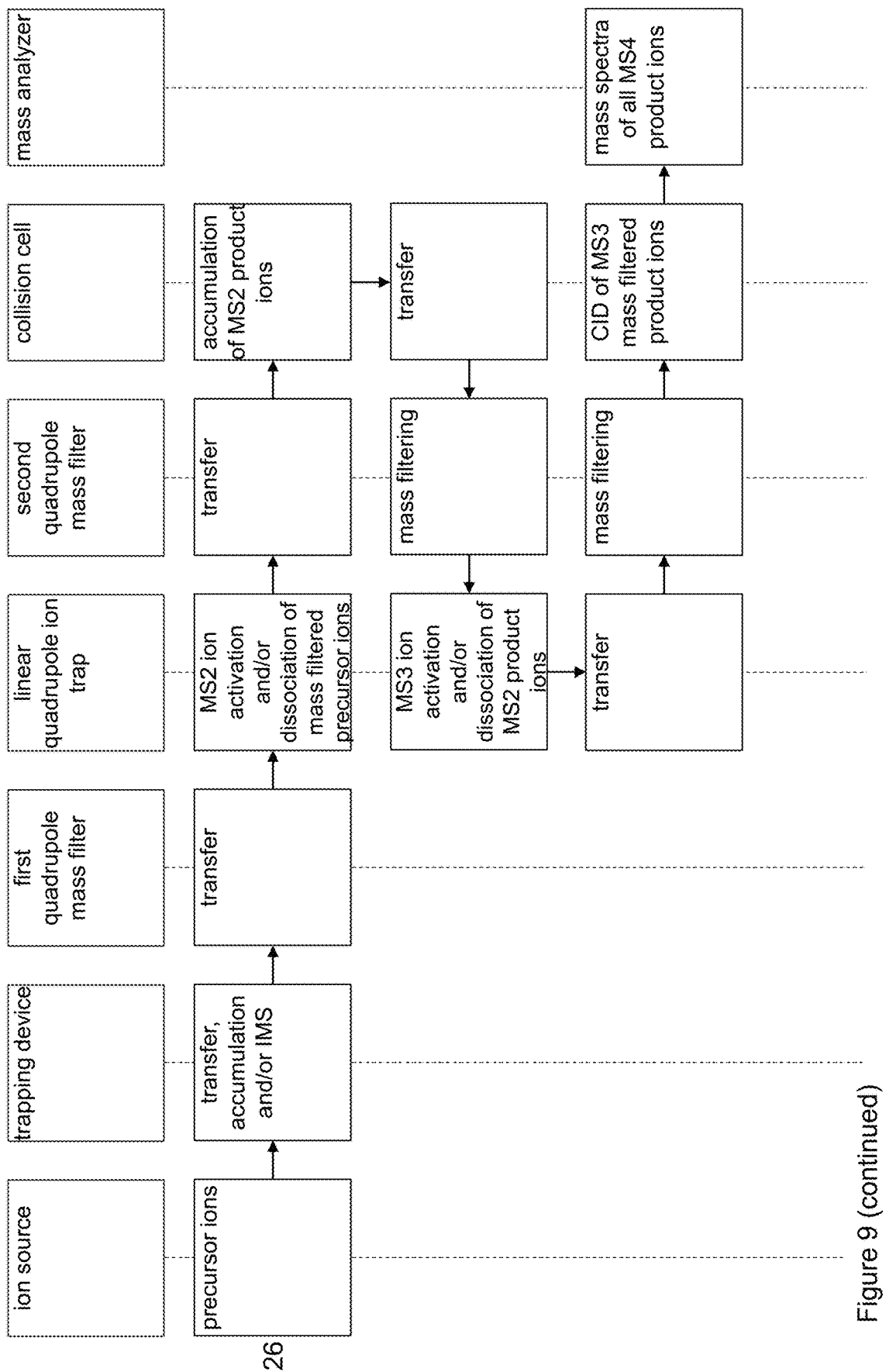
Figure 9:
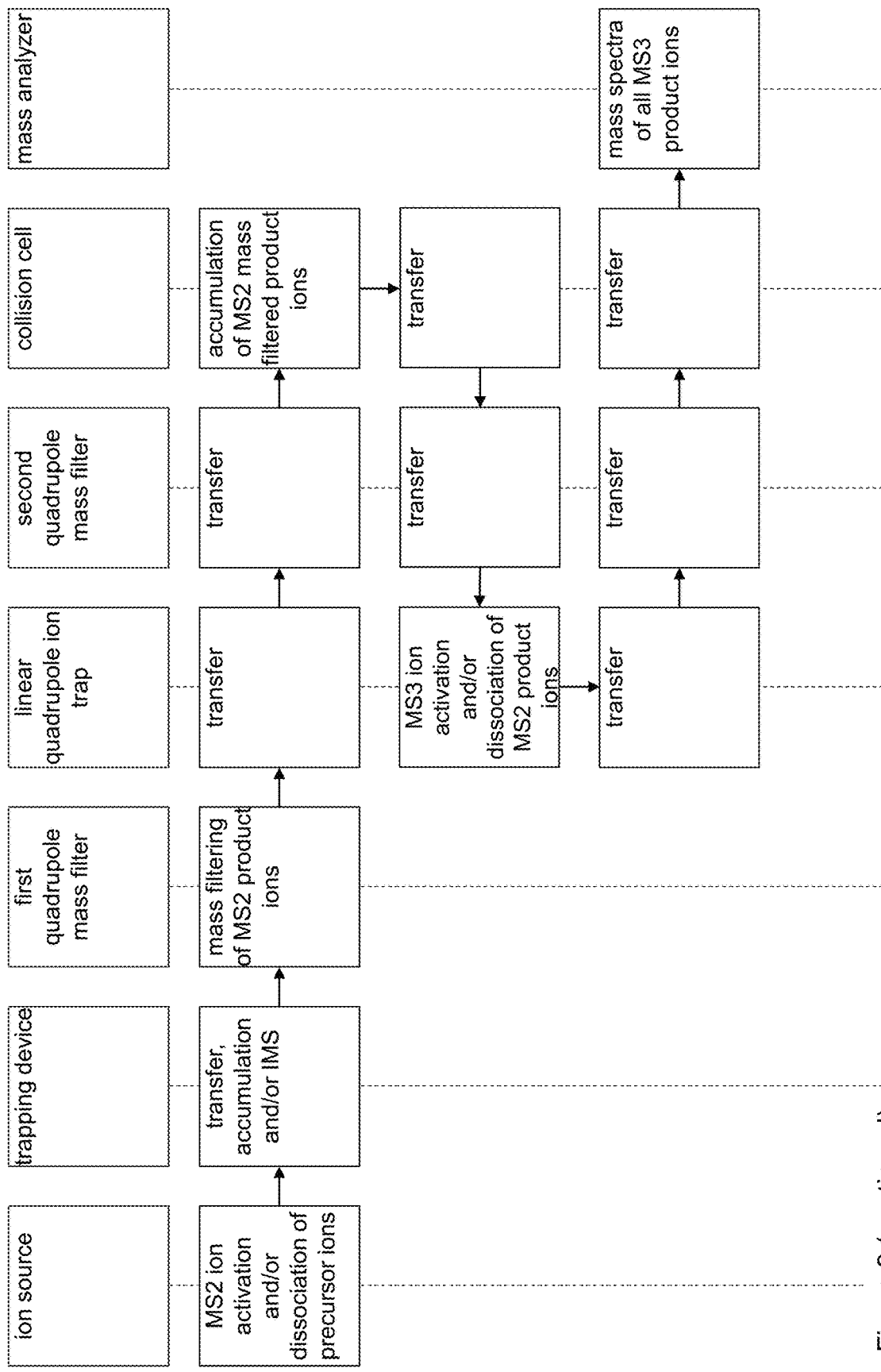
Figure 9:
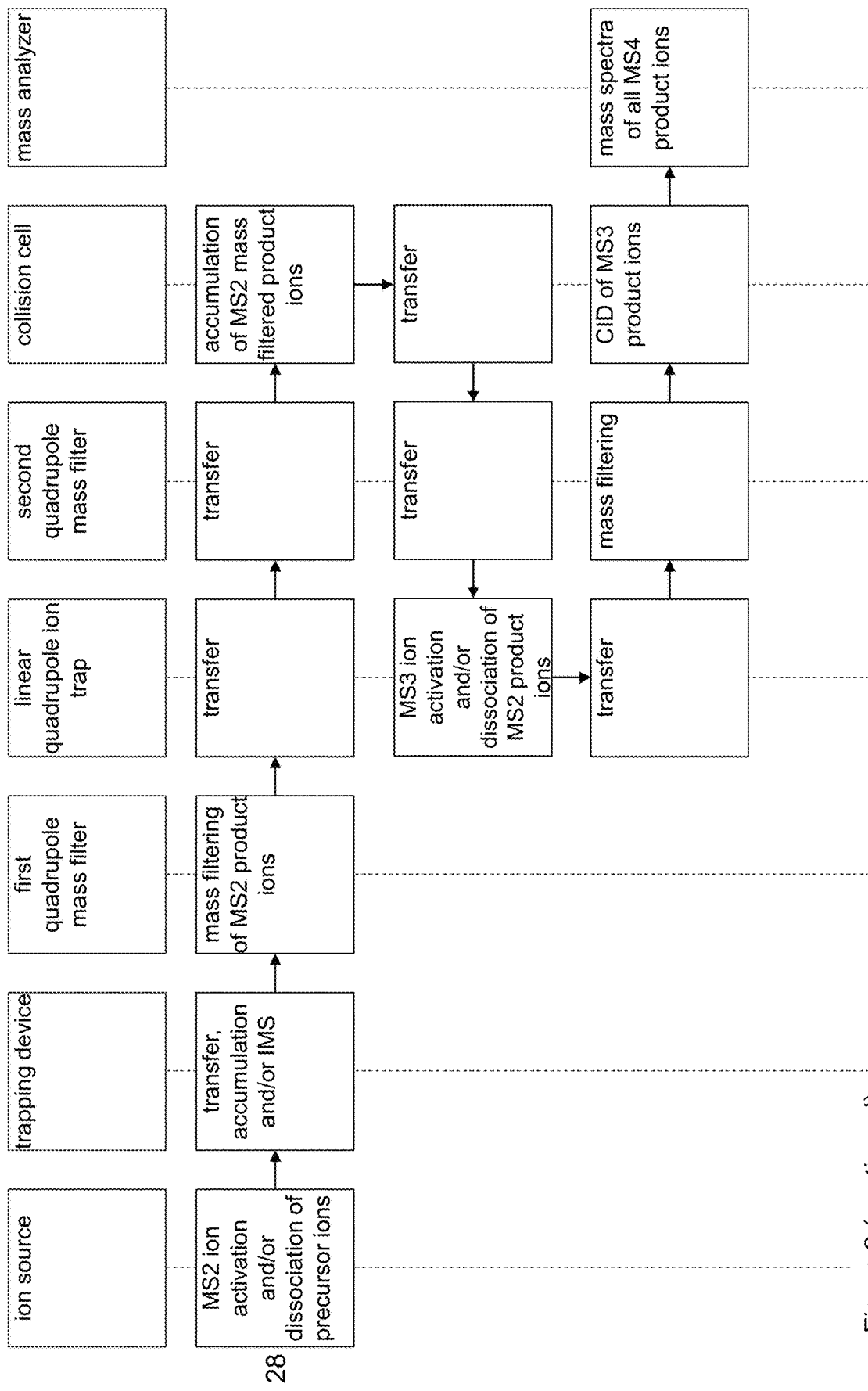
Figure 9:
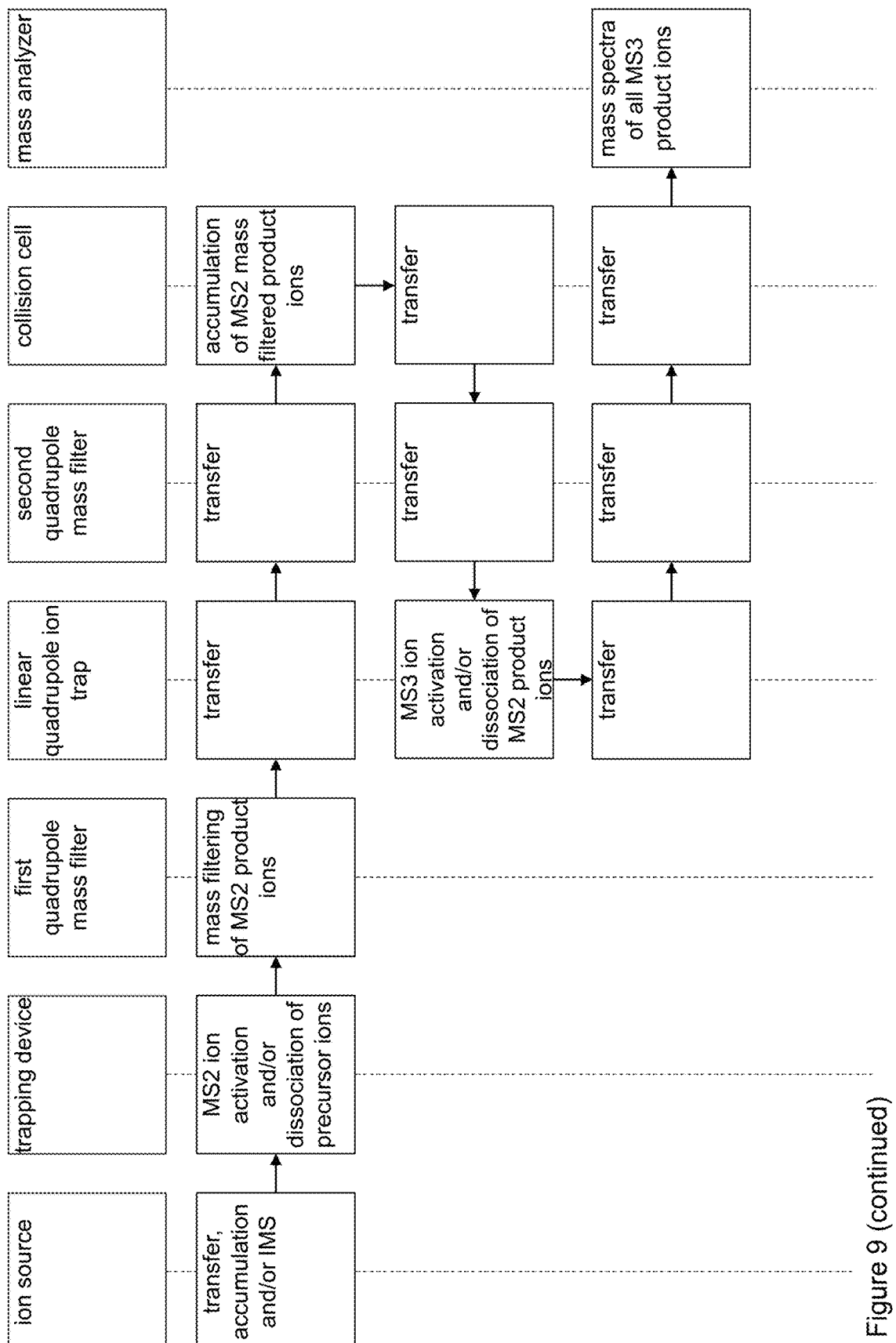
Figure 9:
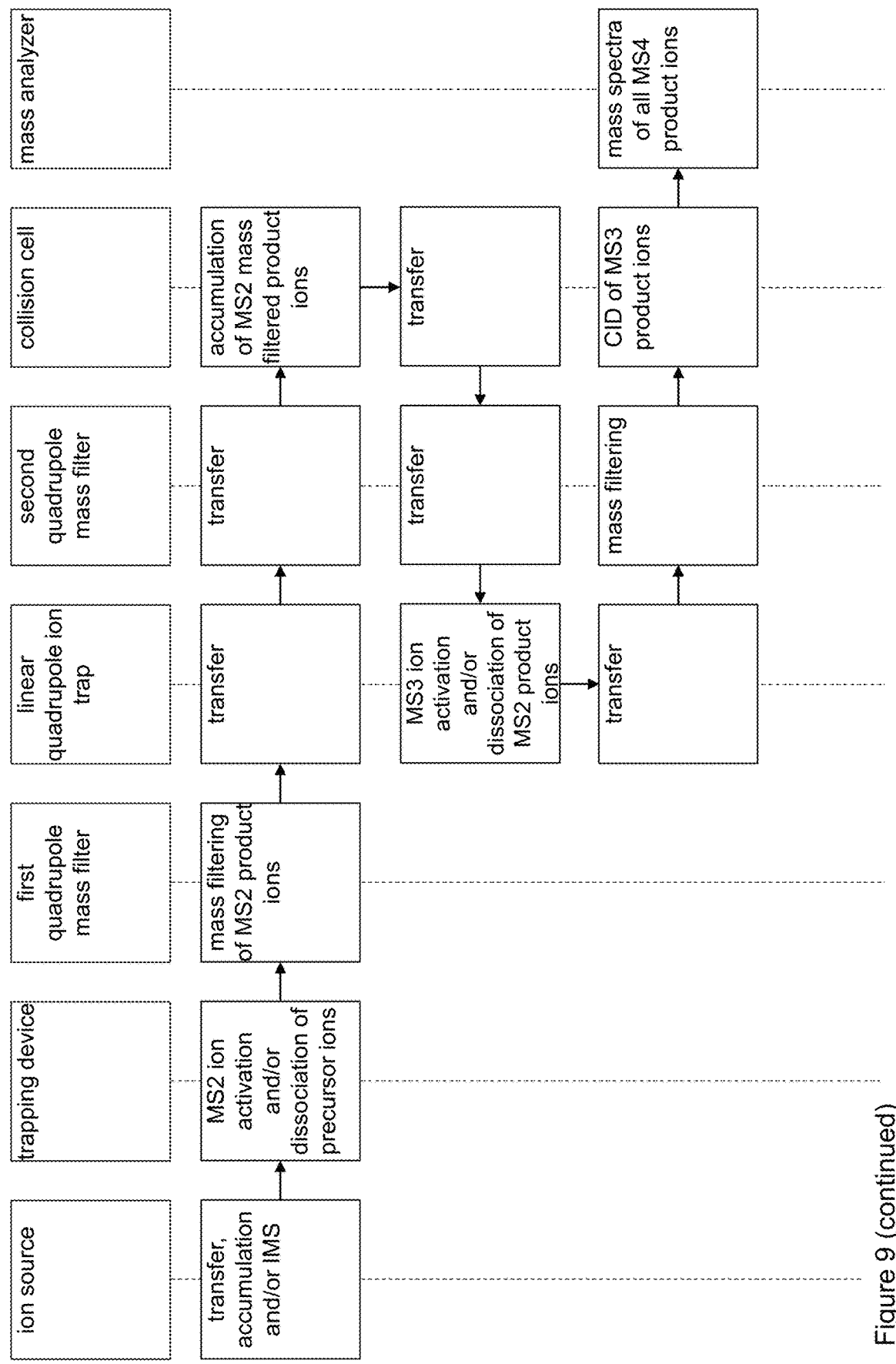
Figure 9:
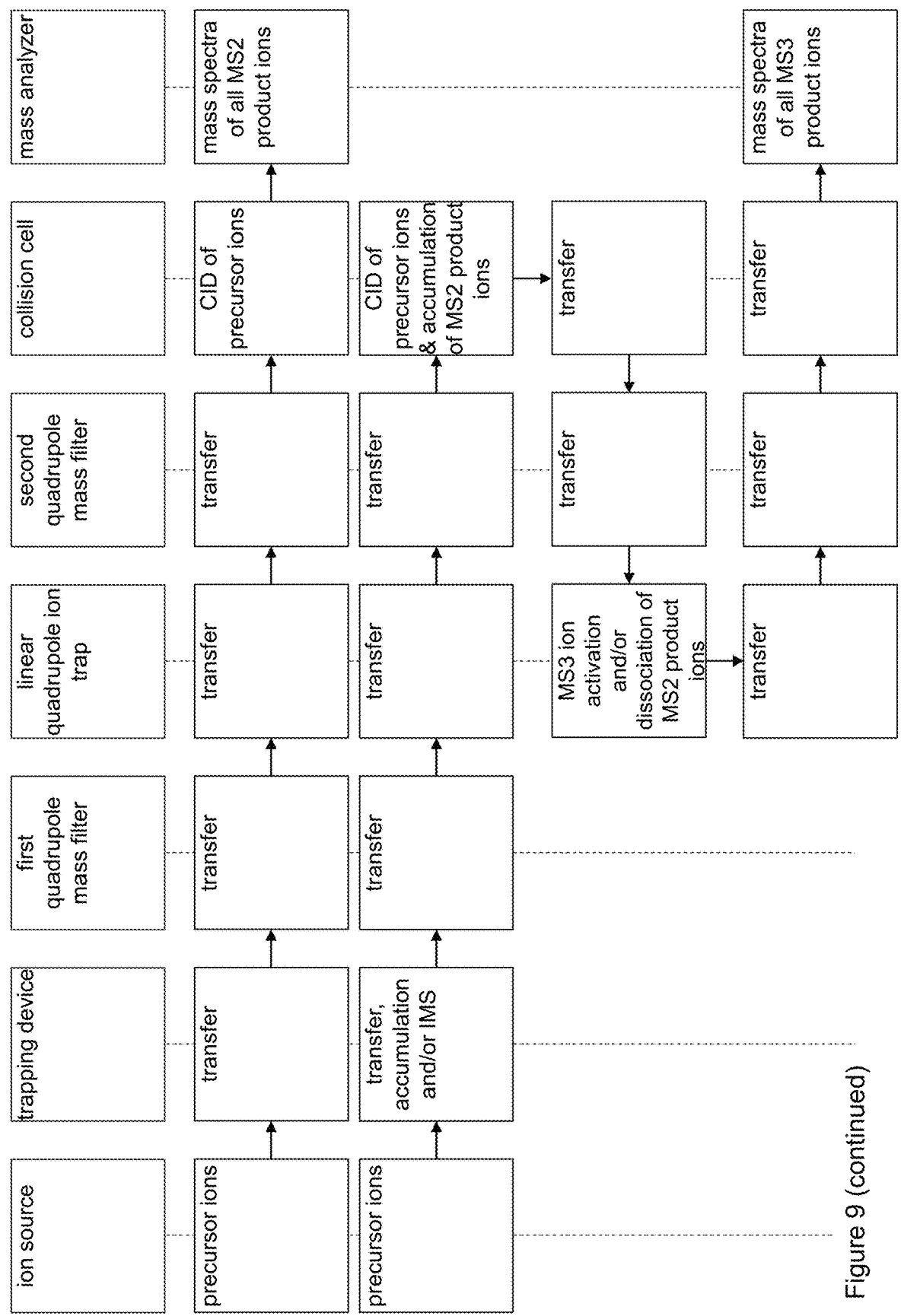
Figure 9:
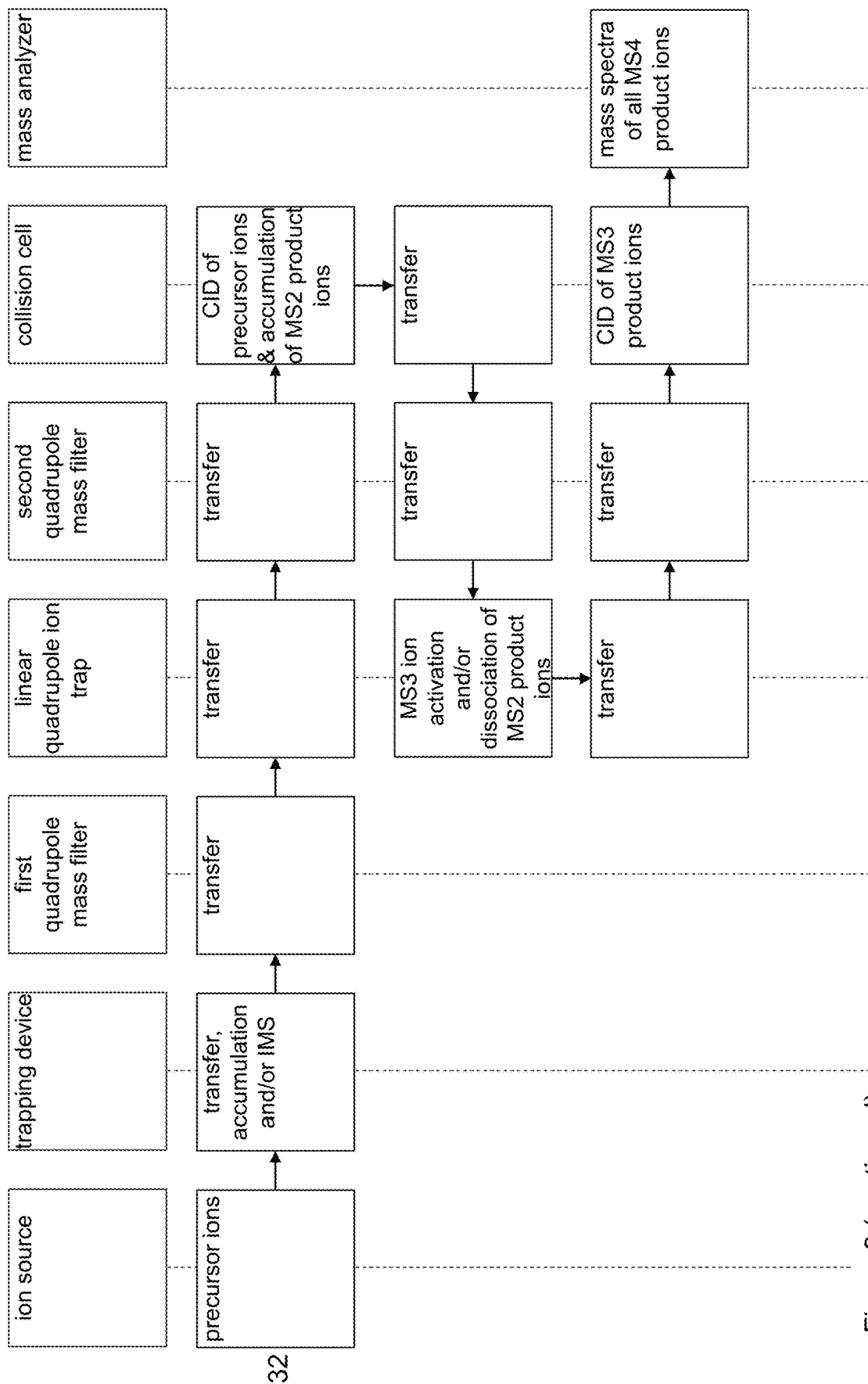
Figure 9:
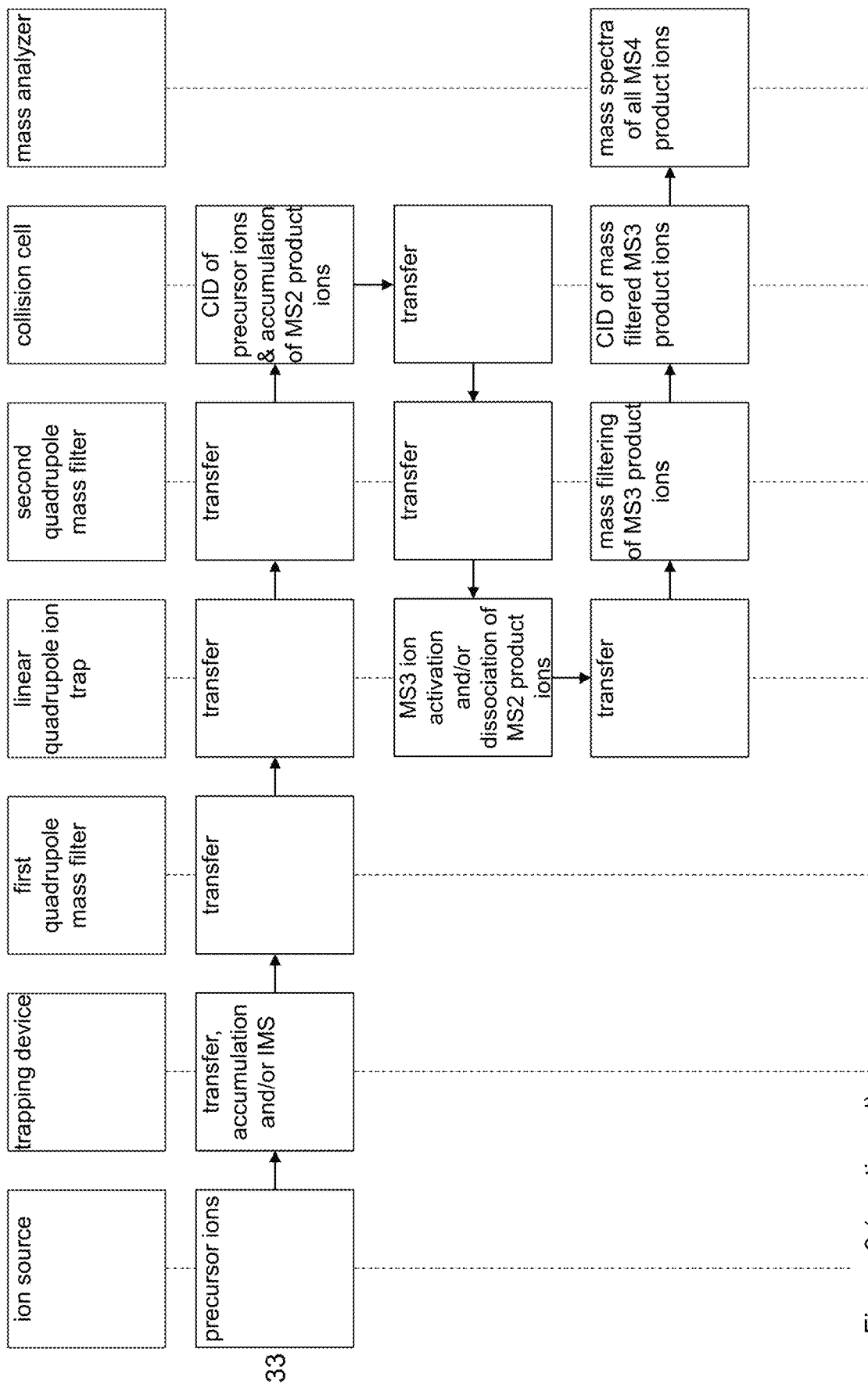
Figure 9:
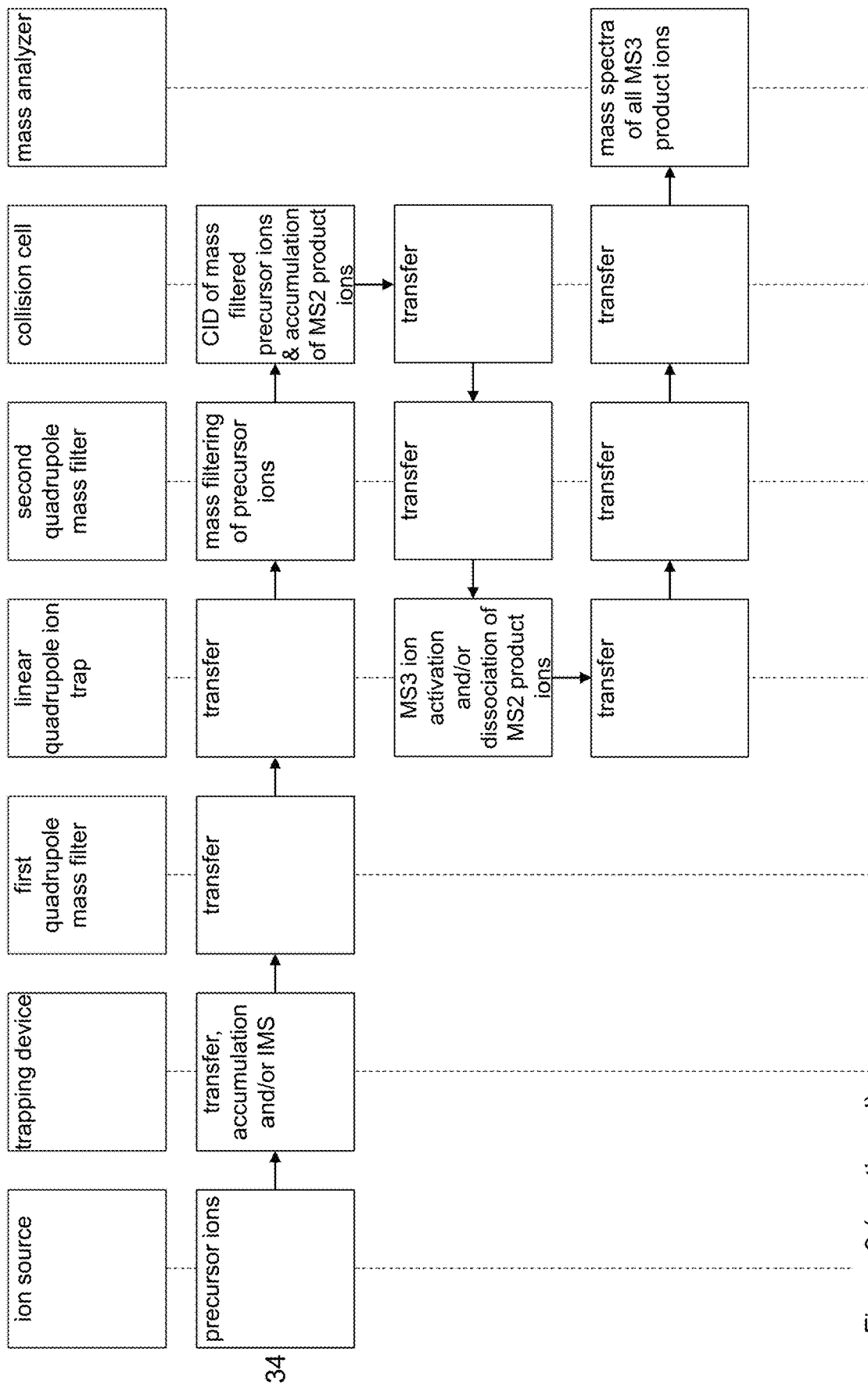
Figure 9:
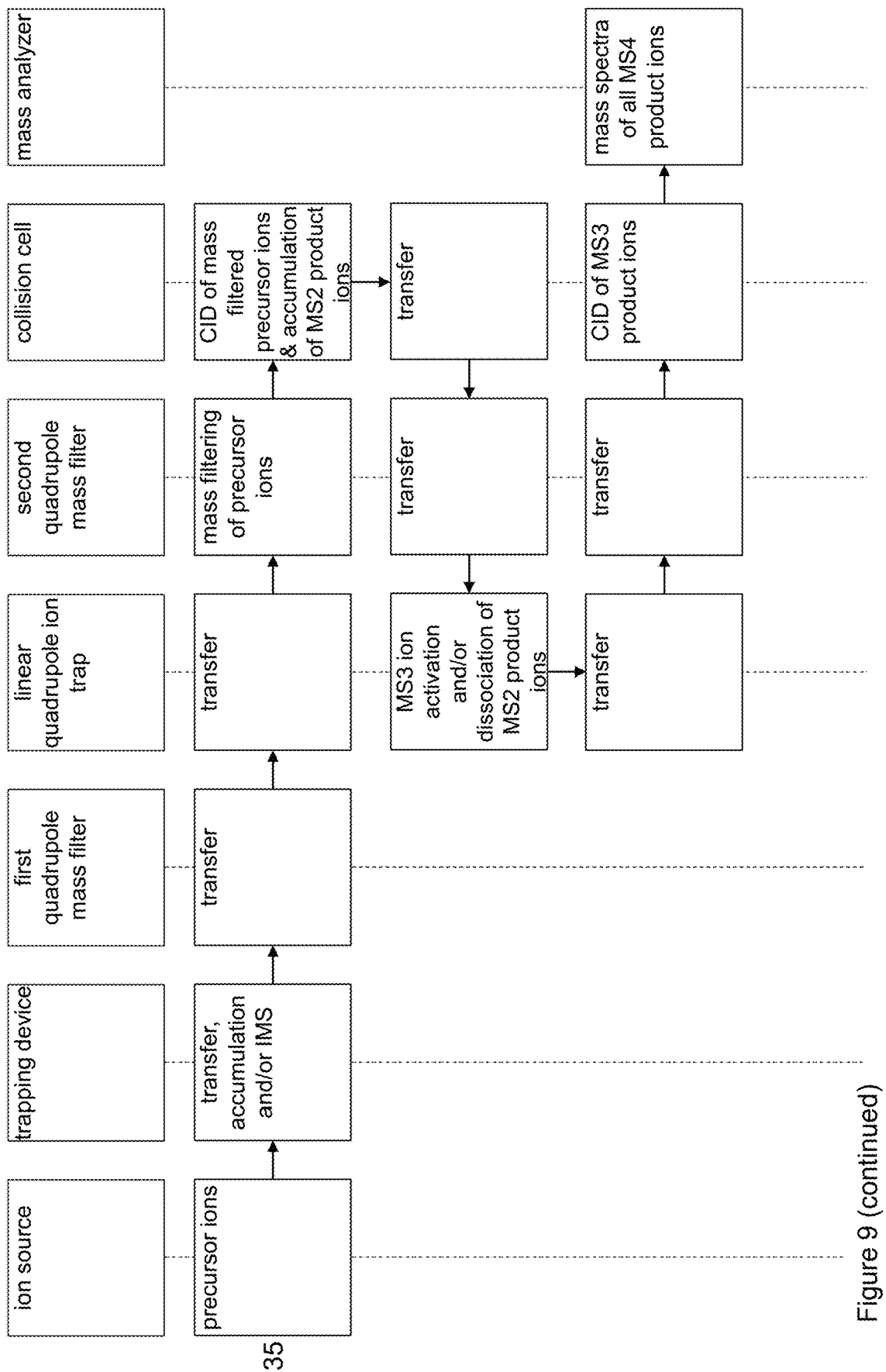
Figure 9:
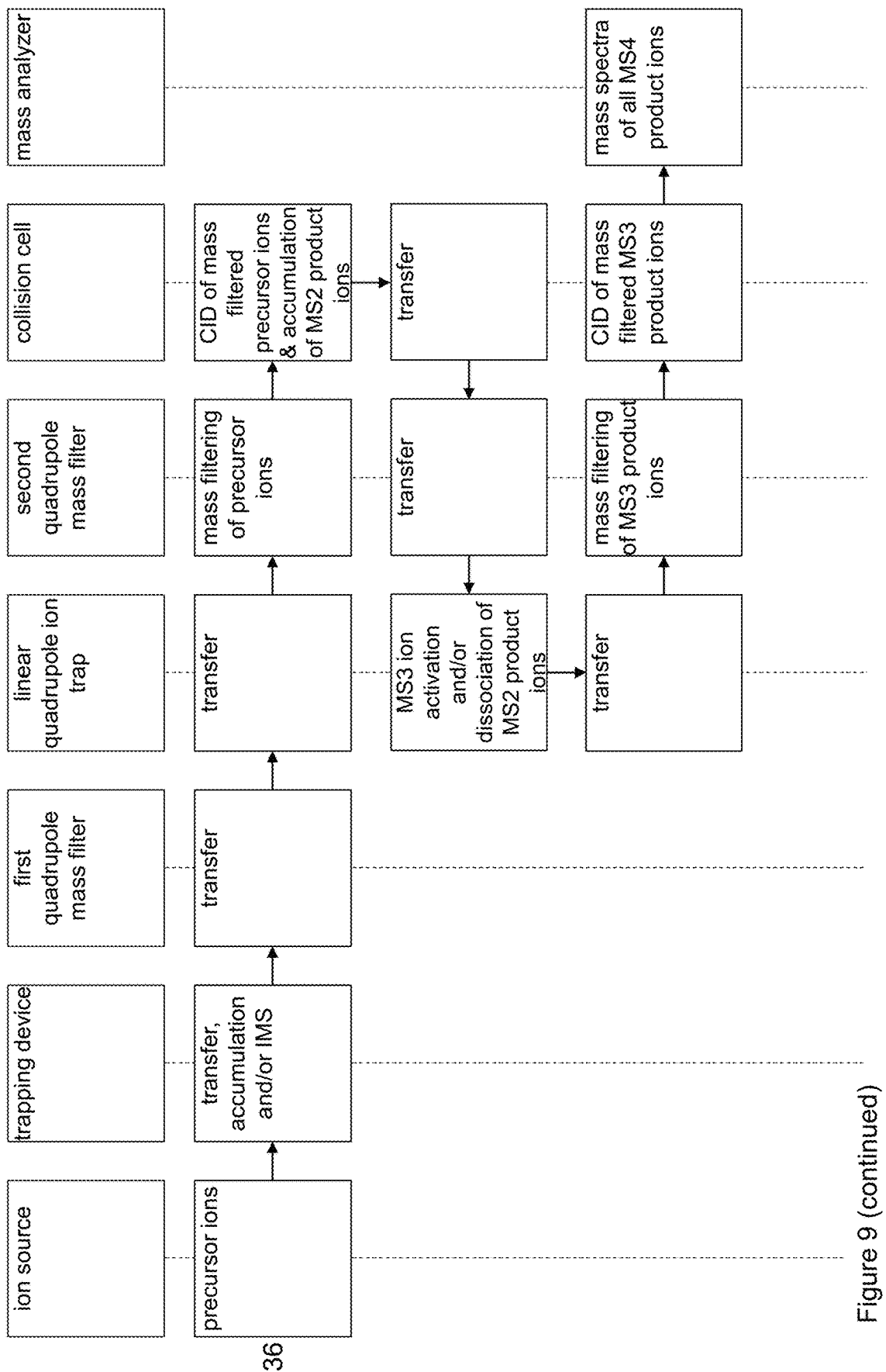
Figure 9:
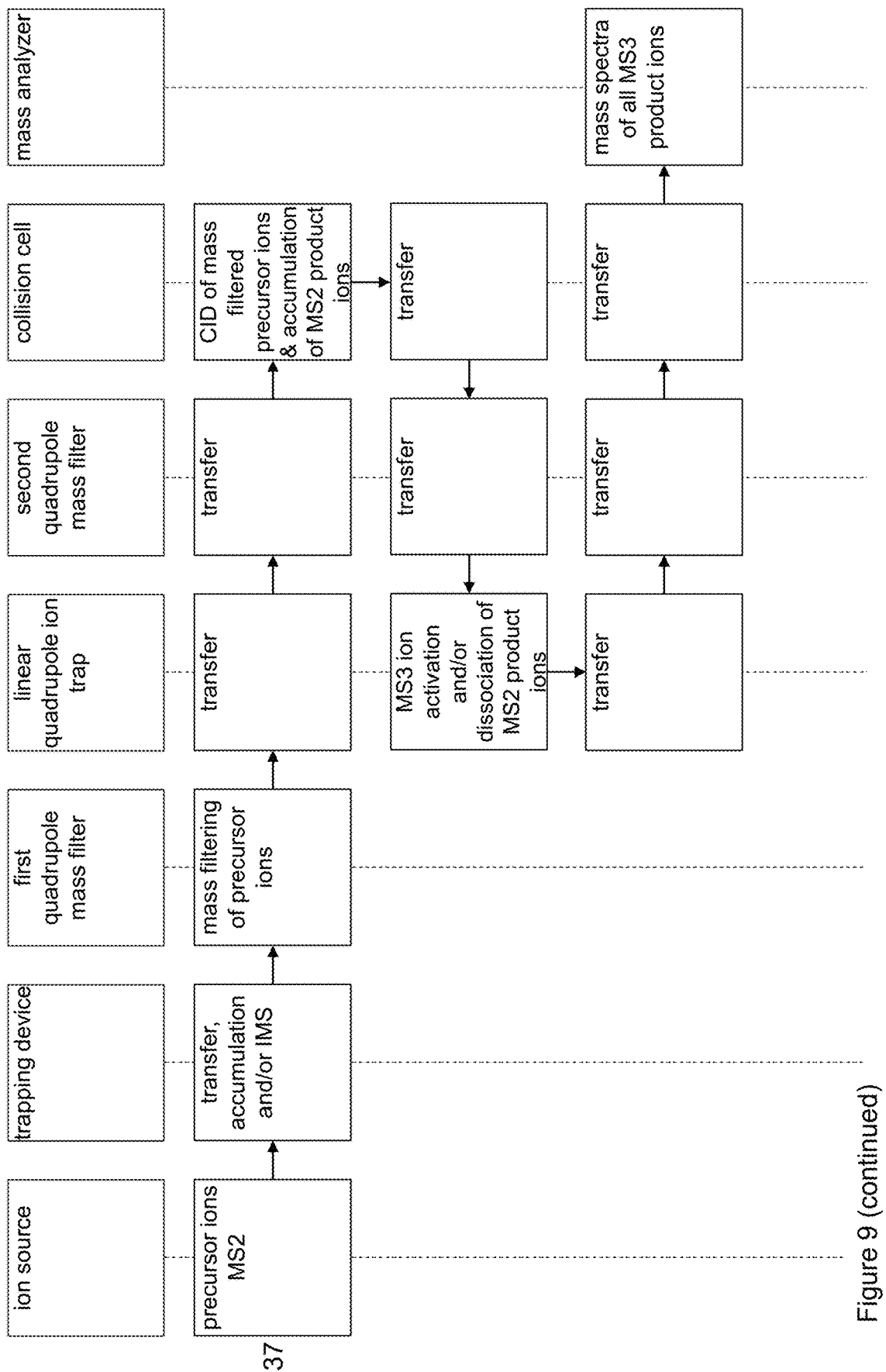
Figure 9:
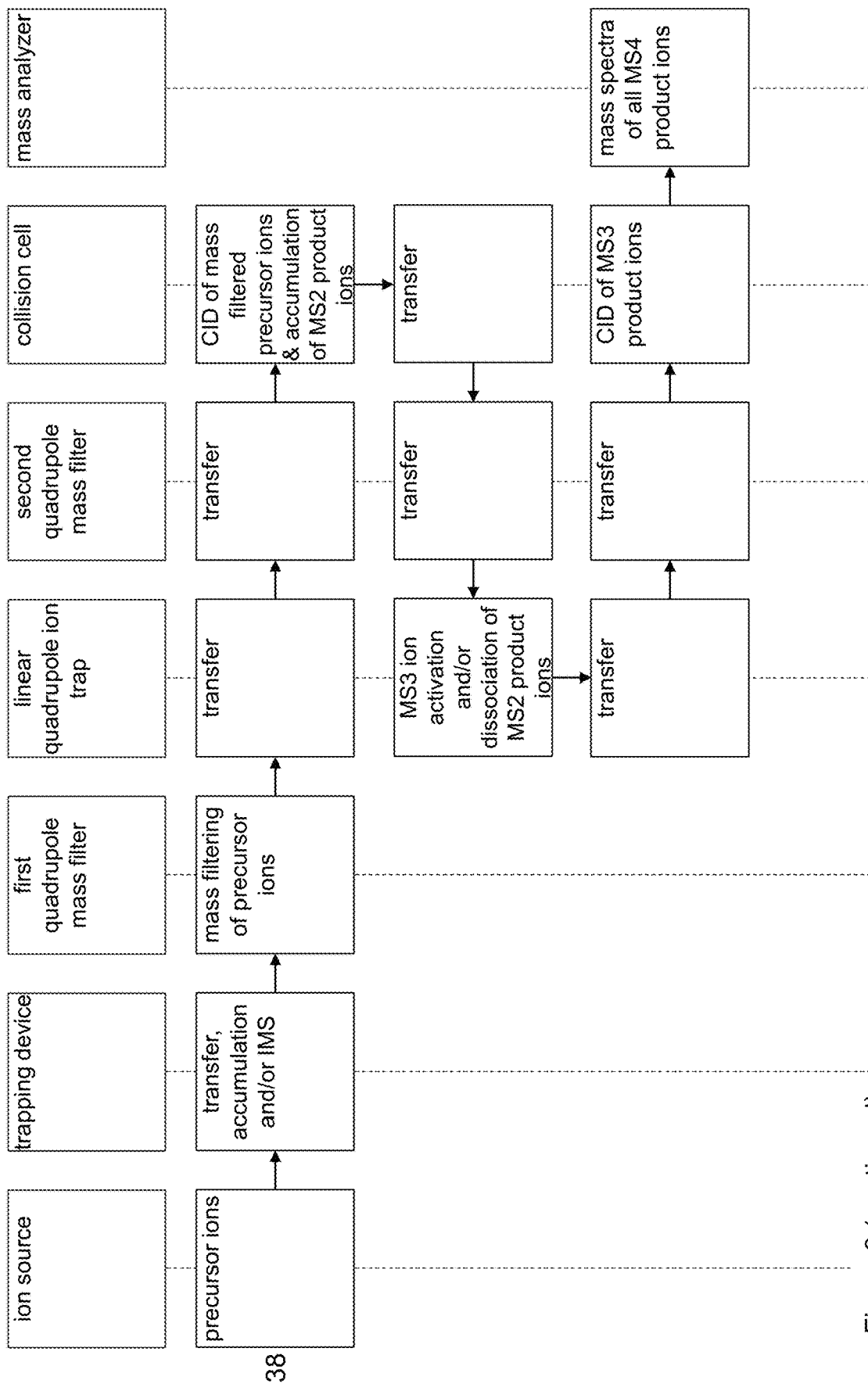
Figure 9:
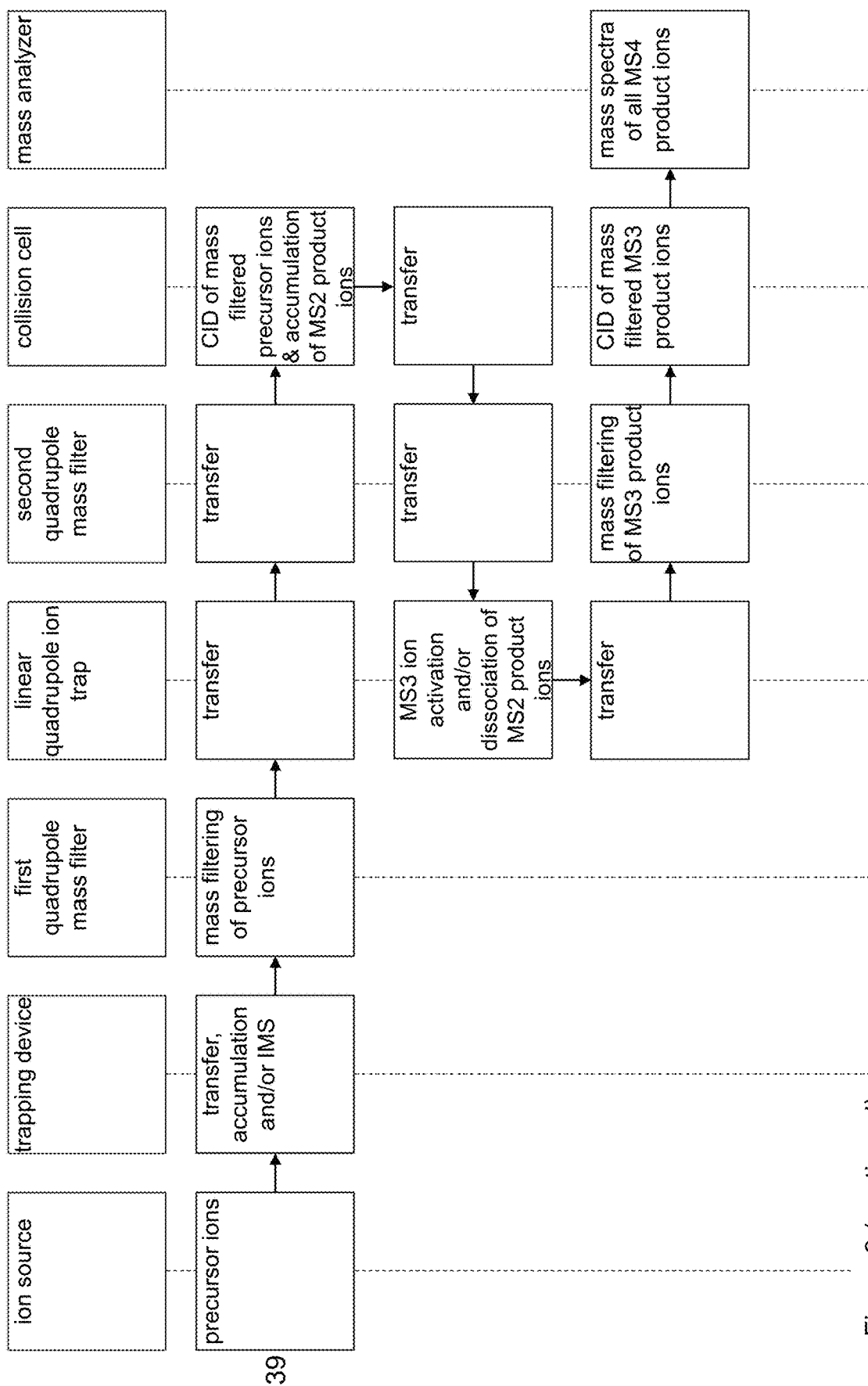
Figure 9:
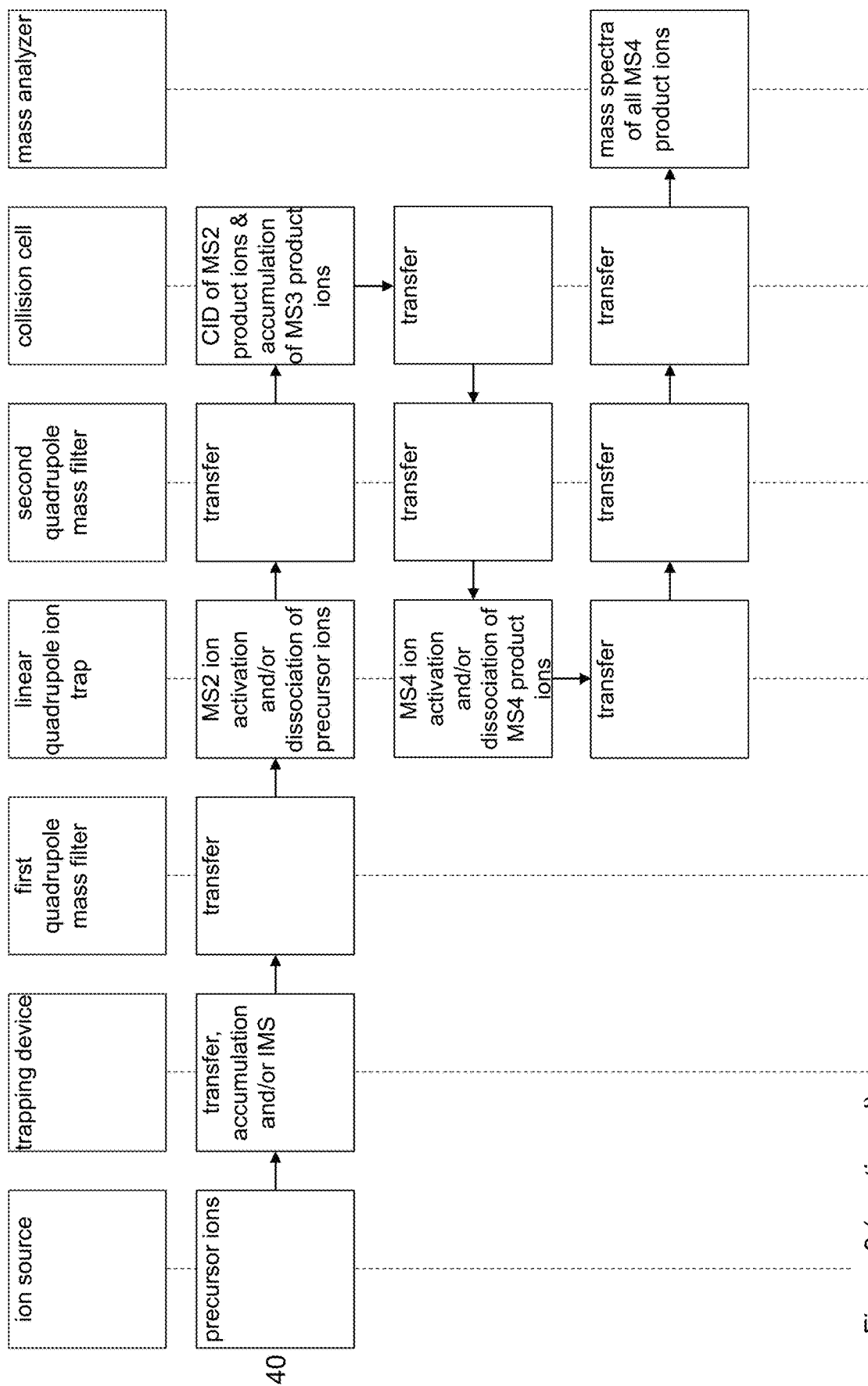
Figure 9:
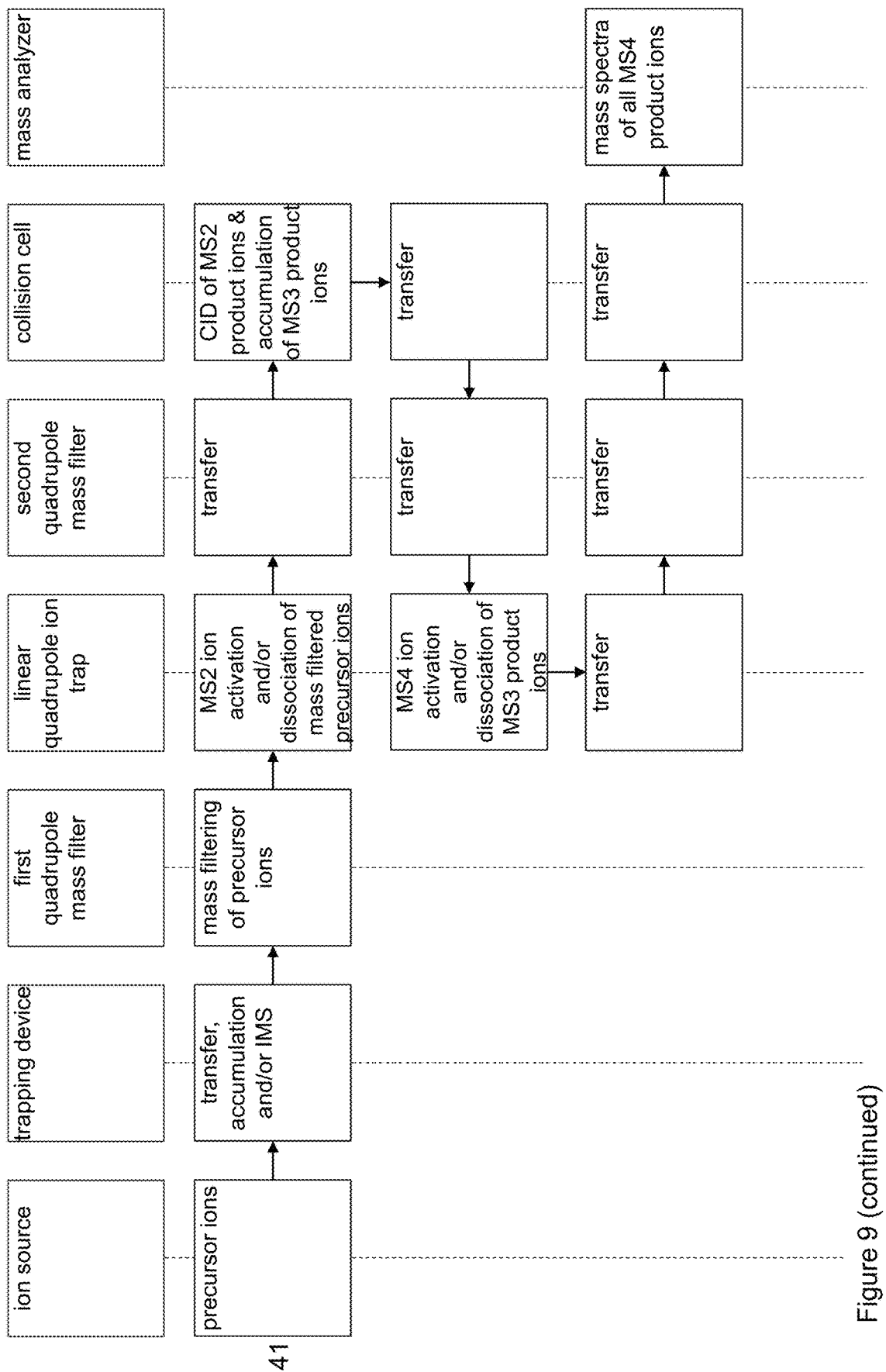
Figure 9:
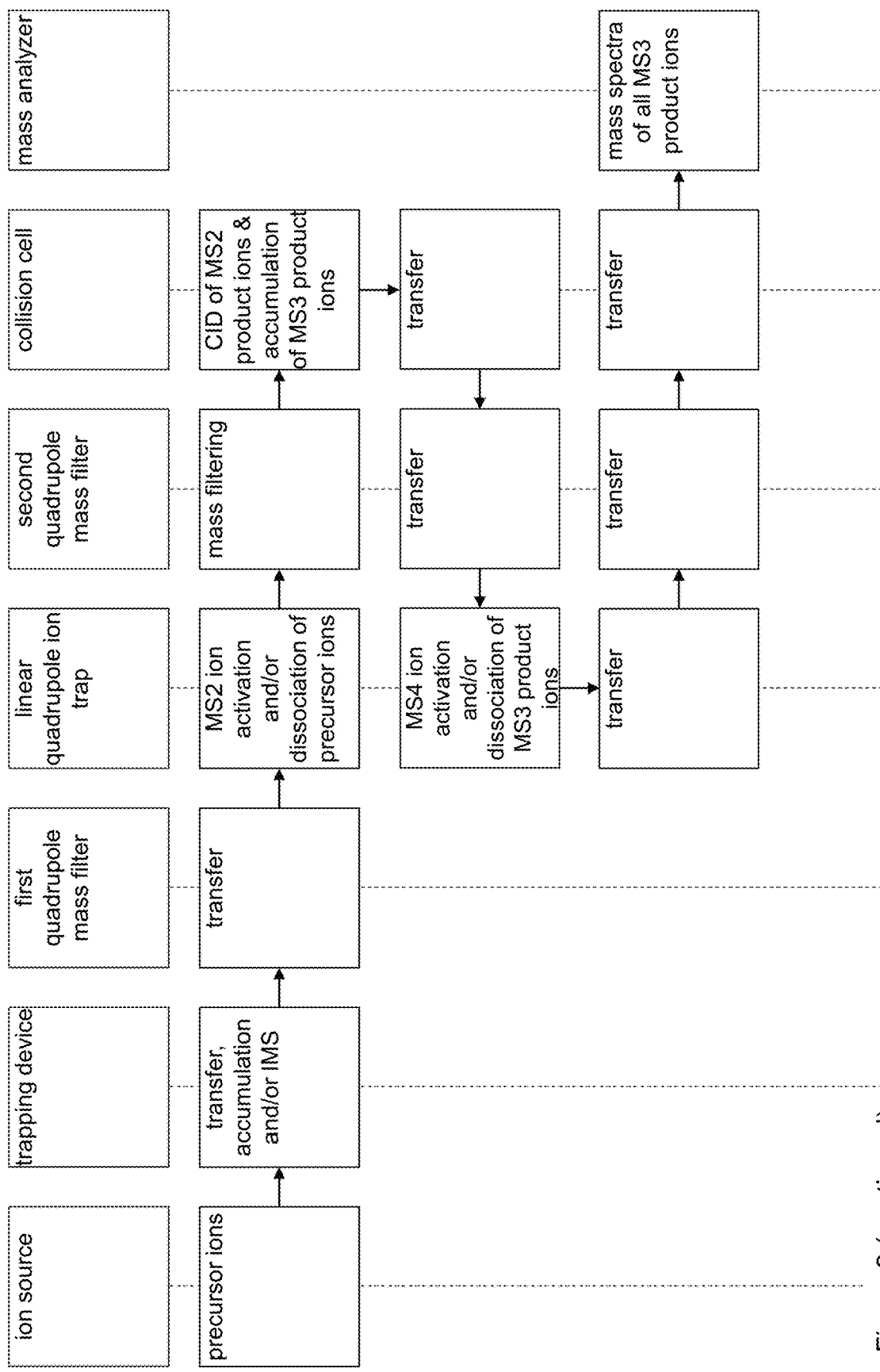
Figure 9:
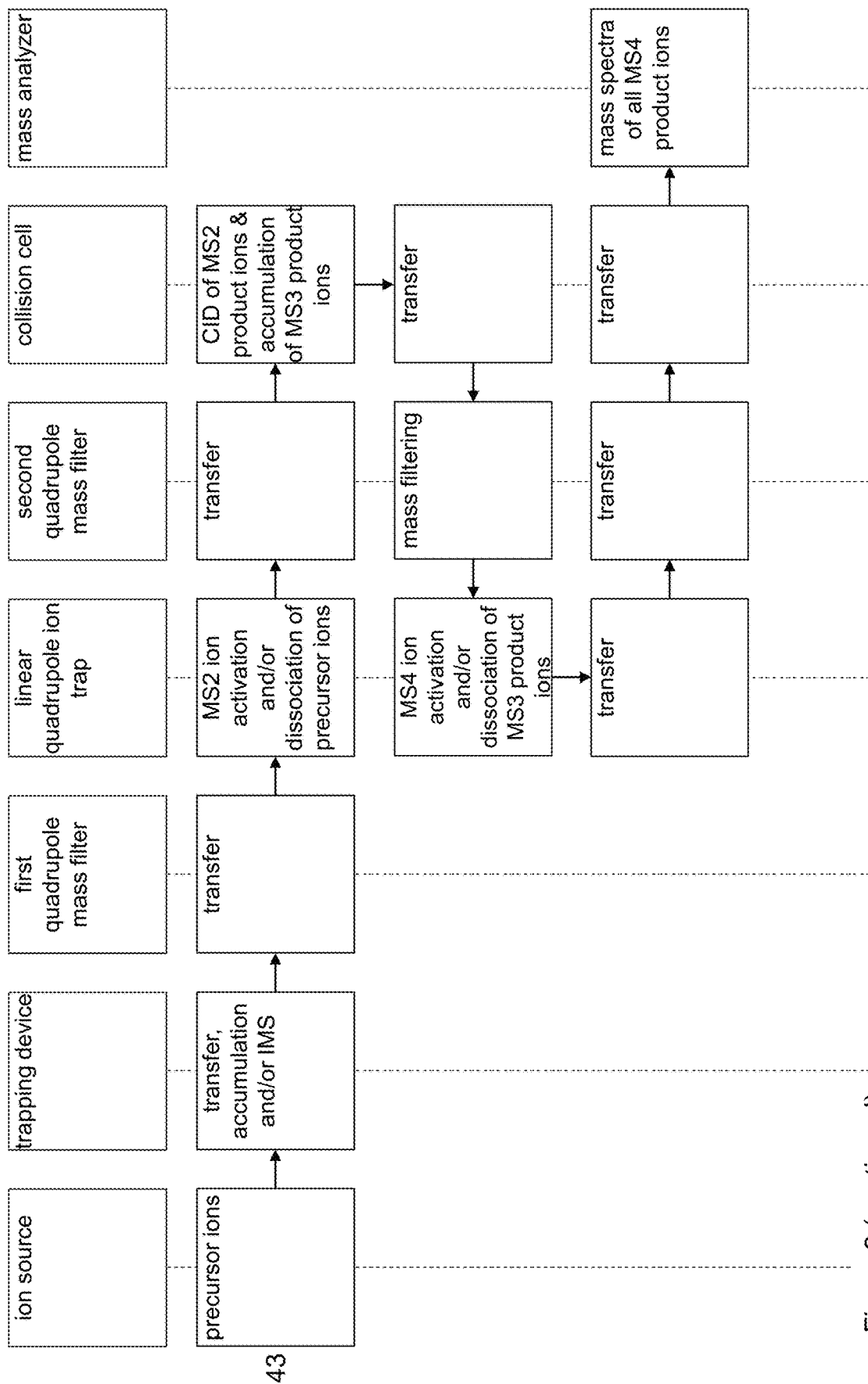
Figure 9:
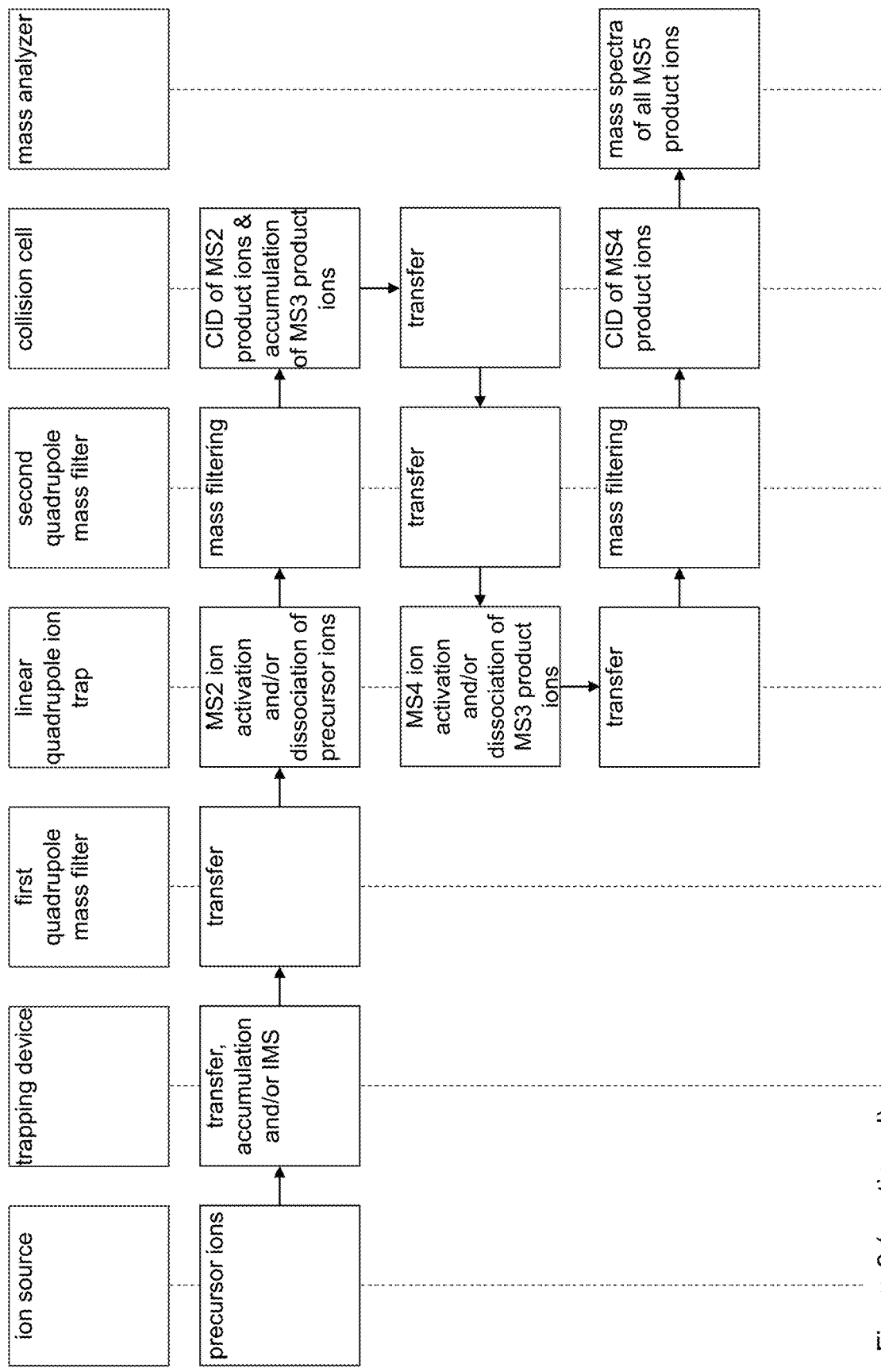
Figure 9:
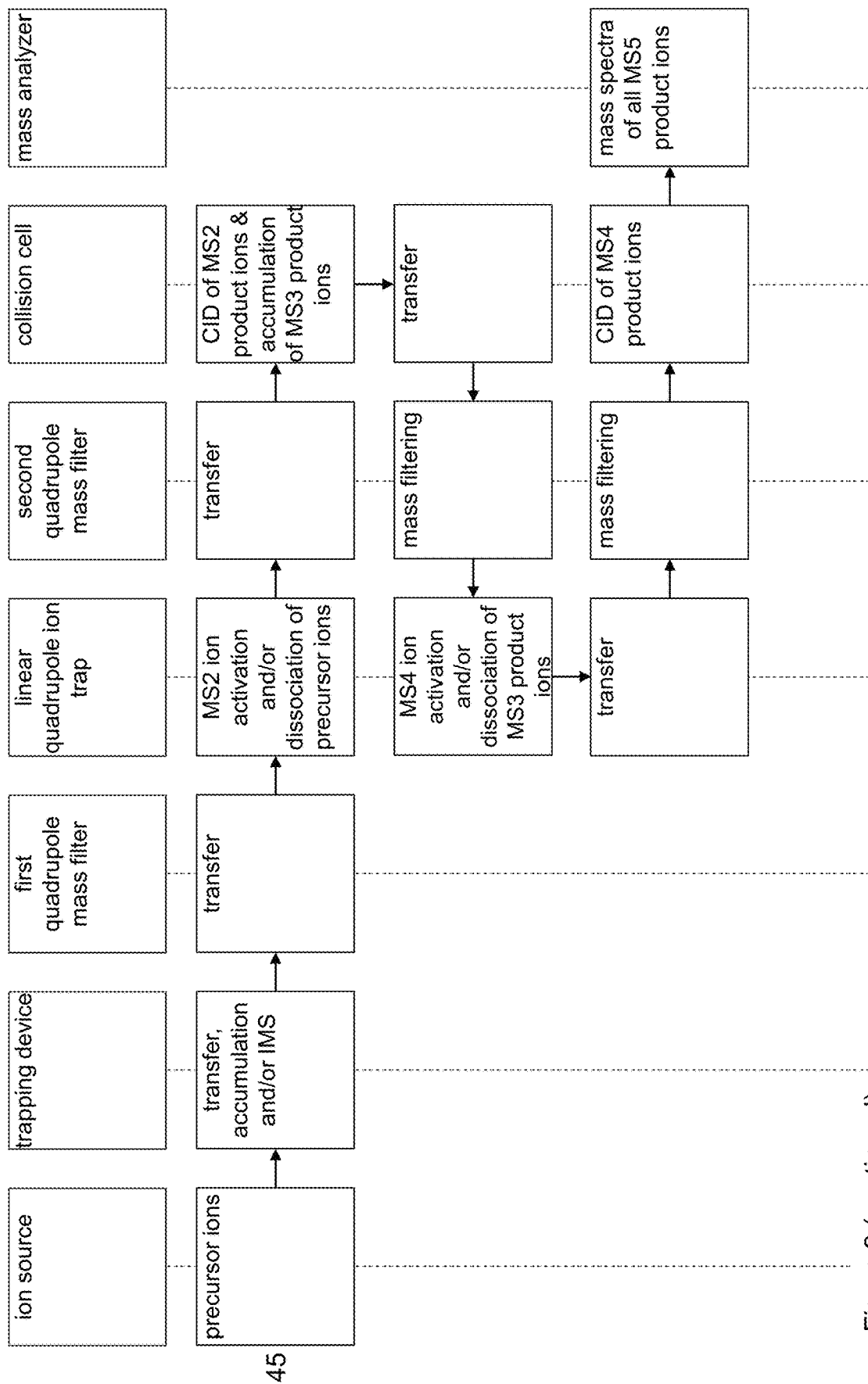
Figure 9:
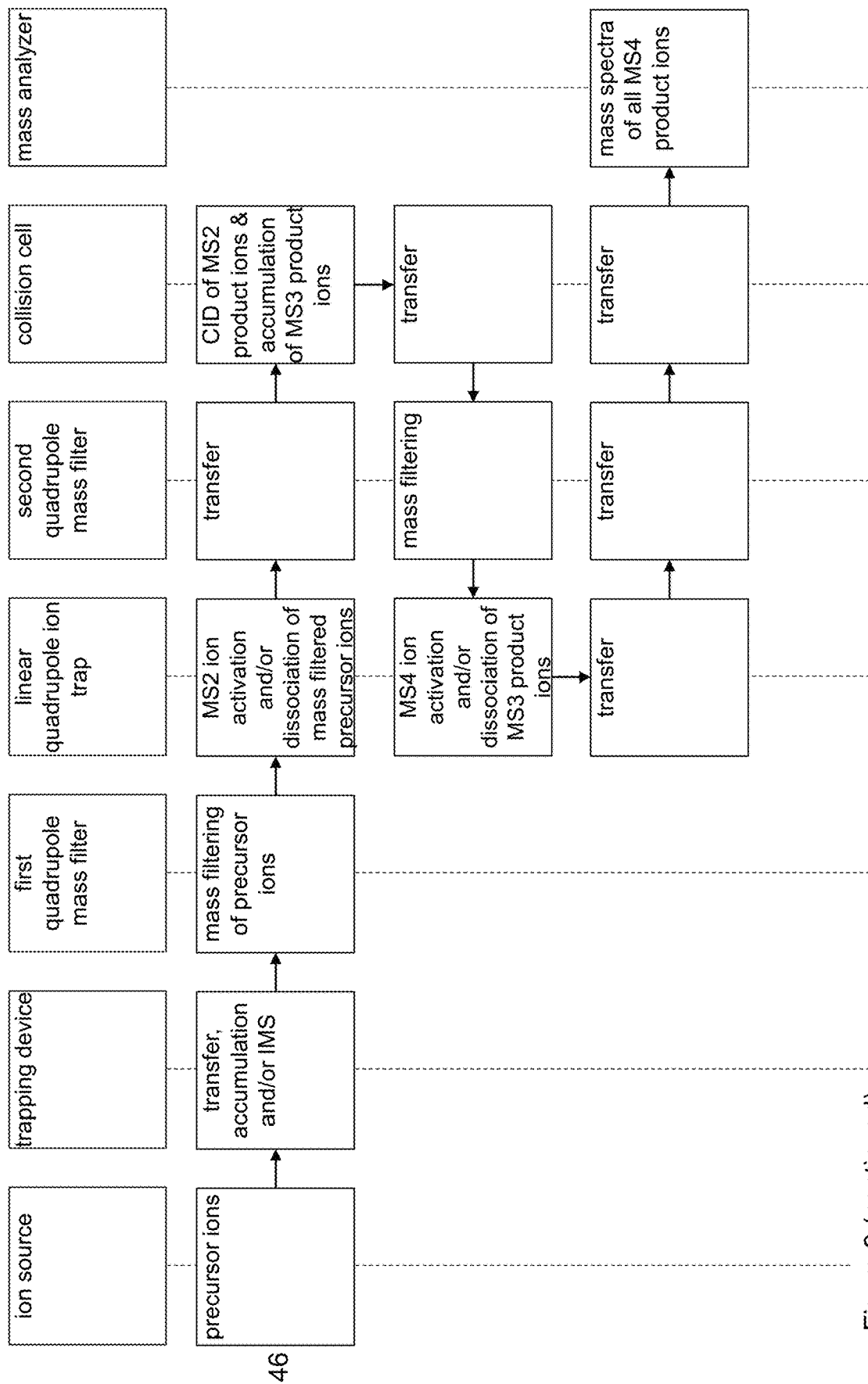
Figure 9:
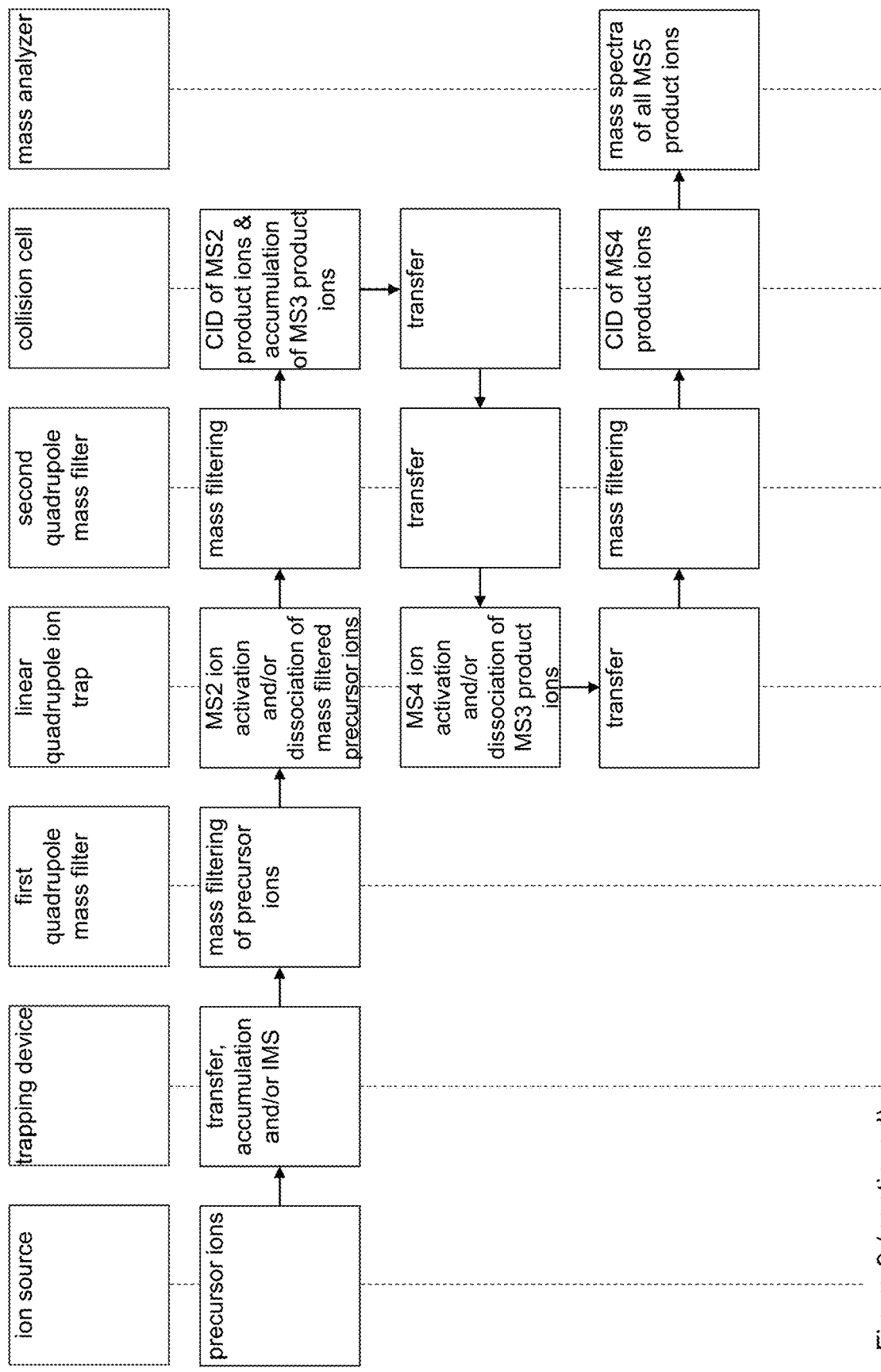
Figure 9:
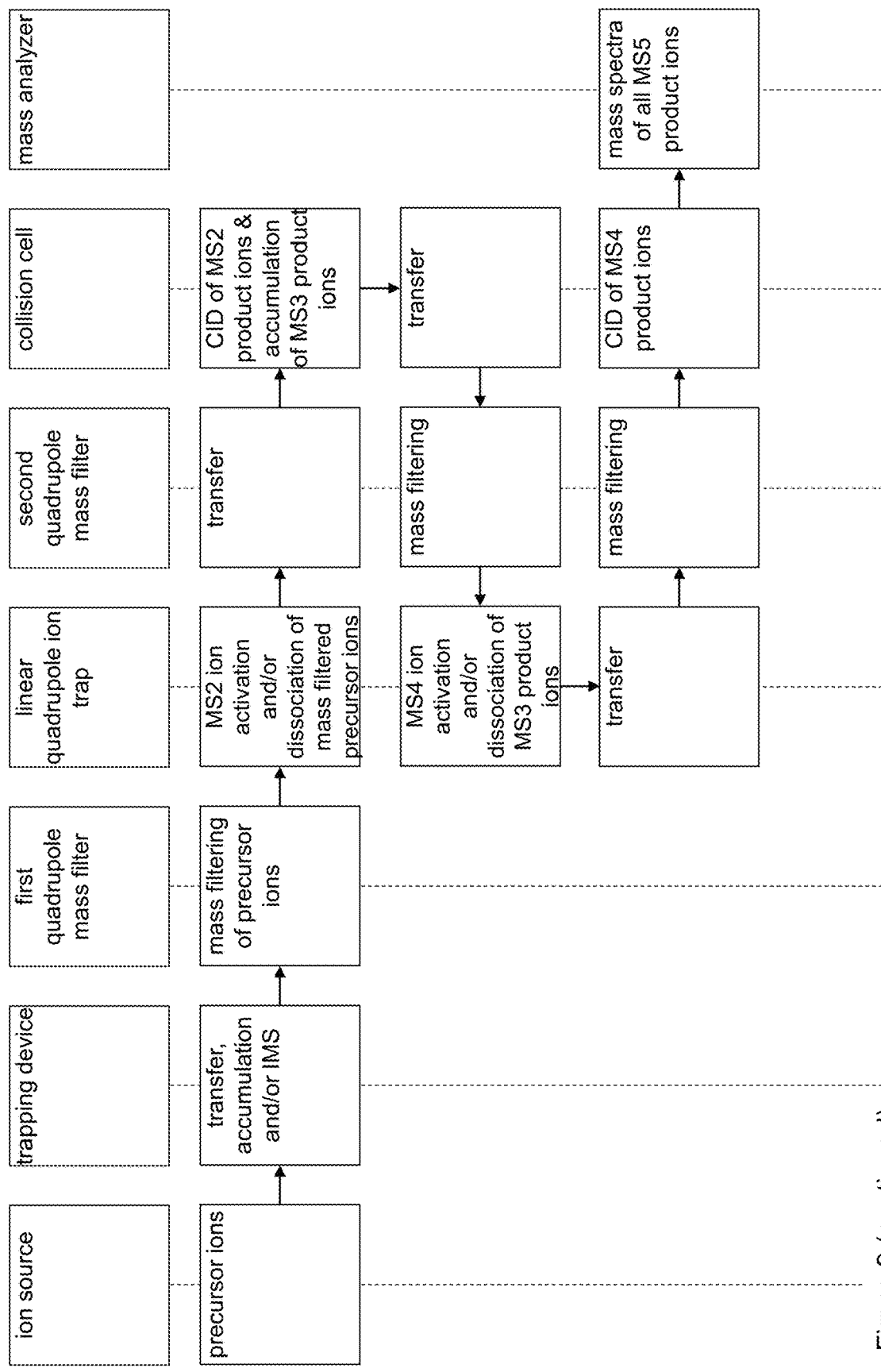
Figure 9:
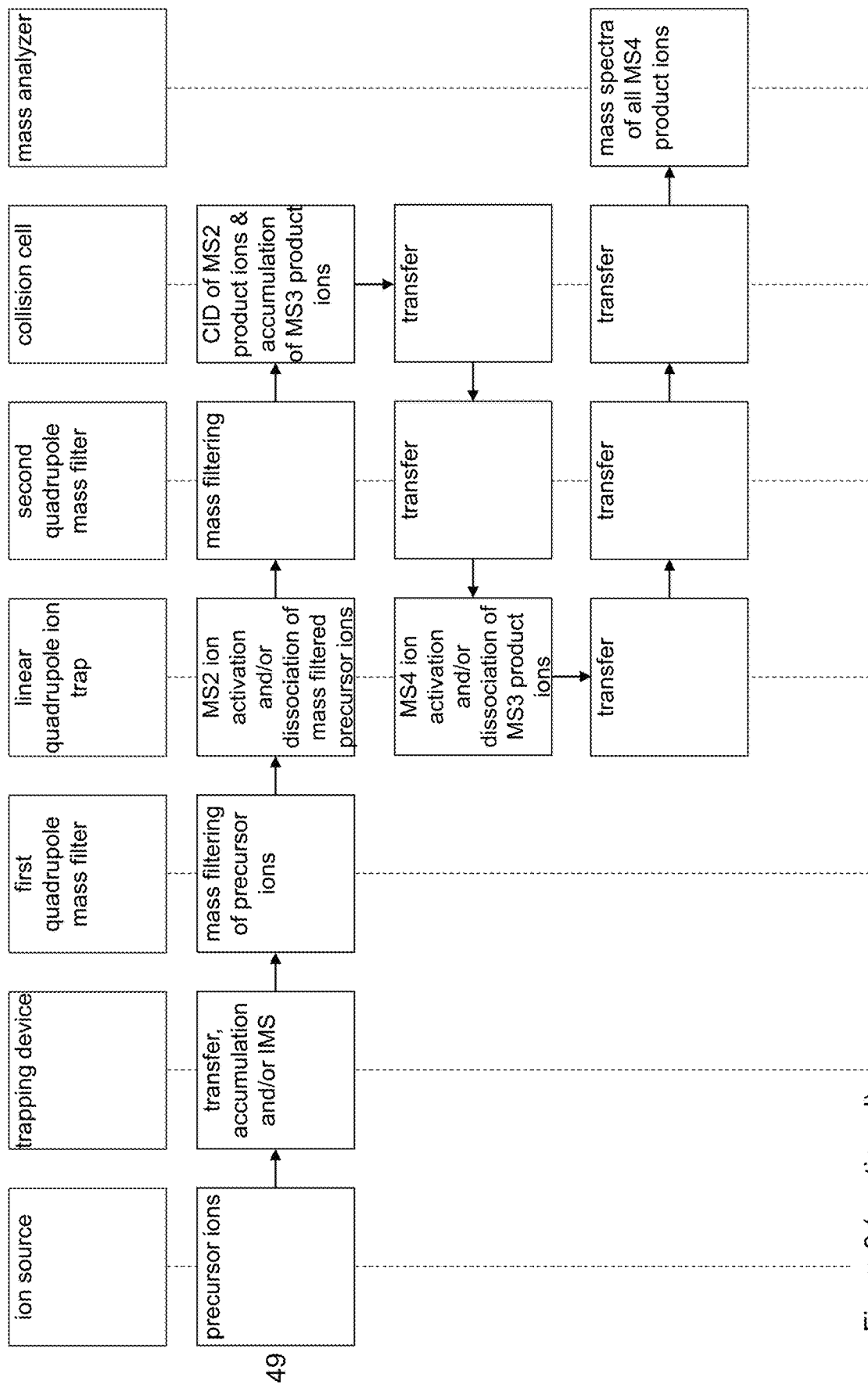
Figure 9:
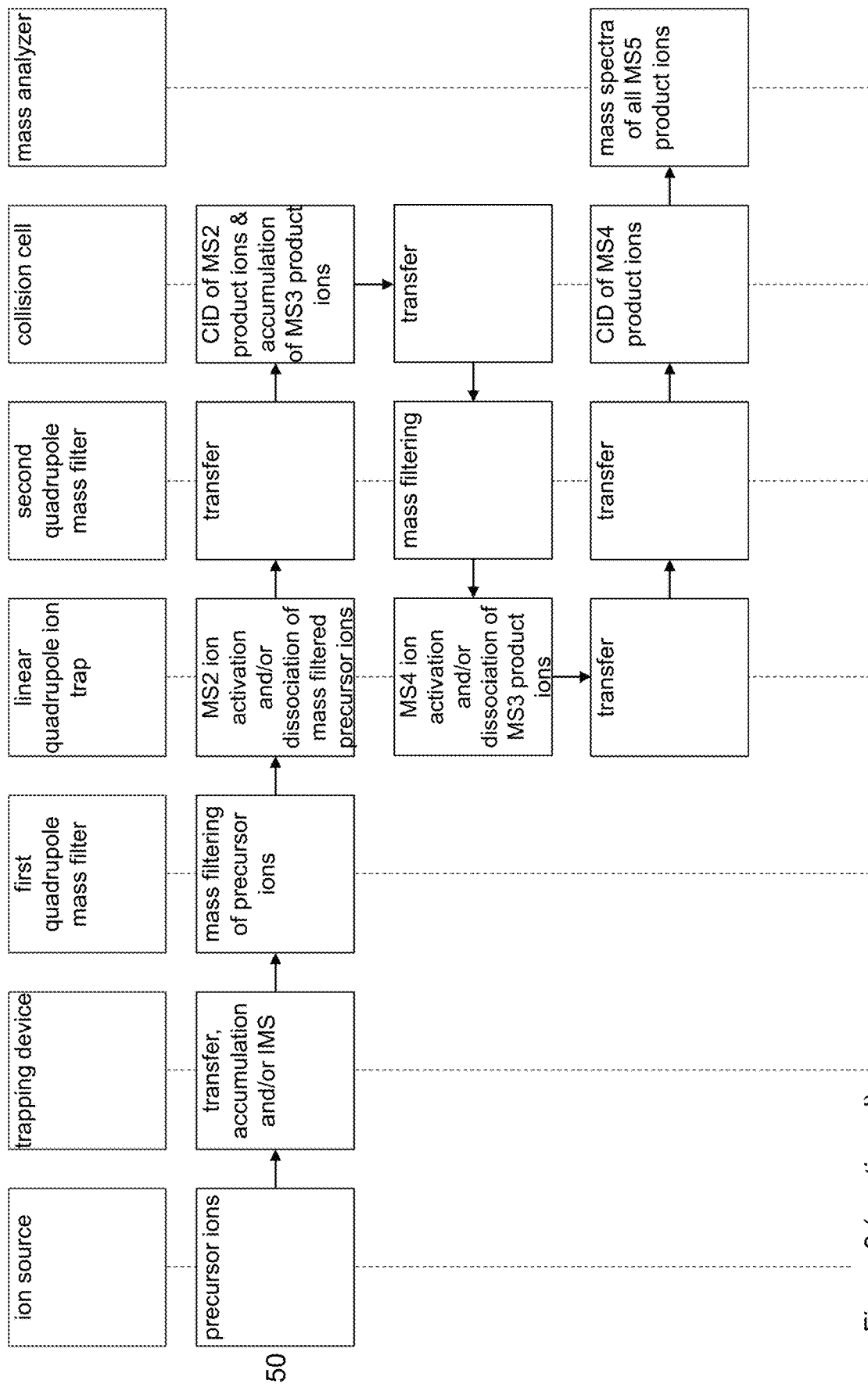
Figure 9:
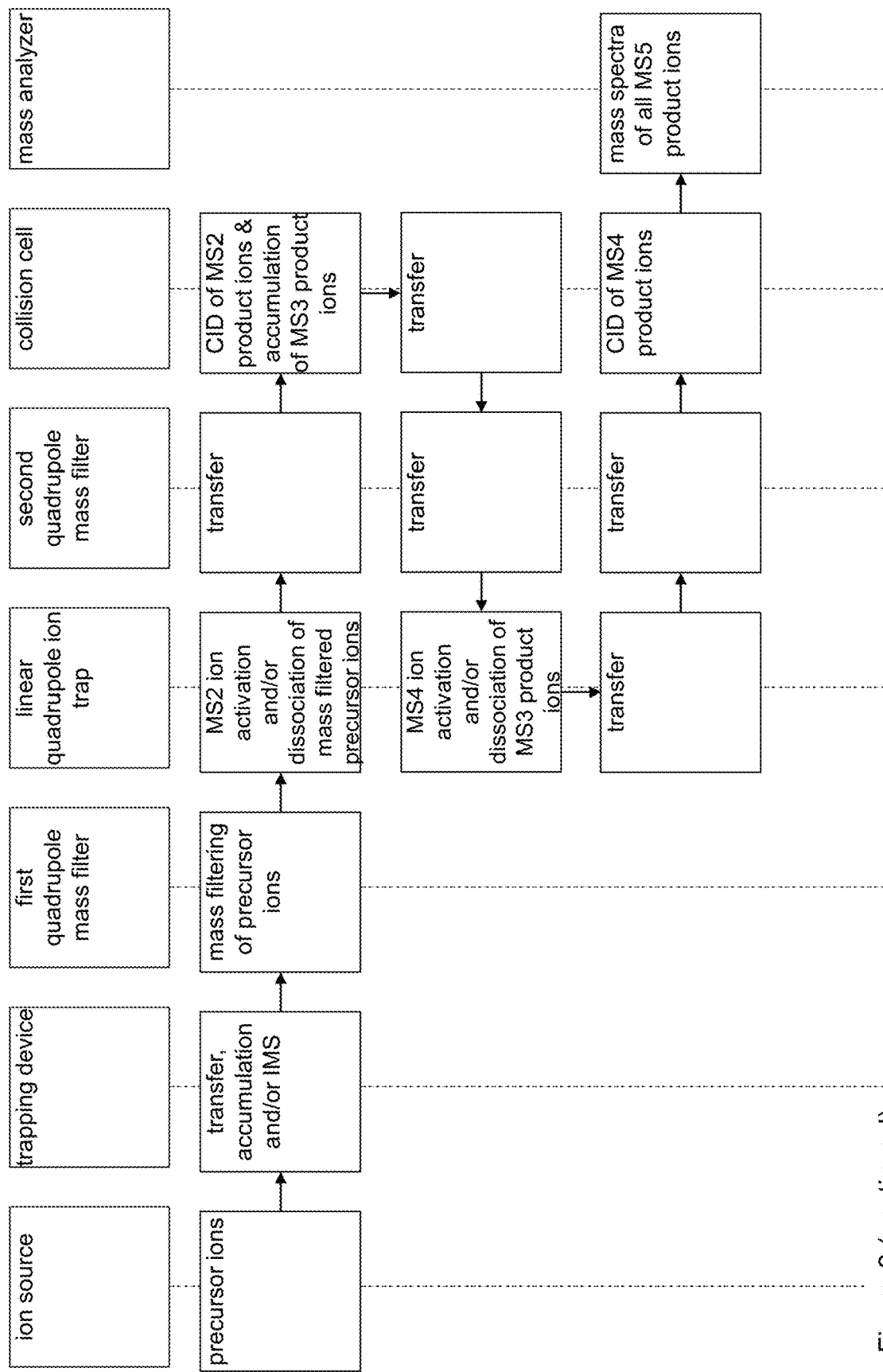
Figure 9:
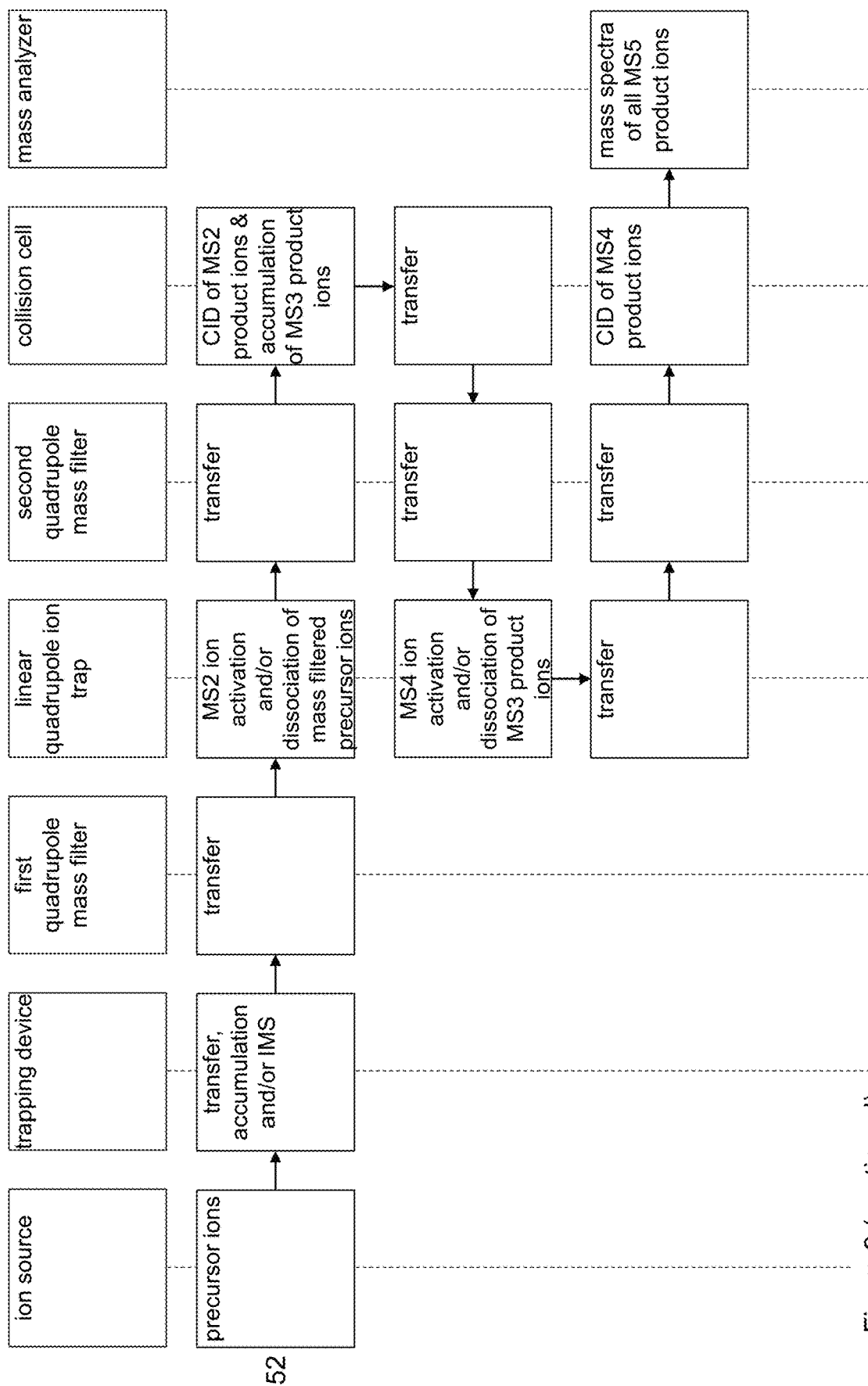
Figure 9:
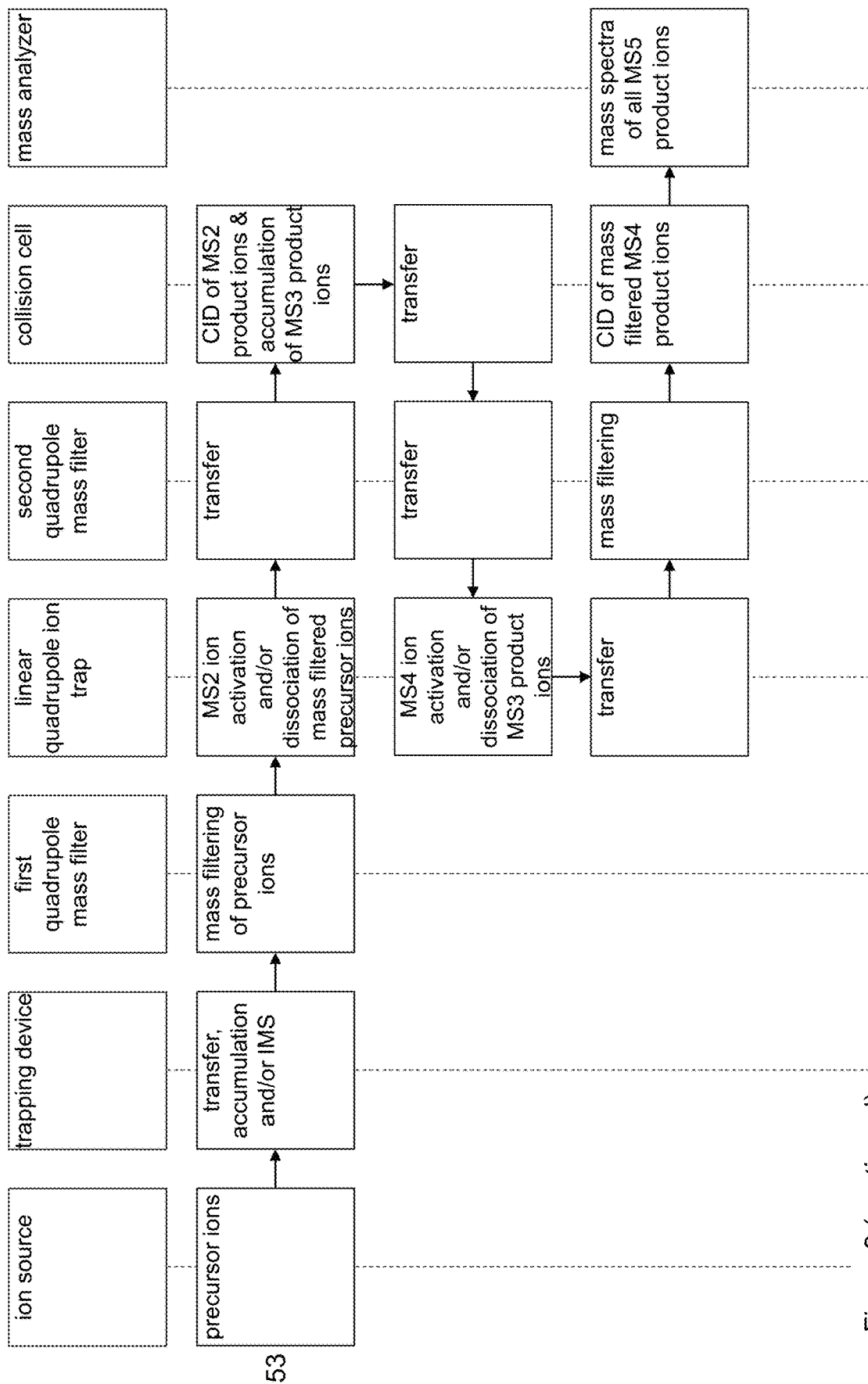
Figure 9:
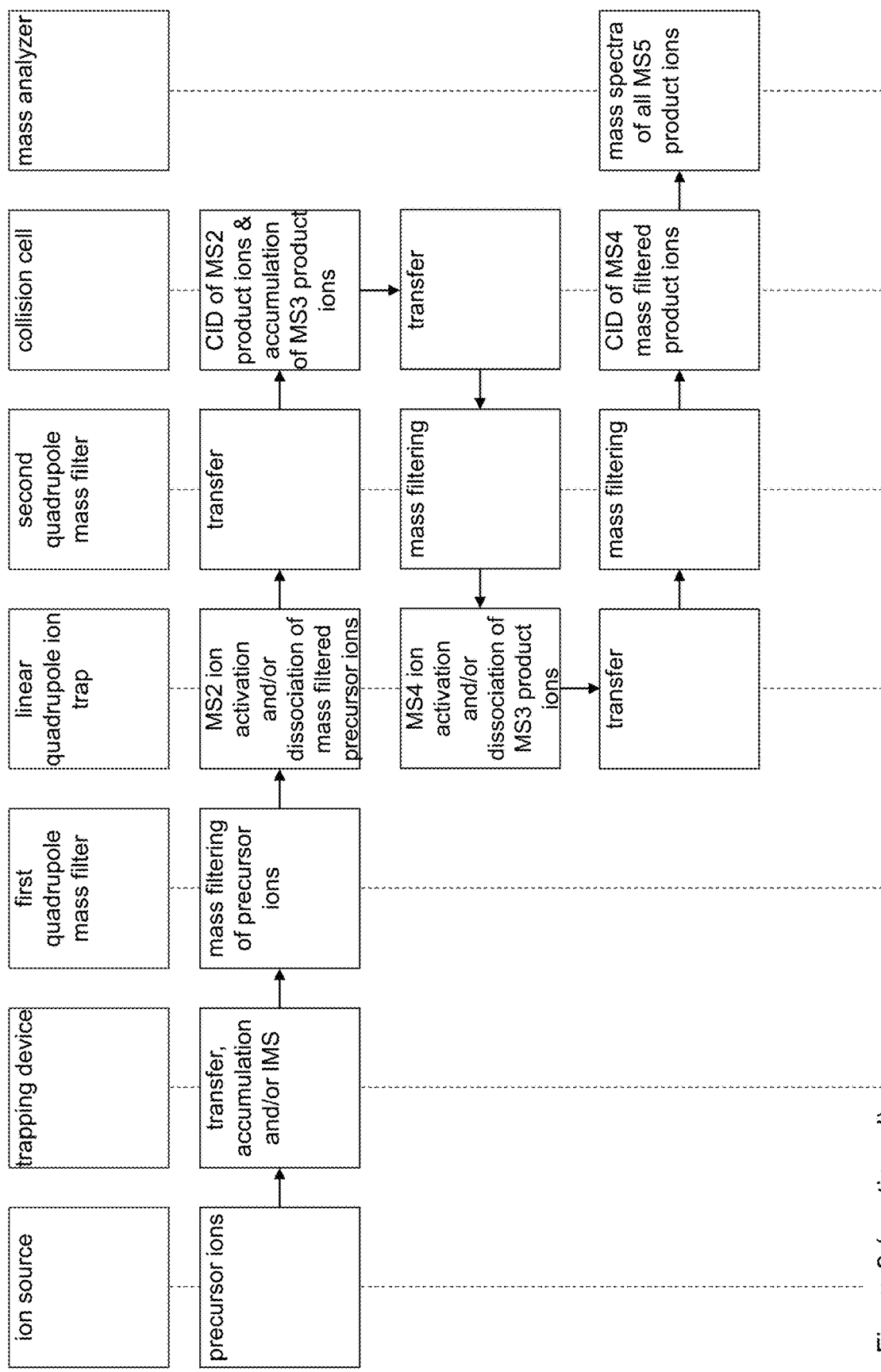
Figure 9:
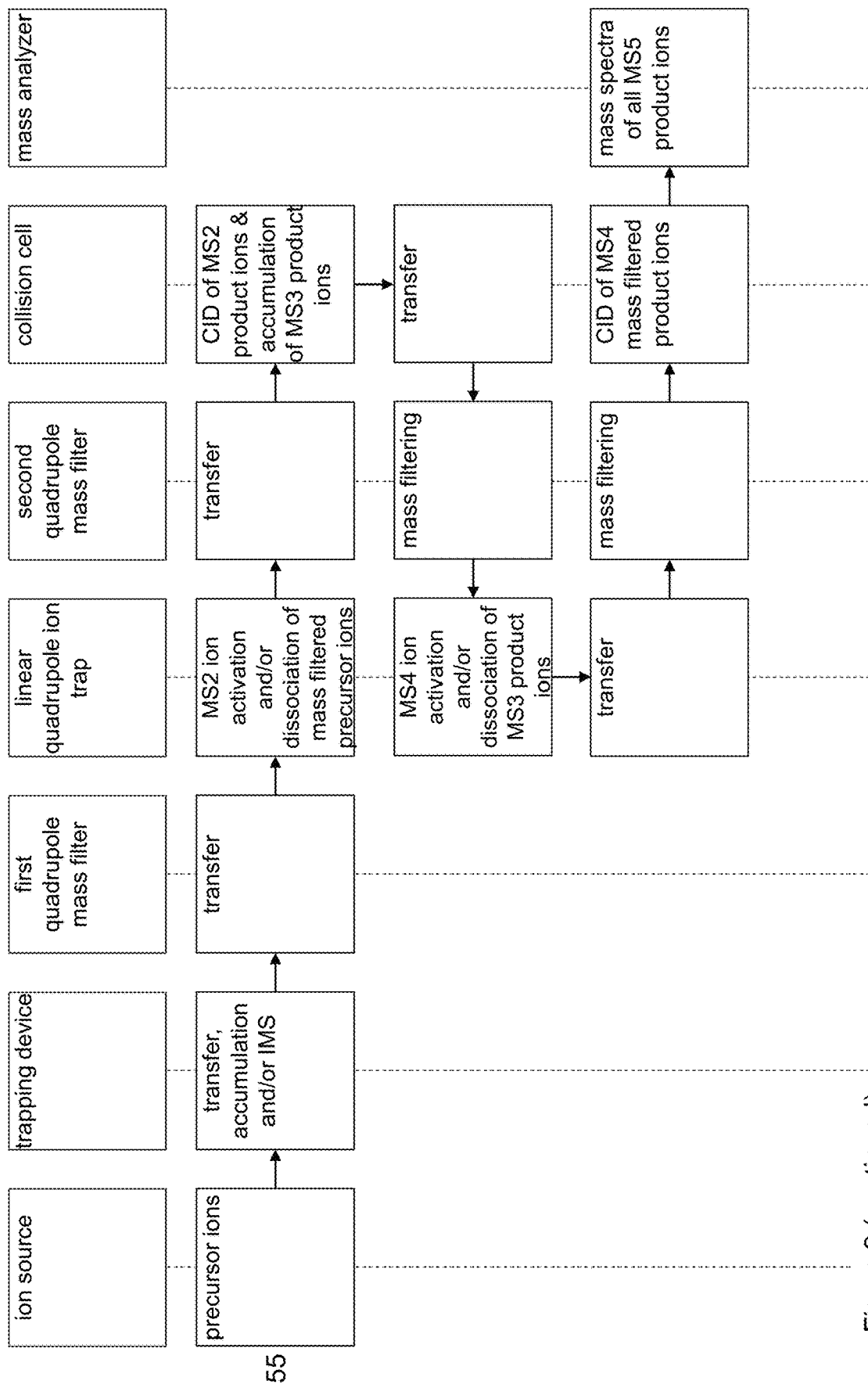
Figure 9:
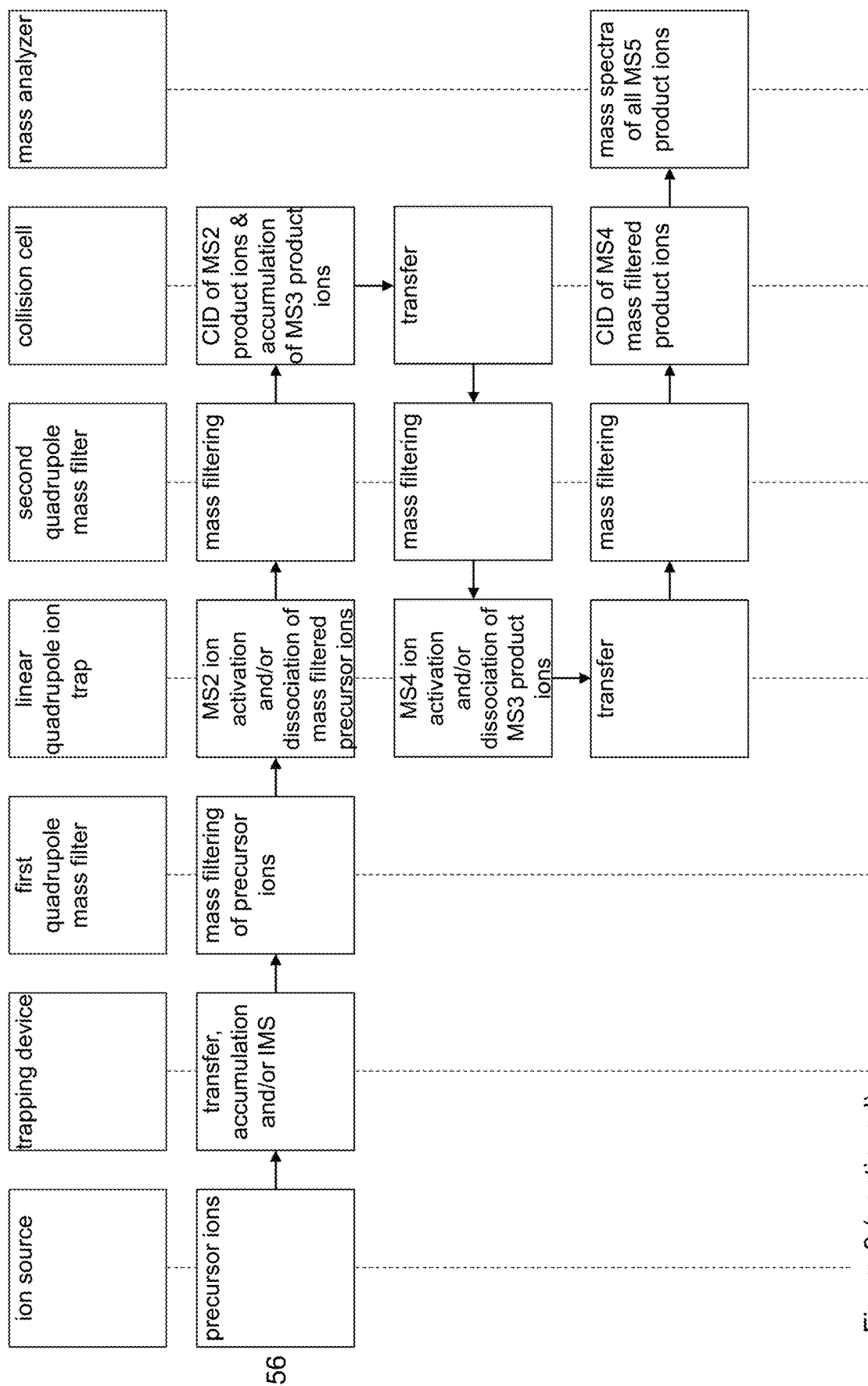
Figure 9:
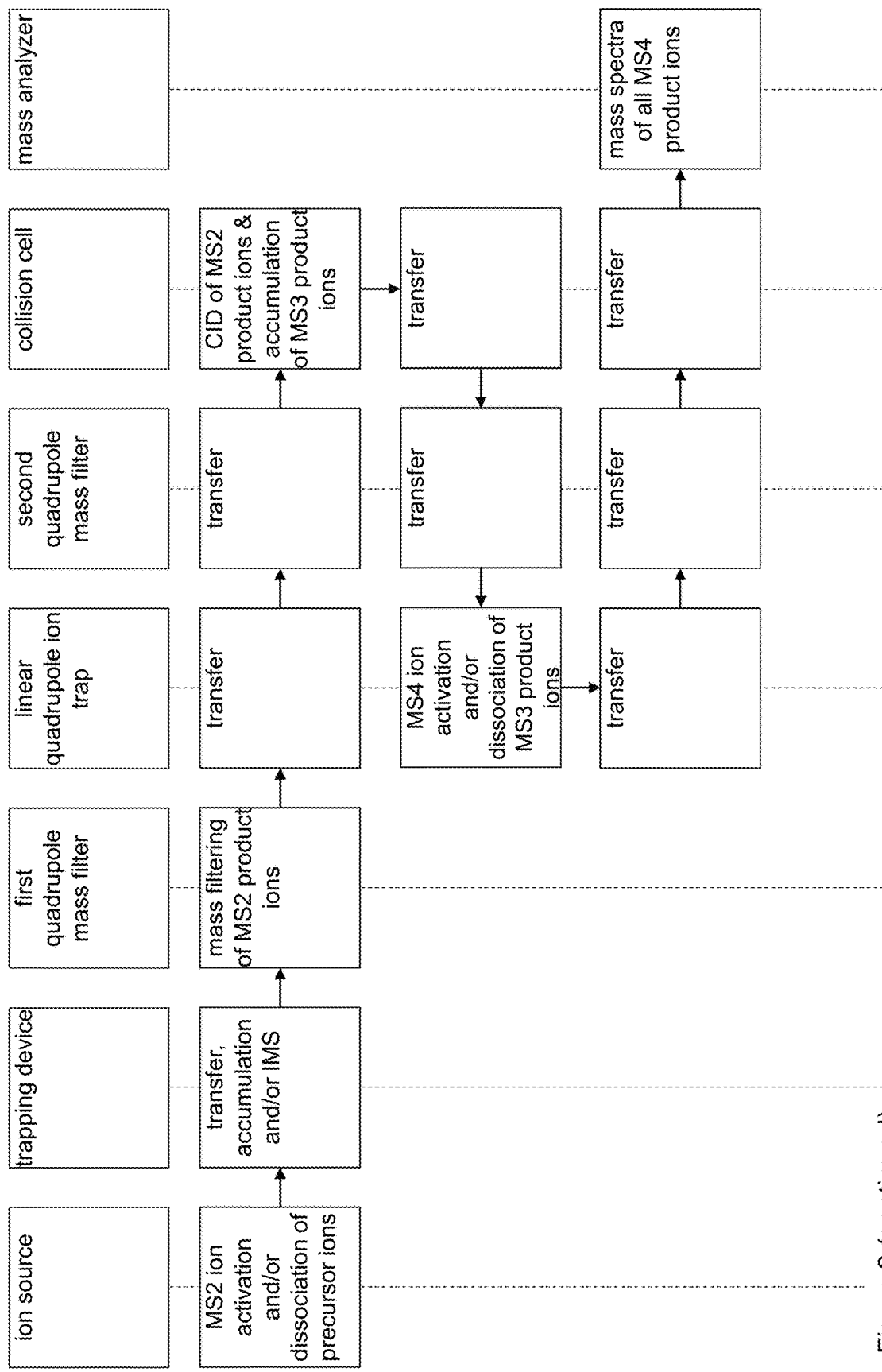
Figure 9:
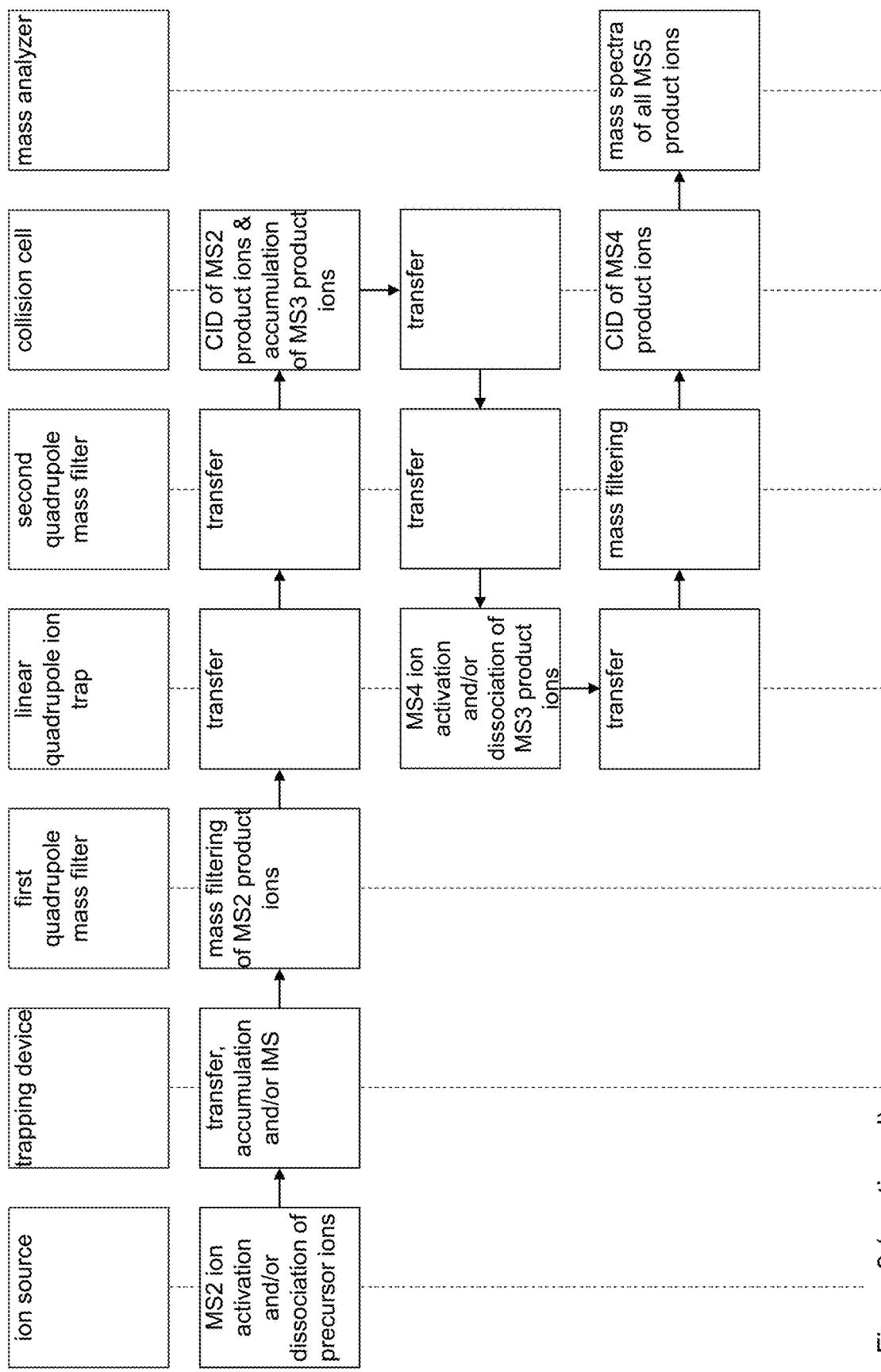
Figure 9:
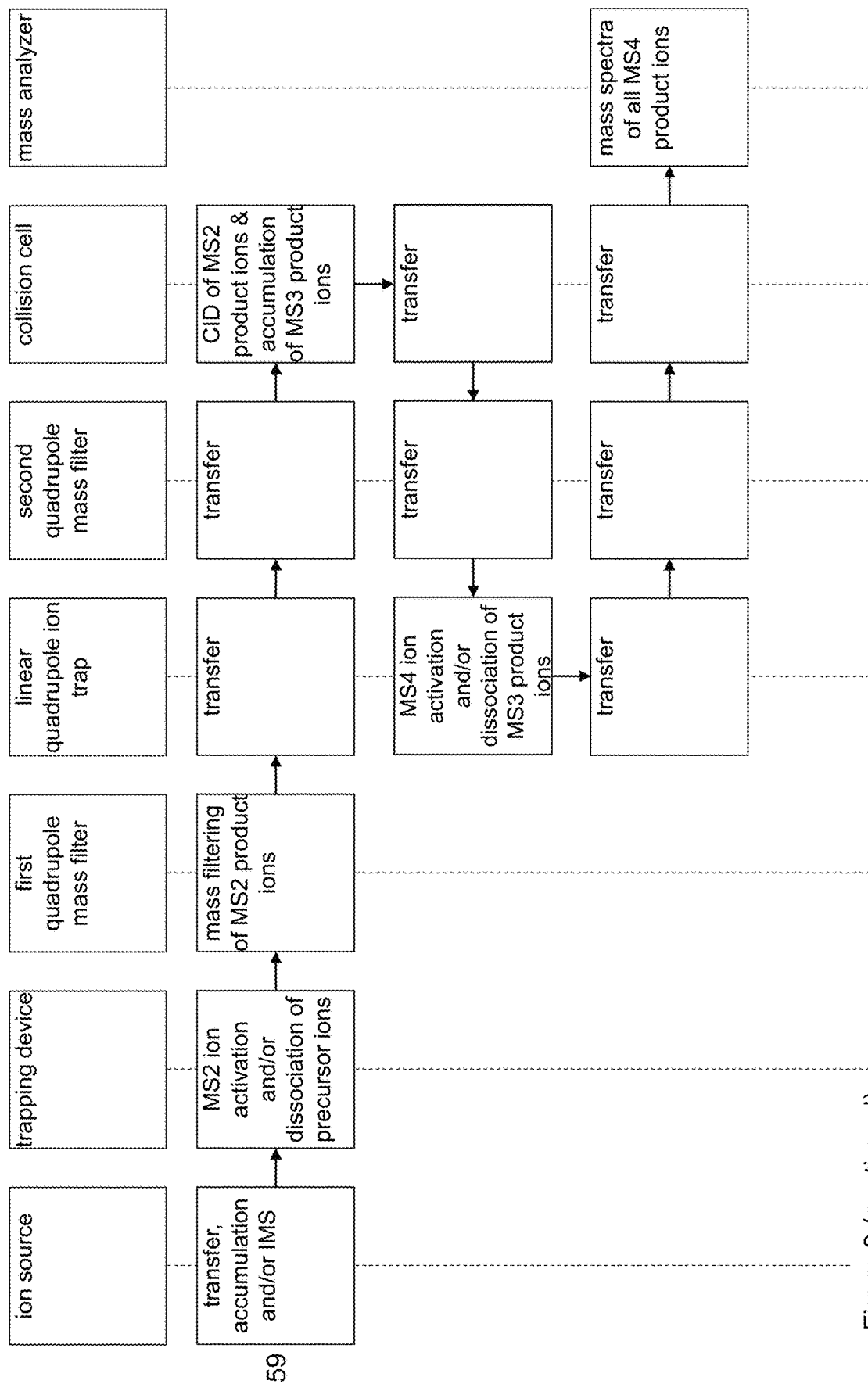
Figure 9:
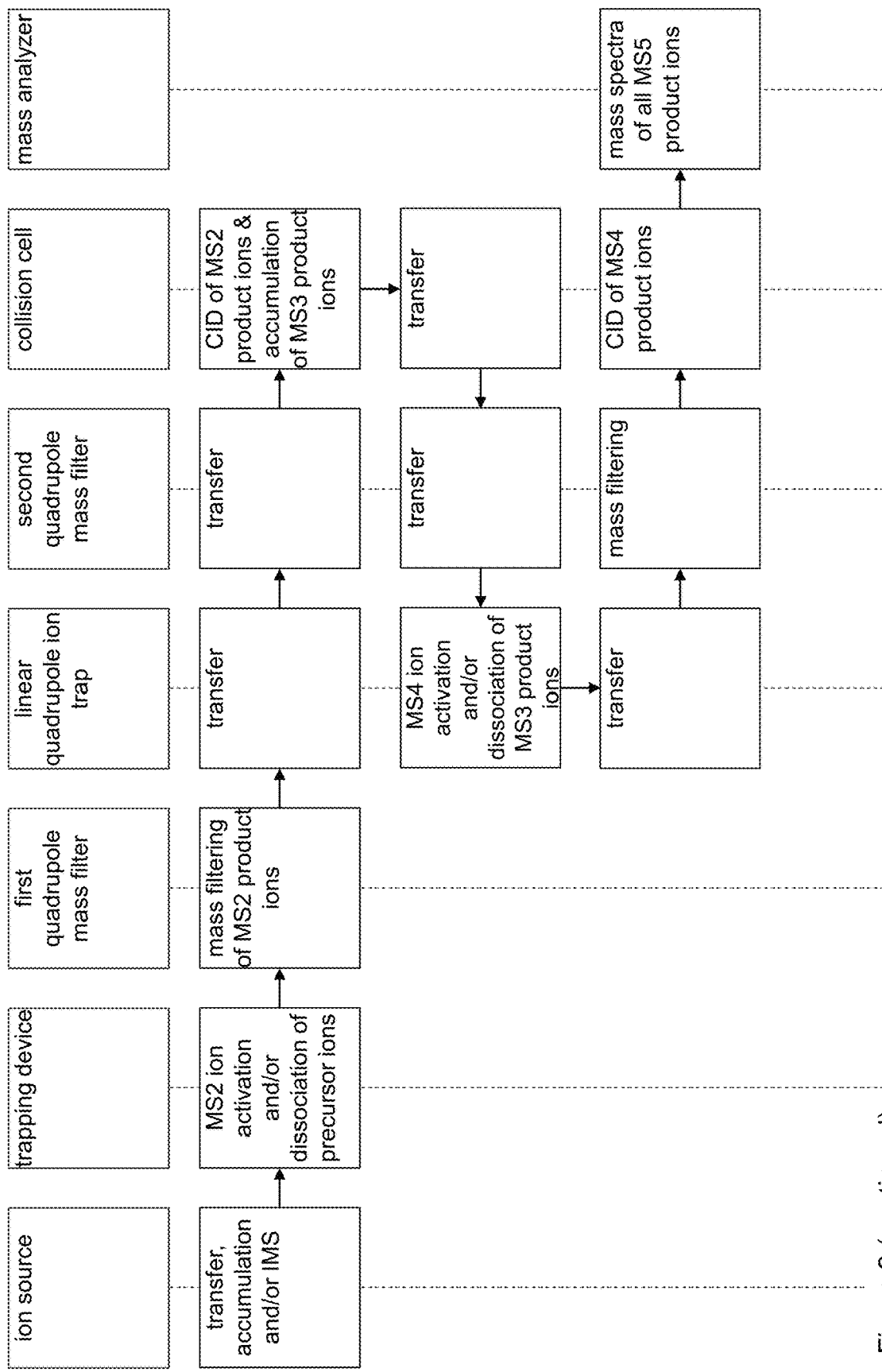

In yet another MS2 workflow 720 supported by the new design architecture, a continuous beam of ions 727 is received in the trapping device 721 operated in pass-through mode 728 and accumulation of mass selected ions 729 using the quadrupole mass filter 722 is performed in the collision cell 725 (see also FIG. 9 Example 8). The mass selected ions are stored in the collision cell 731 while the accumulation period is controlled by deflecting the incoming beam of ions 727 at specified time intervals, which are calculated in real time based on the space charge capacity of downstream ion optical elements, for example the collision cell 725, and in relation to the ion intensity, or the ion current of the mass selected ions 729 measured in the MS-survey scan 700. In this exemplary embodiment, controlling the accumulation period allows to optimally load the collision cell 725, receiving mass selected analyte ions 730 originally entrained in the continuous beam of ions 727. The accumulated mass selected ions 731 are thermalized in the collision cell and can be transferred back to the segmented linear ion trap 723 for MS2 activation-dissociation or for MSn experiments. Transferring ions upstream is made possible by switching the direction of the axial DC gradient established across the collision cell. MS2 product ions generated in the segmented linear ion trap 723 are subsequently transferred back to the collision cell 725 and ultimately ejected toward the TOF mass analyzer 726 for measuring mass-to-charge.

Accumulating mass selected ions in the collision cell 725 instead of the trapping device 721 may be preferred, for example, when the space charge capacity of the collision cell is greater than the capacity of the trapping device. The signal-to-noise ratio of MS and MS2 mass spectra originating from larger populations of ions is higher, leading to enhanced sensitivity and to an increased number of fragment ion identifications. Accumulation is made possible by the collision gas present in the collision cell, which is typically operated under static pressure conditions at approximately 0.01 mbar.

A significant advantage of accumulating ions in the collision cell 725 as opposed to accumulating ions in the trapping device 721 is that in the former case the accumulated population will comprise mass selected ions only that can solely occupy the charge capacity of the collision cell, while in the latter case the capacity of the trapping device will accommodate a wide range of ions produced in the ionization source.

Accumulating mass selected ions in the collision cell 725 instead of the segmented linear ion trap 723 may be preferred, for example, if pressure in the segmented linear ion trap 723 is controlled dynamically using one or more gas pulse valves and when the accumulation period exceeds the residence time of the gas in the trapping volume of the segmented linear ion trap. Extended accumulation periods to improve signal-to-noise and detect low abundance ions is more conveniently performed in a device operated under static pressure conditions.

Different types of MS activation-dissociation experiments can be performed in this exemplary workflow. For example, the accumulated mass selected ions 731 can be transferred back 732 through the second quadrupole mass filter 724 to the segmented linear ion trap 723 for electron- or photon-based fragmentation. Alternatively, mass selected ions 732 can be ejected from the collision cell 725 back to the segmented linear ion trap 723 with sufficient kinetic energy to undergo collision induced dissociation. In addition, mass selection using the second quadrupole mass filter 724 is available for fast MS3 or higher MSn workflows when ions 732 are transferred back from the collision cell 725 to the segmented linear ion trap 723.

Figure 8:
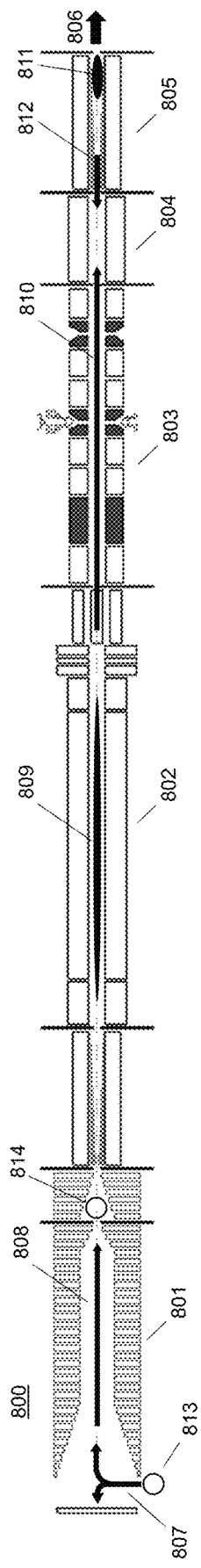
FIG. 8 schematically depicts a mass spectrometer according to an exemplary embodiment, in use.

Additional workflows can be supported by the new design architecture whereby ion accumulation is performed in the collision cell. An exemplary description of an MS2 scan with the ion accumulation step performed in the collision cell 702, 722 was discussed with reference to FIG. 7, while an exemplary description of an MS3 or MS4 scan 800 is presented in FIG. 8 whereby MS2 fragments 808 generated upstream 813 (see also FIG. 9 Example 27) or MS2 fragments generated downstream 814 (see also FIG. 9 Example 29) from the trapping device 801 are selectively transmitted 809 using the quadrupole mass filter 802. A continuous beam of mass selected MS2 CID fragment ions 810 is thereby transmitted to downstream optics for a predetermined period, the MS2 ion accumulation period, to optimally load the collision cell 805. The accumulated MS2 CID fragments 811 can be subsequently transferred upstream 812 through the second quadrupole mass filter 804 into the segmented linear ion trap 803 for the MS3 activation-dissociation stage. Practically, the MS2 CID step originally performed in the collision cell 805 at the MS2 stage is reproduced at the MS3 stage upstream of the quadrupole mass filter 802 to enable fast selection of MS2 product ions with high resolution. Ultimately, MS3 and/or MS4 product ions are ejected 806 towards the TOF analyzer for producing a product ion mass spectrum.

Advanced DDA methods will be combined with the new design architecture. As an example of a top-down or a middle-down LC/MS experiment, the DDA algorithm includes the steps of:

(a) identifying the different charge state envelopes of coeluting analyte ions present in a MS-survey scan, or present in a mass spectrum produced by averaging across multiple MS-survey scans;

(b) defining a first isolation window for the quadrupole mass filter to select at least one charge state from a single charge state envelope of multiple charge state envelopes present in the mass spectrum and corresponding to different coeluting analyte ions, preferably a charge state that has no overlap with any other charge state corresponding to a different analyte ion;

(c) subjecting the at least one selected charge state to an MS2 activation-dissociation step and performing multiple scans on the same charge state to improve statistics and signal-to-noise of the MS2 spectrum corresponding to the selected charge state to improve the fidelity of the fragment ion isotopic distributions and facilitate data analysis and data interpretation;

(d) defining a second isolation window of the quadrupole mass filter based on information available in step (a) to select at least another charge state from a different charge state envelope of the multiple charge state envelopes present in the mass spectrum and corresponding to different coeluting analyte ions;

(e) subjecting the charge state selected in step (d) to an MS2 activation-dissociation step and performing multiple scans on the same charge state to improve statistics and signal-to-noise of the MS2 spectrum; and (f) repeating steps (b) and (c) or steps (d) and (e) on additional charge states belonging to different and/or to the same charge state envelopes before completing a cycle and prior to initiating a subsequent MS-survey scan as described in step (a).

Steps (d) and (e) can be omitted. For example, steps (b) and (c) can be followed by step (f) where a different charge state from the same charge state envelope can be selected and subjected to MS2 ion activation-dissociation.

The new DDA method combined with the new design architecture differs from the standard TOP N method where analyte ions are selected based on their intensities, typically starting by selecting the most abundant analyte ions and progressively selecting ions of lower intensity from an ion intensity list generated based on MS-survey scan information which is further combined with an precursor or analyte ion exclusion list. In this new mode of operation, the process of selecting at least one charge state corresponding to an analyte is based on identifying all charge states belonging to the same charge state envelope and driving the mass-to-charge selection process using the quadrupole mass filter in a way to avoid co-selecting overlapping charge states belonging to different charge state envelopes and corresponding different analytes. For example, if the most abundant charge state from a first charge state envelope overlaps with another charge state from a second charge state envelope, then the new DDA algorithm will search and drive the quadrupole mass filter to select the highest most abundant charge state from the first charge state envelope that has no overlap and can be mass selected without including different analyte ions in the quadrupole isolation window. This method allows for generating high quality top-down data during an LC/MS experiment of intact proteins, for example, where all fragment ions belong to a single analyte ion, facilitating data analysis and data interpretation.

The DDA method may also include the following parametrization options:

Defining the number of MS-survey scans independently and summing these scans up to generate an averaged mass spectrum before the charge state deconvolution algorithm can be applied.

Applying the charge state deconvolution (CSD) algorithm to calculate the most abundant charge states corresponding to the most abundant or to every charge state envelope and/or all charge states of all the different charge state envelopes, including neutral mass and ion intensity information. The CSD algorithm may also return a predetermined number of charge state envelopes and/or provide information on a limited number of non-overlapping charge states only that will be subsequently analyzed at the MS2 level to improve the speed of the calculation and maintain a high measurement duty cycle.

Defining the number of MS2 scans by selecting (a) the total duration of MS2 scans and/or the number of MS2 TOF extraction pulses, for example, accommodating fixed or variable accumulation times and fixed or variable ion activation-dissociation times, (b) the number of analyte or precursor charge state envelopes that will be subjected to fragmentation, starting from the most abundant analyte or precursor ions that can be isolated efficiently without overlapping species present in the mass spectrum, and (c) defining an exclusion period for processing less abundant precursor or analyte charge states from previous steps.

Preferably, MS2 scans on the same precursor or analyte charge state are performed sequentially, without alternating MS2 scans between a first and a second precursor.

The new DDA method may also include defining the ExD reaction time, for example, based on a calibration table where charge state and number of ions are correlated to the ion-electron reaction period. The new DDA method may also include defining the accumulation time based on ion current measurements using MS-survey scan information or an electrometer connected to an electrode along the ion path. The new DDA method may also include the option of defining the number of MS-survey scans and MS2 or MSn scans independently and depending on analyte ion intensity information. Higher abundance analyte ions may require a smaller number of MS2 scans to be performed compared to low abundance species where statistics and averaging across multiple scans is crucial for producing meaningful fragmentation spectra. The new DDA method may also include the option to co-isolate charge states from different charge state envelopes that may correspond to the same protein group. For example, two different charge state envelopes maybe equally spaced on the m/z scale, exhibiting a constant neutral mass difference due to a modification in the amino acid sequence or due to adduct ion formation. The DDA method may also include a fast prescan option performed with a short accumulation time to optimally define the accumulation time of the subsequent MS-survey scan.

FIG. 9 schematically depicts methods according to exemplary embodiments.

Briefly, FIG. 9 schematically depicts 59 methods according to exemplary embodiments (Examples 2 to 60 inclusive) that include accumulation of ions (generally, storing-trapping and/or accumulating of ions) in the collision cell. Example 1 is also a method according to an exemplary embodiment, particularly a survey scan. Generally, the methods according to the exemplary embodiments of Tables 1 to 5 may also include accumulation of ions (generally, storing-trapping and/or accumulating of ions) in the collision cell. Examples 1 to 60 of FIG. 9 are shown as flow diagrams (swim lane diagrams), rather than as table rows (c.f. Tables 1 to 5), to more clearly represent the upstream and downstream transfer of ions within an experimental cycle.

The new DDA method disclosed herein is developed to drive the different workflows described with references to FIGS. 2, 3, 5, 6, 7, 8 and 9. The new DDA method disclosed herein may also apply to the workflows with multiple stages of fragmentation, similarly to the method disclosed with reference to FIG. 4. In addition, the DDA workflows based on the new instrument architecture can be configured using the standard top N DDA method known in the art. Furthermore, the new DDA method can be used to configure the new instrument architecture to enable combinations of the different MS, MS2, MS3 and MS4 scans involving either accumulating ions using the different trapping devices and/or combining these with pass-through mode scans in every stage of an MSn workflow.

Although a preferred embodiment has been shown and described, it will be appreciated by those skilled in the art that various changes and modifications might be made without departing from the scope of the invention, as defined in the appended claims and as described above.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

TABLE 1

Example scan modes for an exemplary embodiment. Preferred scan modes in bold. Accumulation or IMS is preferred. Transfer indicates that the ions are transferred by that ion optical element, without additional processing.

| Scan | ion source | trapping device | first quadrupole mass filter | linear quadrupole ion trap | second quadrupole mass filter | cell collision | mass analyzer |
|---|---|---|---|---|---|---|---|
| Survey MS | precursor ions | transfer, accumulation and/or IMS | transfer | transfer | transfer | transfer | mass spectra of all precursor ions |
| MS2 | precursor ions | transfer, accumulation and/or IMS | transfer | MS2 ion activation and/or dissociation of precursor ions, generating MS2 product ions from precursor ions | transfer | transfer | mass spectra of all MS2 product ions |
| MS2 | precursor ions | transfer, accumulation and/or IMS | transfer | MS2 ion activation and/or dissociation of precursor ions, generating MS2 product ions from precursor ions | mass filtering of MS2 product ions | transfer | mass spectra of mass filtered MS2 product ions |
| MS2 | precursor ions | transfer, accumulation or IMS | transfer | transfer | transfer | CID of precursor ions, generating MS2 product ions from precursor ions | mass spectra of all MS2 product ions |
| MS2 | precursor ions | transfer, accumulation andor IMS | mass filtering of precursor ions (e.g. identified from survey scan) | transfer | transfer | CID of mass filtered precursor ions, generating MS2 product ions from mass filtered precursor ions | mass spectra of MS2 product ions, acquired from mass filtered precursor ions |
| MS2 | precursor ions | transfer, accumulation and/or IMS | mass filtering of precursor ions (e.g. identified from survey scan) | MS2 ion activation and/or dissociation of mass filtered precursor ions, generating MS2 product ions from mass filtered precursor ions | transfer | transfer | mass spectra of MS2 product ions, acquired from mass filtered precursor ions |

TABLE 1-continued

Example scan modes for an exemplary embodiment. Preferred scan modes in bold. Accumulation or IMS is preferred. Transfer indicates that the ions are transferred by that ion optical element, without additional processing.

| Scan | ion source | trapping device | first quadrupole mass filter | linear quadrupole ion trap | second quadrupole mass filter | cell collision | mass analyzer |
|---|---|---|---|---|---|---|---|
| MS2 | precursor ions | transfer, accumulation and/or IMS | mass filtering of precursor ions (e.g. identified from survey scan) | MS2 ion activation and/or dissociation of mass filtered precursor ions, generating MS2 product ions from mass filtered precursor ions | mass filtering of MS2 product ions | transfer | mass spectra of mass filtered MS2 product ions |
| MS3 | precursor ions | transfer, accumulation and/or IMS | transfer | MS2 ion activation and/or dissociation of precursor ions, generating MS2 product ions from precursor ions | mass filtering of MS2 product ions | CID of mass filtered MS2 product ions, generating MS3 product ions from mass filtered MS2 product ions | mass spectra of MS3 product ions |
| MS3 | precursor ions | transfer, accumulation and/or IMS | mass filtering of precursor ions (e.g. identified from survey scan) | MS2 ion activation and/or dissociation of mass filtered precursor ions, generating MS2 product ions from mass filtered precursor ions | mass filtering of MS2 product ions | CID of mass filtered MS2 product ions, generating MS3 product ions from mass filtered MS2 product ions | mass spectra of MS3 product ions |

TABLE 2

Example scan modes for an exemplary embodiment, including ion mobility separation in detail. IMS precursor ions are ion mobility separated precursor ions. Ion mobility separation is preserved in each of the ion optical elements downstream of the IMS. Preferred scan modes in bold. Transfer indicates that the ions are transferred by that ion optical element, without additional processing. Accumulation and IMS may be combined, IMS used alone or accumulation used alone.

| Scan | ion source | trapping device | first quadrupole mass filter | linear quadrupole ion trap | second quadrupole mass filter | cell collision | mass analyzer |
|---|---|---|---|---|---|---|---|
| Survey MS | precursor ions | IMS | transfer IMS precursor ions | transfer IMS precursor ions | transfer IMS precursor ions | transfer IMS precursor ions | mass spectra of all IMS precursor ions |

TABLE 2-continued

Example scan modes for an exemplary embodiment, including ion mobility separation in detail. IMS precursor ions are ion mobility separated precursor ions. Ion mobility separation is preserved in each of the ion optical elements downstream of the IMS. Preferred scan modes in bold. Transfer indicates that the ions are transferred by that ion optical element, without additional processing. Accumulation and IMS may be combined, IMS used alone or accumulation used alone.

| Scan | ion source | trapping device | first quadrupole mass filter | linear quadrupole ion trap | second quadrupole mass filter | cell collision | mass analyzer |
|---|---|---|---|---|---|---|---|
| MS2 | precursor ions | IMS | transfer IMS precursor ions | MS2 ion activation and/or dissociation of precursor ions, generating MS2 product ions from IMS precursor ions | transfer MS2 product ions | transfer MS2 product ions | mass spectra of all MS2 product ions |
| MS2 | precursor ions | IMS | transfer IMS precursor ions | MS2 ion activation and/or dissociation of precursor ions, generating MS2 product ions from precursor ions | mass filtering of MS2 product ions | transfer mass filtered MS2 product ions | mass spectra of mass filtered MS2 product ions |
| MS2 | precursor ions | IMS | transfer IMS precursor ions | transfer IMS precursor ions | transfer IMS precursor ions | CID of precursor ions, generating MS2 product ions from precursor ions | mass spectra of all MS2 product ions |
| MS2 | precursor ions | IMS | mass filtering of IMS precursor ions (e.g. identified from survey scan) | transfer mass filtered IMS precursor ions | transfer filtered IMS precursor ions | CID of mass filtered IMS precursor ions, generating MS2 product ions from mass filtered precursor ions | mass spectra of MS2 product ions, acquired from mass filtered precursor ions |
| MS2 | precursor ions | IMS | mass filtering of IMS precursor ions (e.g. identified from survey scan) | MS2 ion activation and/or dissociation of mass filtered IMS precursor ions, generating MS2 product ions from mass filtered IMS precursor ions | transfer MS2 product ions | transfer MS2 product ions | mass spectra of MS2 product ions, acquired from mass filtered precursor ions |
| MS2 | precursor ions | IMS | mass filtering of IMS precursor ions (e.g. identified from survey scan) | MS2 ion activation and/or dissociation of mass filtered IMS precursor ions, | mass filtering of MS2 product ions | transfer mass filtered MS2 product ions | mass spectra of mass filtered MS2 product ions |

TABLE 2-continued

Example scan modes for an exemplary embodiment, including ion mobility separation in detail. IMS precursor ions are ion mobility separated precursor ions. Ion mobility separation is preserved in each of the ion optical elements downstream of the IMS. Preferred scan modes in bold. Transfer indicates that the ions are transferred by that ion optical element, without additional processing. Accumulation and IMS may be combined, IMS used alone or accumulation used alone.

| Scan | ion source | trapping device | first quadrupole mass filter | linear quadrupole ion trap | second quadrupole mass filter | cell collision | mass analyzer |
|---|---|---|---|---|---|---|---|
| MS3 | precursor ions | IMS | transfer | generating MS2 product ions from mass filtered IMS precursor ions MS2 ion activation and/or dissociation of IMS precursor ions, generating MS2 product ions from precursor ions | mass filtering of MS2 product ions | CID of mass filtered MS2 product ions, generating MS3 product ions from mass filtered MS2 product ions | mass spectra of MS3 product ions |
| MS3 | precursor ions | IMS | mass filtering of IMS precursor ions (e.g. identified from survey scan) | MS2 ion activation and/or dissociation of mass filtered IMS precursor ions, generating MS2 product ions from mass filtered IMS precursor ions | mass filtering of MS2 product ions | CID of mass filtered MS2 product ions, generating MS3 product ions from mass filtered MS2 product ions | mass spectra of MS3 product ions |

TABLE 3

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap).

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| Survey | Precursor ions | transfer, accumulation and/or IMS | transfer | transfer | transfer | transfer | transfer | mass spectra of all precursor ions |

TABLE 3-continued

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap).

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| MS2 | precursor ions | transfer, accumulation and/or IMS | transfer | mass filtering of precursor ions (e.g. identified from survey scan) | MS2 ion activation dissociation of mass filtered precursor ions, generating MS2 product ions from mass filtered precursor ions | transfer | transfer | mass spectra of MS2 product ions, acquired from mass filtered precursor ions |
| MS2 | precursor ions | transfer, accumulation and/or IMS | transfer | mass filtering of precursor ions (e.g. identified from survey scan) | transfer | transfer | CID of mass filtered precursor ions, generating MS2 product ions from mass filtered precursor ions | mass spectra of MS2 product lions, acquired from mass filtered precursor ions |
| MS2 | precursor ions | transfer, accumulation and/or IMS | transfer | mass filtering of precursor ions (e.g. identified from survey scan) | MS2 ion activation and/or dissociation of mass filtered precursor ions, generating MS2 product ions from mass filtered precursor ions | transfer | transfer | mass spectra of MS2 product ions, acquired from mass filtered precursor ions |
| MS2 | precursor ions | transfer, accumulation and/or IMS | transfer | transfer | MS2 ion activation and/or dissociation of precursor ions, generating MS2 product ions from precursor ions | transfer | transfer | mass spectra of all MS2 product ions |
| MS2 | precursor ions | transfer, accumulation and/or IMS | transfer | transfer | MS2 ion activation and/or dissociation of precursor ions, generating | mass filtering of MS2 product ions | transfer | mass spectra of mass filtered MS2 product ions |

TABLE 3-continued

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap).

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| MS2 | precursor ions | transfer, accumulation and/or IMS | transfer | transfer | MS2 product ions from precursor ions transfer | transfer | CID of precursor ions, generating MS2 product ions from precursor ions | mass spectra of all MS2 product ions |
| MS2 | precursor ions | transfer, accumulation and/or IMS | MS2 ion activation and/or dissociation of precursor ions, generating MS2 product ions from precursor ions | transfer | transfer | transfer | transfer | mass spectra of all MS2 product ions |
| MS2 | precursor ions | transfer, accumulation and/or IMS | MS2 ion activation and/or dissociation of precursor ions, generating MS2 product ions from precursor ions | mass filtering of MS2 product ions | transfer | transfer | transfer | mass spectra of mass filtered MS2 product ions |
| MS2 | precursor ions | transfer, accumulation and/or IMS | MS2 ion activation and/or dissociation of precursor ions, generating MS2 product ions from precursor ions | transfer | transfer | mass filtering of MS2 product ions | transfer | mass spectra of mass filtered MS2 product ions |
| MS3 | precursor ions | transfer, accumulation and/or IMS | MS2 ion activation and/or dissociation of precursor ions, generating MS2 product ions from precursor ions | mass filtering of MS2 product ions | MS3 ion activation and/or dissociation of mass filtered MS2 product ions, generating MS3 product ions from MS2 product ions | transfer | transfer | mass spectra of all MS3 product ions |
| MS3 | precursor ions | transfer, accumulation and/or IMS | MS2 ion activation and/or dissociation of precursor ions, generating | mass filtering of MS2 product ions | MS3 ion activation and/or dissociation of mass filtered MS2 product | mass filtering of MS3 product ions | transfer | mass spectra of mass filtered MS3 product ions |

TABLE 3-continued

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap).

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| | | | MS2 product ions from precursor ions | | ions, generating MS3 product ions from MS2 product ions | | | |
| MS3 | precursor ions | transfer, accumulation and/or IMS | MS2 ion activation and/or dissociation of precursor ions, generating MS2 product ions from precursor ions | mass filtering of MS2 product ions | transfer | transfer | CID of mass filtered MS2 product ions, generating MS3 product ions from MS2 product ions | mass spectra of MS3 product ions |
| MS4 | precursor ions | transfer, accumulation and/or IMS | MS2 ion activation and/or dissociation of precursor ions, generating MS2 product ions from precursor ions | mass filtering of MS2 product ions | MS3 ion activation and/or dissociation of mass filtered MS2 product ions, generating MS3 product ions from MS2 product ions | transfer | CID of MS3 product ions, generating MS4 product ions from MS3 product ions | mass spectra of MS4 product ion |
| MS4 | precursor ions | transfer, accumulation and/or IMS | MS2 ion activation and/or dissociation of precursor ions, generating MS2 product ions from precursor ions | mass filtering of MS2 product ions | MS3 ion activation and/or dissociation of MS2 product ions, generating MS3 product ions from MS2 product ions | mass filtering of MS3 product ions | CID of mass filtered MS3 product ions, generating MS4 product ions from MS3 product ions | mass spectra of MS4 product ions |
| MS4 | precursor ions | transfer, accumulation and/or IMS | MS2 ion activation and/or dissociation of precursor ions, generating MS2 product ions from precursor ions | mass filtering of MS2 product ions | MS3 ion activation and/or dissociation of MS2 product ions, generating MS3 product ions from MS2 product ions, mass selection of MS3 product ions and MS4 ion activation and/or dissociation | transfer | transfer | mass spectra of mass filtered MS4 product ions |

TABLE 3-continued

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap).

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| MS4 | precursor ions | transfer, accumulation and/or IMS | MS2 ion activation and/or dissociation of precursor ions, generating MS2 product ions from precursor ions | mass filtering of MS2 product ions | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the MS3 product ions | mass filtering of MS4 product ions | transfer | mass spectra of mass filtered MS4 product ions |
| MS5 | precursor ions | transfer, accumulation and/or IMS | MS2 ion activation and/or dissociation of precursor ions, generating MS2 product ions from precursor ions | mass filtering of MS2 product ions | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the MS3 product | transfer | CID of MS4 product ions, generating MS5 product ions from MS5 product ions | Mass spectra of MS5 product ions |

TABLE 3-continued

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap).

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| MS5 | precursor ions | transfer, accumulation and/or IMS | MS2 ion activation and/or dissociation of precursor ions, generating MS2 product ions from precursor ions | mass filtering of MS2 product ions | ionsoptical element) MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the MS3 product ions | mass filtering of MS4 product ions | CID of MS4 product ions, generating MS5 product ions from MS5 product ions | Mass spectra of mass filtered MS5 product ions |

TABLE 4

Example scan modes for an exemplary embodiment, including ion mobility separation in detail. Preferred scan modes in bold. IMS precursor ions are ion mobility separated precursor ions. Ion mobility separation is preserved in each of the ion optical elements downstream of the IMS. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). Accumulation and IMS may be combined, IMS used alone or accumulation used alone.

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| Survey | precursor ions | IMS | transfer IMS precursor ions | transfer IMS precursor ions | transfer IMS precursor ions | transfer IMS precursor ions | transfer IMS precursor ions | mass spectra of all IMS precursor ions |
| MS2 | precursor ions | IMS | transfer IMS precursor ions | mass filtering of IMS precursor ions (e.g. identified from survey scan) | MS2 ion activation and/or dissociation of mass filtered precursor | transfer product ions | transfer product ions | mass spectra of MS2 product ions, acquired |

TABLE 4-continued

Example scan modes for an exemplary embodiment, including ion mobility separation in detail. Preferred scan modes in bold. IMS precursor ions are ion mobility separated precursor ions. Ion mobility separation is preserved in each of the ion optical elements downstream of the IMS. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). Accumulation and IMS may be combined, IMS used alone or accumulation used alone.

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| | | | | | ions, generating MS2 product ions from mass filtered IMS precursor ions | | | from mass filtered precursor ions |
| MS2 | precursor ions | IMS | transfer IMS precursor ions | mass filtering of IMS precursor ions (e.g. identified from survey scan) | transfer mass filtered IMS precursor ions | transfer mass filtered IMS precursor ions | CID of mass filtered IMS precursor ions, generating MS2 product ions from mass filtered IMS precursor ions | mass spectra of MS2 product ions, acquired from mass filtered precursor ions |
| MS2 | precursor ions | IMS | transfer IMS precursor ions | mass filtering of precursor ions (e.g. identified from survey scan) | MS2 ion activation and/or dissociation of mass filtered precursor ions, generating MS2 product ions from mass filtered precursor ions | transfer MS2 product ions | transfer MS2 product ions | mass spectra of MS2 product ions, acquired from mass filtered precursor ions |
| MS2 | precursor ions | MS | transfer IMS precursor ions | transfer IMS precursor ions | MS2 ion activation and/or dissociation of precursor ions, generating MS2 product ions from IMS precursor ions | transfer MS2 product ions | transfer MS2 product ions | mass spectra of all MS2 product ions |
| MS2 | precursor ions | IMS | transfer IMS precursor ions | transfer IMS precursor ions | MS2 ion activation and/or dissociation of IMS precursor ions, generating MS2 product ions from IMS precursor ions | mass filtering of MS2 product ions | transfer mass filtered MS3 product ions | mass spectra of mass filtered MS2 product ions |
| MS2 | precursor ions | IMS | transfer IMS precursor ions | transfer IMS precursor ions | transfer IMS precursor ions | transfer IMS precursor ions | CID of IMS precursor ions, generating MS2 product | mass spectra of all MS2 product ions |

TABLE 4-continued

Example scan modes for an exemplary embodiment, including ion mobility separation in detail. Preferred scan modes in bold. IMS precursor ions are ion mobility separated precursor ions. Ion mobility separation is preserved in each of the ion optical elements downstream of the IMS. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). Accumulation and IMS may be combined, IMS used alone or accumulation used alone.

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| MS2 | precursor ions | IMS | MS2 ion activation and/or dissociation of IMS precursor ions, generating MS2 product ions from IMS precursor ions | transfer MS2 product ions | transfer MS2 product ions | transfer MS2 product ions | transfer MS2 product ions | mass spectra of all MS2 product ions from precursor ions |
| MS2 | precursor ions | transfer, accumulation or IMS | MS2 ion activation and/or dissociation of IMS precursor ions, generating MS2 product ions from IMS precursor ions | mass filtering of MS2 product ions | transfer mass filtered MS2 product ions | transfer mass filtered MS2 product ions | transfer mass filtered MS2 product ions | mass spectra of mass filtered MS2 product ions |
| MS2 | precursor ions | IMS | MS2 ion activation and/or dissociation of IMS precursor ions, generating MS2 product ions from IMS precursor ions | transfer MS2 product ions | transfer MS2 product ions | mass filtering of MS2 product ions | transfer mass filtered MS2 product ions | mass spectra of mass filtered MS2 product ions |
| MS3 | precursor ions | IMS | MS2 ion activation and/or dissociation of IMS precursor ions, generating MS2 product ions from IMS precursor ions | mass filtering of MS2 product ions | MS3 ion activation and/or dissociation of mass filtered MS2 product ions, generating MS3 product ions from MS2 product ions | transfer MS3 product ions | transfer MS3 product ions | mass spectra of all MS3 product ions |
| MS3 | precursor ions | IMS | MS2 ion activation and/or dissociation of IMS precursor ions, generating MS2 product ions from IMS precursor ions | mass filtering of MS2 product ions | MS3 ion activation and/or dissociation of mass filtered MS2 product ions, generating MS3 product ions from MS2 product ions | mass filtering of MS3 product ions | transfer mass filtered MS3 product ions | mass spectra of mass filtered MS3 product ions |
| MS3 | precursor ions | IMS | MS2 ion activation and/or dissociation of IMS precursor ions, generating MS2 product ions from IMS precursor ions | mass filtering of MS2 product ions | transfer mass filtered MS2 product ions | transfer mass filtered MS2 product ions | CID of mass filtered MS2 product ions, generating MS3 product ions from MS2 product ions | mass spectra of MS3 product ions |

TABLE 4-continued

Example scan modes for an exemplary embodiment, including ion mobility separation in detail. Preferred scan modes in bold. IMS precursor ions are ion mobility separated precursor ions. Ion mobility separation is preserved in each of the ion optical elements downstream of the IMS. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). Accumulation and IMS may be combined, IMS used alone or accumulation used alone.

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| MS4 | precursor ions | IMS | MS2 ion activation and/or dissociation of precursor ions, generating MS2 product ions from IMS precursor ions | mass filtering of MS2 product ions | MS3 ion activation and/or dissociation of mass filtered MS2 product ions, generating MS3 product ions from MS2 product ions | transfer mass filtered MS3 product ions | CID of MS3 product ions, generating MS4 product ions from MS3 product ions | mass spectra of MS4 product ions |
| MS4 | precursor ions | IMS | MS2 ion activation and/or dissociation of IMS precursor ions, generating MS2 product ions from IMS precursor ions | mass filtering of MS2 product ions | MS3 ion activation and/or dissociation of MS2 product ions, generating MS3 product ions from MS2 product ions | mass filtering of MS3 product ions | CID of mass filtered MS3 product ions, generating MS4 product ions from MS3 product ions | mass spectra of MS4 product ions |
| MS4 | precursor ions | IMS | MS2 ion activation and/or dissociation of IMS precursor ions, generating MS2 product ions from IMS precursor ions | mass filtering of MS2 product ions | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the mass selected MS3 product ions | transfer MS4 product ions | transfer MS4 product ions | mass spectra of MS4 product ions |
| MS4 | precursor ions | IMS | MS2 ion activation and/or dissociation of IMS precursor ions, generating MS2 product ions from IMS precursor ions | mass filtering of MS2 product ions | MS3 ion activation and/or dissociation of MS2 product ions, generating MS3 product ions from MS2 product ions, mass selection of | mass filtering of MS4 product ions | transfer mass filtered MS4 product ions | mass spectra of mass filtered MS4 product ions |

TABLE 4-continued

Example scan modes for an exemplary embodiment, including ion mobility separation in detail. Preferred scan modes in bold. IMS precursor ions are ion mobility separated precursor ions. Ion mobility separation is preserved in each of the ion optical elements downstream of the IMS. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). Accumulation and IMS may be combined, IMS used alone or accumulation used alone.

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| | | | | | MS3 product ions and MS4 ion activation and/or dissociation of the mass selected MS3 product ions, generating MS4 product ions from the mass selected MS3 product ions | | | |
| MS5 | precursor ions | IMS | MS2 ion activation and/or dissociation of IMS precursor ions, generating MS2 product ions from IMS precursor ions | mass filtering of MS2 product ions | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the mass selected MS3 product ions | transfer MS4 product ions | CID of MS4 product ions, generating MS5 product ions from MS5 product ions | Mass spectra of MS5 product ions |
| MS5 | precursor ions | IMS | MS2 ion activation and/or dissociation of IMS precursor ions, generating MS2 product ions from IMS precursor ions | mass filtering of MS2 product ions | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the mass selected | mass filtering of MS4 product ions | CID of MS4 product ions, generating MS5 product ions from MS5 product ions | Mass spectra of mass filtered MS5 product ions |

TABLE 4-continued

Example scan modes for an exemplary embodiment, including ion mobility separation in detail. Preferred scan modes in bold. IMS precursor ions are ion mobility separated precursor ions. Ion mobility separation is preserved in each of the ion optical elements downstream of the IMS. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap).
Accumulation and IMS may be combined, IMS used alone or accumulation used alone.

| Scan | ion source | trapping device | activation-dissociation region (before or after trapping device) | first quadrupole mass filter | linear quadrupole ion trap | second quadrupole mass filter | collision cell | mass analyzer |
|---|---|---|---|---|---|---|---|---|
| | | | | | MS3 product ions | | | |

TABLE 5

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). See also Table 3.

| Scan | ion source 101 | trapping device 102 | ion funnel 110 | RF ion guide 112 | first quadrupole mass filter 103 | DC lenses 114 | RF ion guide 115 | linear quadrupole ion trap 104 | second quadrupole mass filter 105 | collision cell 106 | mass analyzer 107 |
|---|---|---|---|---|---|---|---|---|---|---|---|
| Survey e.g. 409 | precursor ions | transfer, accumulation and/or IMS | transfer | transfer | transfer | transfer | transfer | transfer | transfer | transfer | mass spectra of all precursor ions |
| MS2 e.g. 404 | precursor ions | transfer, accumulation and/or IMS | transfer | transfer | mass filtering of precursor ions (e.g. identified from survey scan) | transfer | transfer | MS2 ion activation and/or dissociation of mass filtered precursor ions, generating MS2 product ions from mass filtered precursor ions | transfer | transfer | mass spectra of MS2 product ions, acquired from mass filtered precursor ions |
| MS2 e.g. 404 | precursor ions | transfer, accumulation and/or IMS | transfer | transfer | mass filtering of precursor ions (e.g. identified from survey scan) | transfer | transfer | transfer | transfer | CID of mass filtered precursor ions, generating MS2 product ions from mass filtered precursor ions | mass spectra of MS2 product ions, acquired from mass filtered precursor ions |
| MS2 | precursor ions (in-source and/or post-source ion activation | transfer, accumulation and/or IMS | MS2 ion activation and/or dissociation of precursor ions, | transfer | transfer | transfer | transfer | transfer | transfer | transfer | mass spectra of all MS2 product ions |

TABLE 5-continued

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). See also Table 3.

| Scan | ion source 101 | trapping device 102 | ion funnel 110 | RF ion guide 112 | first quadrupole mass filter 103 | DC lenses 114 | RF ion guide 115 | linear quadrupole ion trap 104 | second quadrupole mass filter 105 | collision cell 106 | mass analyzer 107 |
|---|---|---|---|---|---|---|---|---|---|---|---|
| | and/or dissociation or precursor ions as alternative to ion funnel, generating MS2 product ions from precursor ions- applies to all) | | generating MS2 product ions from precursor ions | | | | | | | | |
| MS2 | precursor ions | transfer, accumulation and/or IMS | MS2 ion activation and/or dissociation of precursor ions, generating MS2 product ions from precursor ions | transfer | mass filtering of MS2 product ions | transfer | transfer | transfer | transfer | transfer | mass spectra of mass filtered MS2 product ions |
| MS2 | precursor ions | transfer, accumulation and/or IMS | MS2 ion activation and/or dissociation of precursor ions, generating MS2 product ions from precursor ions | transfer | transfer | transfer | transfer | transfer | mass filtering of MS2 product ions | transfer | mass spectra of mass filtered MS2 product ions |
| MS2 | precursor ions | transfer, accumulation and/or IMS | transfer | transfer | transfer | transfer | transfer | MS2 ion activation and/or dissociation of precursor ions, generating MS2 product ions from precursor ions | transfer | transfer | mass spectra of all MS2 product ions |
| MS2 | precursor ions | transfer, accumulation and/or IMS | transfer | transfer | transfer | transfer | transfer | MS2 ion activation and/or dissociation of precursor ions, generating MS2 product | mass filtering of MS2 product ions | transfer | mass spectra of mass filtered MS2 product ions |

TABLE 5-continued

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). See also Table 3.

| Scan | ion source 101 | trapping device 102 | ion funnel 110 | RF ion guide 112 | first quadrupole mass filter 103 | DC lenses 114 | RF ion guide 115 | linear quadrupole ion trap 104 | second quadrupole mass filter 105 | collision cell 106 | mass analyzer 107 |
|---|---|---|---|---|---|---|---|---|---|---|---|
| MS2 | precursor ions | transfer, accumulation and/or IMS | transfer | transfer | transfer | transfer | transfer | ions from precursor ions transfer | transfer | CID of precursor ions, generating MS2 product ions from precursor ions | MS2 mass spectra of all product ions |
| MS3 e.g. 404 | precursor ions | transfer, accumulation and/or IMS | MS2 ion activation and/or dissociation of precursor ions, generating MS2 product ions from precursor ions | transfer | mass filtering of MS2 product ions | transfer | transfer | MS3 ion activation and/or dissociation of mass filtered MS2 product ions, generating MS3 product ions from MS2 product ions | transfer | transfer | mass spectra of all MS3 product ions |
| MS3 | precursor ions | transfer, accumulation and/or IMS | MS2 ion activation and/or dissociation of precursor ions, generating MS2 product ions from precursor ions | transfer | mass filtering of MS2 product ions | transfer | transfer | MS3 ion activation and/or dissociation of mass filtered MS2 product ions, generating MS3 product ions from MS2 product ions | mass filtering of MS3 product ions | transfer | mass spectra of mass filtered MS3 product ions |
| MS3 | precursor ions | transfer accumulation and/or IMS | MS2 ion activation and/or dissociation of precursor ions, generating MS2 product ions from precursor ions | transfer | mass filtering of MS2 product ions | transfer | transfer | transfer | transfer | CID of mass filtered MS2 product ions, generating MS3 product ions from MS2 product ions | mass spectra of MS3 product ions |
| MS3 | precursor ions | transfer, accumulation and/or IMS | MS2 ion activation and/or dissociation of precursor ions, | transfer | mass filtering of MS2 product ions | transfer | transfer | MS3 ion activation and/or dissociation of mass filtered | transfer | CID of MS3 product ions, generating MS4 product ions from | mass spectra of MS4 product ions |

TABLE 5-continued

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). See also Table 3.

| Scan | ion source 101 | trapping device 102 | ion funnel 110 | RF ion guide 112 | first quadrupole mass filter 103 | DC lenses 114 | RF ion guide 115 | linear quadrupole ion trap 104 | second quadrupole mass filter 105 | collision cell 106 | mass analyzer 107 |
|---|---|---|---|---|---|---|---|---|---|---|---|
| | | | generating MS2 product ions from precursor ions | | | | | MS2 product ions, generating MS3 product ions from MS2 product ions | | MS3 product ions | |
| MS4 e.g. 404 | precursor ions | transfer, accumulation and/or IMS | MS2 ion activation and/or dissociation of precursor ions, generating MS2 product ions from precursor ions | transfer | mass filtering of MS2 product ions | transfer | transfer | MS3 ion activation and/or dissociation of MS2 product ions, generating MS3 product ions from MS2 product ions | mass filtering of MS3 product ions | CID of mass filtered MS3 product ions, generating MS4 product ions from MS3 product ions | mass spectra of MS4 product ions |
| MS4 | precursor ions | transfer, accumulation and/or IMS | MS2 ion activation and/or dissociation of precursor ions, generating MS2 product ions from precursor ions | transfer | mass filtering of MS2 product ions | transfer | transfer | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the mass selected MS3 product ions | transfer | transfer | mass spectra of MS4 product ions |
| MS4 | precursor ions | transfer, accumulation and/or IMS | MS2 ion activation and/or dissociation of precursor ions, generating MS2 product ions from precursor ions, generating MS2 product ions | transfer | mass filtering of MS2 product ions | transfer | transfer | MS3 ion activation and/or dissociation of MS2 product ions, generating MS3 | mass filtering MS4 product ions | transfer | Mass spectra of mass filtered MS4 product ions |

TABLE 5-continued

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). See also Table 3.

| Scan | ion source 101 | trapping device 102 | ion funnel 110 | RF ion guide 112 | first quadrupole mass filter 103 | DC lenses 114 | RF ion guide 115 | linear quadrupole ion trap 104 | second quadrupole mass filter 105 | collision cell 106 | mass analyzer 107 |
|---|---|---|---|---|---|---|---|---|---|---|---|
| | | | MS2 product ions from precursor ions | | | | | product ions from MS2 product ions, mass selection of MS3 product ions and MS4 ion activation and/or dissociation of the mass selected MS3 product ions, generating MS4 product ions from the mass selected MS3 product ions | | | |
| MS5 | precursor ions | transfer, accumulation and/or IMS | MS2 ion activation and/or dissociation of precursor ions, generating MS2 product ions from precursor ions | transfer | mass filtering of MS2 product ions | transfer | transfer | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the mass selected MS3 product ions | transfer | CID of MS4 product ions, generating MS5 product ions from MS5 product ions | Mass spectra of MS5 product ions |

TABLE 5-continued

Example scan modes for an exemplary embodiment. Preferred scan modes in bold. Accumulation or IMS is preferred. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). See also Table 3.

| Scan | ion source 101 | trapping device 102 | ion funnel 110 | RF ion guide 112 | first quadrupole mass filter 103 | DC lenses 114 | RF ion guide 115 | linear quadrupole ion trap 104 | second quadrupole mass filter 105 | collision cell 106 | mass analyzer 107 |
|---|---|---|---|---|---|---|---|---|---|---|---|
| MS5 | precursor ions | transfer, accumulation and/or IMS | MS2 ion activation and/or dissociation of precursor ions, generating MS2 product ions from precursor ions | transfer | mass filtering of MS2 product ions | transfer | transfer | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the mass selected MS3 product ions | mass filtering of MS4 product ions | CID of mass filtered MS4 product ions, generating MS5 product ions from mass filtered MS4 product ions | Mass spectra of MS5 product ions |

TABLE 6

Example scan modes for an exemplary embodiment, including ion mobility separation in detail. Preferred scan modes in bold. IMS precursor ions are ion mobility separated precursor ions. Ion mobility separation is preserved in each of the ion optical elements downstream of the IMS. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). Accumulation and IMS may be combined, IMS used alone or accumulation used alone. See also Table 4.

| Scan | ion source 101 | trapping device 102 | ion funnel 110 | RF ion guide 112 | first quadrupole mass filter 103 | DC lenses 114 | RF ion guide 115 | linear quadrupole ion trap 104 | second quadrupole mass filter 105 | collision cell 106 | mass analyzer 107 |
|---|---|---|---|---|---|---|---|---|---|---|---|
| Survey e.g. 409 | precursor ions | IMS | transfer IMS precursor ions | transfer IMS precursor ions | transfer IMS precursor ions | transfer IMS precursor ions | transfer IMS precursor ions | transfer IMS precursor ions | transfer IMS precursor ions | transfer IMS precursor ions | mass spectra of all IMS precursor ions |

TABLE 6-continued

Example scan modes for an exemplary embodiment, including ion mobility separation in detail. Preferred scan modes in bold. IMS precursor ions are ion mobility separated precursor ions. Ion mobility separation is preserved in each of the ion optical elements downstream of the IMS. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). Accumulation and IMS may be combined, IMS used alone or accumulation used alone. See also Table 4.

| Scan | ion source 101 | trapping device 102 | ion funnel 110 | RF ion guide 112 | first quad-rupole mass filter 103 | DC lenses 114 | RF ion guide 115 | linear quad-rupole ion trap 104 | second quad-rupole mass filter 105 | collision cell 106 | mass analyzer 107 |
|---|---|---|---|---|---|---|---|---|---|---|---|
| MS2 e.g. 404 | precursor ions | IMS | transfer IMS precursor ions | transfer IMS precursor ions | mass filtering of IMS precursor ions (e.g. identified from survey scan) | transfer mass filtered IMS precursor ions | transfer mass filtered IMS precursor ions | MS2 ion activation and/or dissociation of mass filtered IMS precursor ions, generating MS2 product ions from mass filtered IMS precursor ions | transfer MS2 product ions | transfer MS2 product ions | mass spectra of MS2 product ions, acquired from mass filtered precursor ions |
| MS2 e.g. 404 | precursor ions | IMS | transfer IMS precursor ions | transfer IMS precursor ions | mass filtering of IMS precursor ions (e.g. identified from survey scan) | transfer mass filtered IMS precursor ions | transfer mass filtered IMS precursor ions | transfer mass filtered IMS precursor ions | transfer mass filtered IMS precursor ions | CID of mass filtered IMS precursor ions, generating MS2 product ions from mass filtered IMS precursor ions | mass spectra of MS2 product ions, acquired from mass filtered precursor ions |
| MS2 | precursor ions (in-source and/or post-source ion activation and/or dissociation or precursor ions as alternative to ion funnel, generating MS2 product ions from precursor ions-applies to all) | IMS | MS2 ion activation and/or dissociation of IMS precursor ions, generating MS2 product ions from IMS precursor ions | transfer MS2 product ions | transfer MS2 product ions | transfer MS2 product ions | transfer MS2 product ions | transfer MS2 product ions | transfer MS2 product ions | transfer MS2 product ions | mass spectra of all MS2 product ions |

TABLE 6-continued

Example scan modes for an exemplary embodiment, including ion mobility separation in detail. Preferred scan modes in bold.
IMS precursor ions are ion mobility separated precursor ions. Ion mobility separation is preserved in each of the ion optical elements
downstream of the IMS. Transfer indicates that the ions are transferred by that ion optical element, without additional processing.
For the linear quadrupole ion trap, MSn + 1 ion activation and/or dissociation of MSn (e.g. n = 1 or n = 2 or n = 3) product ions,
generating MSn + 1 product ions from MSn product ions and mass selection of MSn + 1 product ions and MSn + 2 ion activation
and/or dissociation of the mass selected MSn + 1 product ions requires two steps of ion activation-dissociation and may require an
accumulation step in the linear quadrupole ion trap). Accumulation and IMS may be combined, IMS used alone or
accumulation used alone. See also Table 4.

| Scan | ion source 101 | trapping device 102 | ion funnel 110 | RF ion guide 112 | first quadrupole mass filter 103 | DC lenses 114 | RF ion guide 115 | linear quadrupole ion trap 104 | second quadrupole mass filter 105 | collision cell 106 | mass analyzer 107 |
|---|---|---|---|---|---|---|---|---|---|---|---|
| MS2 | precursor ions | IMS | MS2 ion activation and/or dissociation of IMS precursor ions, generating MS2 product ions from IMS precursor ions | transfer MS2 product ions | mass filtering of MS2 product ions | transfer MS2 product ions | transfer MS2 product ions | transfer MS2 product ions | transfer MS2 product ions | transfer MS2 product ions | mass spectra of mass filtered MS2 product ions |
| MS2 | precursor ions | IMS | MS2 ion activation and/or dissociation of IMS precursor ions, generating MS2 product ions from IMS precursor ions | transfer MS2 product ions | transfer MS2 product ions | transfer MS2 product ions | transfer MS2 product ions | transfer MS2 product ions | mass filtering of MS2 product ions | transfer mass filtered MS2 product ions | mass spectra of mass filtered MS2 product ions |
| MS2 | precursor ions | IMS | transfer IMS precursor ions | transfer IMS precursor ions | transfer IMS precursor ions | transfer IMS precursor ions | transfer IMS precursor ions | MS2 ion activation and/or dissociation of IMS precursor ions, generating MS2 product ions from IMS precursor ions | transfer MS2 product ions | transfer MS2 product ions | mass spectra of all MS2 product ions |
| MS2 | precursor ions | IMS | transfer IMS precursor ions | transfer IMS precursor ions | transfer IMS precursor ions | transfer IMS precursor ions | transfer IMS precursor ions | MS2 ion activation and/or dissociation of IMS precursor ions, generating MS2 product ions from IMS precursor ions | mass filtering of MS2 product ions | transfer mass filtered MS2 product ions | mass spectra of mass filtered MS2 product ions |
| MS2 | precursor ions | IMS | transfer IMS precursor ions | transfer IMS precursor ions | transfer IMS precursor ions | transfer IMS precursor ions | transfer IMS precursor ions | transfer IMS precursor ions | transfer IMS precursor ions | CID of IMS precursor ions, generating MS2 product ions from IMS | mass spectra of all MS2 product ions |

TABLE 6-continued

Example scan modes for an exemplary embodiment, including ion mobility separation in detail. Preferred scan modes in bold.
IMS precursor ions are ion mobility separated precursor ions. Ion mobility separation is preserved in each of the ion optical elements
downstream of the IMS. Transfer indicates that the ions are transferred by that ion optical element, without additional processing.
For the linear quadrupole ion trap, MSn + 1 ion activation and/or dissociation of MSn (e.g. n = 1 or n = 2 or n = 3) product ions,
generating MSn + 1 product ions from MSn product ions and mass selection of MSn + 1 product ions and MSn + 2 ion activation
and/or dissociation of the mass selected MSn + 1 product ions requires two steps of ion activation-dissociation and may require an
accumulation step in the linear quadrupole ion trap). Accumulation and IMS may be combined, IMS used alone or
accumulation used alone. See also Table 4.

| Scan | ion source 101 | trapping device 102 | ion funnel 110 | RF ion guide 112 | first quad-rupole mass filter 103 | DC lenses 114 | RF ion guide 115 | linear quad-rupole ion trap 104 | second quad-rupole mass filter 105 | collision cell 106 | mass analyzer 107 |
|---|---|---|---|---|---|---|---|---|---|---|---|
| MS3 e.g. 404 | precursor ions | IMS | MS2 ion activation and/or dissociation of IMS precursor ions, generating MS2 product ions from IMS precursor ions | transfer MS2 product ions | mass filtering of MS2 product ions | transfer mass filtered MS2 product ions | transfer mass filtered MS2 product ions | MS3 ion activation and/or dissociation of mass filtered MS2 product ions, generating MS3 product ions from MS2 product ions | transfer mass filtered MS3 product ions | precursor ions transfer mass filtered MS3 product ions | mass spectra of all MS3 product ions |
| MS3 | precursor ions | IMS | MS2 ion activation and/or dissociation of IMS precursor ions, generating MS2 product ions from IMS precursor ions | transfer MS2 product ions | mass filtering of MS2 product ions | transfer mass filtered MS2 product ions | transfer mass filtered MS2 product ions | MS3 ion activation and/or dissociation of mass filtered MS2 product ions, generating MS3 product ions from MS2 product ions | mass filtering of MS3 product ions | transfer mass filtered MS3 product ions | mass spectra of mass filtered MS3 product ions |
| MS3 | precursor ions | IMS | MS2 ion activation and/or dissociation of IMS precursor ions, generating MS2 product ions from IMS precursor ions | transfer MS2 product ions | mass filtering of MS2 product ions | transfer mass filtered MS2 product ions | transfer mass filtered MS2 product ions | transfer mass filtered MS2 product ions | transfer mass filtered MS2 product ions | CID of mass filtered MS2 product ions, generating MS3 product ions from MS2 product ions | mass spectra of MS3 product ions |
| MS3 | precursor ions | IMS | MS2 ion activation and/or dissociation of IMS precursor ions, generating MS2 product ions from IMS precursor ions | transfer MS2 product ions | mass filtering of MS2 product ions | transfer mass filtered MS2 product ions | transfer mass filtered MS2 product ions | MS3 ion activation and/or dissociation of mass filtered MS2 product ions, generating MS3 product ions from MS2 product ions | transfer mass filtered MS3 product ions | CID of MS3 product ions, generating MS4 product ions from MS3 product ions | mass spectra of MS4 product ions |

TABLE 6-continued

Example scan modes for an exemplary embodiment, including ion mobility separation in detail. Preferred scan modes in bold. IMS precursor ions are ion mobility separated precursor ions. Ion mobility separation is preserved in each of the ion optical elements downstream of the IMS. Transfer indicates that the ions are transferred by that ion optical element, without additional processing. For the linear quadrupole ion trap, MSn + 1 ion activation and/or dissociation of MSn (e.g. n = 1 or n = 2 or n = 3) product ions, generating MSn + 1 product ions from MSn product ions and mass selection of MSn + 1 product ions and MSn + 2 ion activation and/or dissociation of the mass selected MSn + 1 product ions requires two steps of ion activation-dissociation and may require an accumulation step in the linear quadrupole ion trap). Accumulation and IMS may be combined, IMS used alone or accumulation used alone. See also Table 4.

| Scan | ion source 101 | trapping device 102 | ion funnel 110 | RF ion guide 112 | first quad-rupole mass filter 103 | DC lenses 114 | RF ion guide 115 | linear quad-rupole ion trap 104 | second quad-rupole mass filter 105 | collision cell 106 | mass analyzer 107 |
|---|---|---|---|---|---|---|---|---|---|---|---|
| MS4 e.g. 404 | precursor ions | IMS | MS2 ion activation and/or dissociation of IMS precursor ions, generating MS2 product ions from IMS precursor ions | transfer MS2 product ions | mass filtering of MS2 product ions | transfer mass filtered MS2 product ions | transfer mass filtered MS2 product ions | MS3 ion activation and/or dissociation of MS2 product ions, generating MS3 product ions from MS2 product ions | mass filtering of MS3 product ions | CID of mass filtered MS3 product ions, generating MS4 product ions from MS3 product ions | mass spectra of MS4 product ions |
| MS4 | precursor ions | IMS | MS2 ion activation and/or dissociation of IMS precursor ions, generating MS2 product ions from IMS precursor ions | transfer MS2 product ions | mass filtering of MS2 product ions | transfer mass filtered MS2 product ions | transfer mass filtered MS2 product ions | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the mass selected MS3 product ions | transfer MS4 product ions | transfer MS4 product ions | mass spectra of MS4 product ions |
| MS4 | precursor ions | IMS | MS2 ion activation and/or dissociation of IMS precursor ions, generating MS2 product ions from IMS precursor ions | transfer MS2 product ions | mass filtering of MS2 product ions | transfer mass filtered MS2 product ions | transfer mass filtered MS2 product ions | MS3 ion activation and/or dissociation of MS2 product ions, generating MS3 product ions from MS2 product ions, mass | mass filtering of MS4 product ions | transfer mass filtered MS4 product ions | Mass spectra of mass filtered MS4 product ions |

TABLE 6-continued

Example scan modes for an exemplary embodiment, including ion mobility separation in detail. Preferred scan modes in bold.
IMS precursor ions are ion mobility separated precursor ions. Ion mobility separation is preserved in each of the ion optical elements
downstream of the IMS. Transfer indicates that the ions are transferred by that ion optical element, without additional processing.
For the linear quadrupole ion trap, MSn + 1 ion activation and/or dissociation of MSn (e.g. n = 1 or n = 2 or n = 3) product ions,
generating MSn + 1 product ions from MSn product ions and mass selection of MSn + 1 product ions and MSn + 2 ion activation
and/or dissociation of the mass selected MSn + 1 product ions requires two steps of ion activation-dissociation and may require an
accumulation step in the linear quadrupole ion trap). Accumulation and IMS may be combined, IMS used alone or
accumulation used alone. See also Table 4.

| Scan | ion source 101 | trapping device 102 | ion funnel 110 | RF ion guide 112 | first quad-rupole mass filter 103 | DC lenses 114 | RF ion guide 115 | linear quad-rupole ion trap 104 | second quad-rupole mass filter 105 | collision cell 106 | mass analyzer 107 |
|---|---|---|---|---|---|---|---|---|---|---|---|
| | | | | | | | | selection of MS3 product ions and MS4 ion activation and/or dissociation of the mass selected MS3 product ions, generating MS4 product ions from the mass selected MS3 product ions | | | |
| MS5 | precursor ions | IMS | MS2 ion activation and/or dissociation of IMS precursor ions, generating MS2 product ions from IMS precursor ions | transfer MS2 product ions | mass filtering of MS2 product ions | transfer mass filtered MS2 product ions | transfer mass filtered MS2 product ions | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the mass selected MS3 product ions | transfer MS 4 product ions | CID of MS4 product ions, generating MS5 product ions from MS4 product ions | Mass spectra of MS5 product ions |

TABLE 6-continued

Example scan modes for an exemplary embodiment, including ion mobility separation in detail. Preferred scan modes in bold.
IMS precursor ions are ion mobility separated precursor ions. Ion mobility separation is preserved in each of the ion optical elements
downstream of the IMS. Transfer indicates that the ions are transferred by that ion optical element, without additional processing.
For the linear quadrupole ion trap, MSn + 1 ion activation and/or dissociation of MSn (e.g. n = 1 or n = 2 or n = 3) product ions,
generating MSn + 1 product ions from MSn product ions and mass selection of MSn + 1 product ions and MSn + 2 ion activation
and/or dissociation of the mass selected MSn + 1 product ions requires two steps of ion activation-dissociation and may require an
accumulation step in the linear quadrupole ion trap). Accumulation and IMS may be combined, IMS used alone or
accumulation used alone. See also Table 4.

| Scan | ion source 101 | trapping device 102 | ion funnel 110 | RF ion guide 112 | first quadrupole mass filter 103 | DC lenses 114 | RF ion guide 115 | linear quadrupole ion trap 104 | second quadrupole mass filter 105 | collision cell 106 | mass analyzer 107 |
|---|---|---|---|---|---|---|---|---|---|---|---|
| MS5 | precursor ions | IMS | MS2 ion activation and/or dissociation of IMS precursor ions, generating MS2 product ions from IMS precursor ions | transfer MS2 product ions | mass filtering of MS2 product ions | transfer mass filtered MS2 product ions | transfer mass filtered MS2 product ions | MS3 ion activation and/or dissociation of MS2 product ions, generating MS3 product ions from MS2 product ions, mass selection of MS3 product ions and MS4 ion activation and/or dissociation of the mass selected MS3 product ions, generating MS4 product ions from the mass selected MS3 product ions | mass filtering of MS4 product ions | CID of mass filtered MS4 product ions, generating MS5 product ions from mass filtered MS4 product ions | Mass spectra of MS5 product ions |

The invention claimed is:

1. An ion analysis apparatus, comprising:
an ionization source configured to generate a beam of ions;
a trapping device configured to receive the beam of ions and to axially transfer ions downstream;
a first quadrupole mass filter configured to receive the ions transferred from the trapping device and to transfer at least a first subset of the received ions;
a segmented linear quadrupole ion trap configured to receive the at least first subset of ions transferred from the first quadrupole mass filter, to perform a first processing step on the received at least first subset of ions and to transfer the processed ions;
a second quadrupole mass filter configured to receive the processed ions transferred from the segmented linear quadrupole ion trap and to transfer at least a second subset of the processed ions;
a collision cell configured to receive the at least second subset of ions transferred from the second quadrupole mass filter, to perform a second processing step on the received at least second subset of ions and to transfer the processed ions; and
a mass analyzer configured to receive the processed ions transferred from the collision cell and to mass analyze the received processed ions.

2. The ion analysis apparatus according to claim 1, wherein the trapping device is configurable to operate in an ion transmission mode.

3. The ion analysis apparatus according to claim 1, wherein the trapping device is configurable to operate in an ion accumulation mode.

4. The ion analysis apparatus according to claim 1, further comprising an ion activation-dissociation region adjacent to the trapping device and upstream of the first quadrupole mass filter.

5. The ion analysis apparatus according to claim 1, further comprising one or more RF ion guides between the trapping device and the first quadrupole mass filter, and/or between the first quadrupole mass filter and the segmented linear ion trap.

6. The ion analysis apparatus according to claim 1, wherein the trapping device comprises and/or is a trapped ion mobility spectrometer comprising: an ion storage region for storing or accumulating the beam of ions; and an ion mobility analyzer region for separating and transferring, optionally selectively transferring, separated ions therefrom.

7. The ion analysis apparatus according to claim 1, wherein the segmented linear quadrupole ion trap is configured to perform the first processing step that includes one or more of: (a) storing-trapping the received at least first subset of ions; (b) accumulating the received at least first subset of ions; (c) isolating the received at least first subset of ions; (d) activating-dissociating the received at least first subset of ions; and (e) transferring the received at least first subset of ions.

8. The ion analysis apparatus according to claim 1, wherein the collision cell is configured to perform the second processing step that includes one or more of: (i) collisionally activating the received at least second subset of ions; (ii) thermalizing the received at least second subset of ions; (iii) storing-trapping the received at least second subset of ions; (iv) accumulating the received at least second subset of ions; (v) modulating transfer of the received at least second subset of ions; and (vi) transferring the received at least second subset of ions.

9. The ion analysis apparatus according to claim 1, wherein the ion analysis apparatus is configured to perform a first scan including: the segmented linear quadrupole ion trap being configured to perform one or more first processing steps and/or the collision cell being configured to perform one or more second processing steps; the first and/or second quadrupole mass filters being configured to perform one or more mass selection steps; and optionally, the trapping device being configured to perform one or more ion mobility selection steps, wherein the trapping device comprises and/or is a trapped ion mobility spectrometer.

10. The ion analysis apparatus according to claim 9, wherein the ion analysis apparatus is configured to perform a second scan including: the segmented linear quadrupole ion trap being configured to perform one or more first processing steps and/or the collision cell being configured to perform one or more second processing steps; the first and/or second quadrupole mass filters being configured to perform one or more mass selection steps; and optionally, the trapping device being configured to perform one or more ion mobility selection steps; wherein one or more of the first processing steps, the second processing steps, the mass selection steps and/or the ion mobility selection steps of the first scan and of the second scan are mutually different.

11. The ion analysis apparatus according to claim 1, wherein the segmented linear quadrupole ion trap is configured with at least two trapping regions and to enable processing of ions in at least one of the two trapping regions.

12. The ion analysis apparatus of claim 11, wherein one of the at least two trapping regions is configured to receive electrons from an external electron source to activate ions trapped therein.

13. The ion analysis apparatus according to claim 1, further comprising a power supply configured to drive the segmented linear quadrupole ion trap using a pair of anti-phase rectangular waveforms.

14. The ion analysis apparatus according to claim 1, wherein the segmented linear quadrupole ion trap is configured to repeatedly perform processing steps on the ions in the segmented linear quadrupole ion trap and wherein the collision cell is configured to repeatedly perform processing steps on the ions in the collision cell, by: performing a processing step on the ions in the segmented linear quadrupole ion trap; storing-trapping and/or accumulating the processed ions in the collision cell; transferring the stored-trapped and/or accumulated ions upstream back to the segmented linear quadrupole ion trap; performing another processing step on the ions in the segmented linear quadrupole ion trap; and transferring these processed ions downstream back to the collision cell for another processing step.

15. The ion analysis apparatus according to claim 1, wherein the segmented linear quadrupole ion trap is configured to repeatedly perform processing steps on the ions in the segmented linear quadrupole ion trap and wherein the collision cell is configured to repeatedly perform processing steps on the ions in the collision cell, by: performing a processing step on the ions in the segmented linear quadrupole ion trap; storing-trapping and/or accumulating the processed ions in the collision cell; transferring the stored-trapped and/or accumulated ions upstream back to the segmented linear quadrupole ion trap; performing another processing step on the ions in the segmented linear quadrupole ion trap; and transferring these processed ions downstream, filtered by the second quadrupole mass filter, back to the collision cell for another second processing step.

16. The ion analysis apparatus according to claim 1, wherein the segmented linear quadrupole ion trap is configured to repeatedly perform processing steps on the ions in the segmented linear quadrupole ion trap and wherein the collision cell is configured to repeatedly perform processing steps on the ions in the collision cell, by: performing a processing step on the ions in the segmented linear quadrupole ion trap; storing-trapping and/or accumulating the processed ions, filtered by the second quadrupole mass filter, in the collision cell; transferring the stored-trapped and/or accumulated ions upstream back to the segmented linear quadrupole ion trap; performing another processing step on the ions in the segmented linear quadrupole ion trap; and transferring these processed ions downstream back to the collision cell for another processing step.

17. The ion analysis apparatus according to claim 1, wherein the segmented linear quadrupole ion trap is configured to repeatedly perform processing steps on the ions in the segmented linear quadrupole ion trap and wherein the collision cell is configured to repeatedly perform processing steps on the ions in the collision cell, by: performing a processing step on the ions in the segmented linear quadrupole ion trap; storing-trapping and/or accumulating the processed ions, filtered by the second quadrupole mass filter, in the collision cell; transferring the stored-trapped and/or accumulated ions upstream back to the segmented linear quadrupole ion trap; performing another processing step on the ions in the segmented linear quadrupole ion trap; and transferring these processed ions downstream, filtered by the second quadrupole mass filter, back to the collision cell for another processing step.

18. The ion analysis apparatus according to claim 1, wherein the segmented linear quadrupole ion trap is configured to repeatedly perform processing steps on the ions in the segmented linear quadrupole ion trap and wherein the collision cell is configured to repeatedly perform processing steps on the ions in the collision cell, by: performing a processing step on the ions in the segmented linear quadrupole ion trap; storing-trapping and/or accumulating the processed ions, filtered by the second quadrupole mass filter, in the collision cell; transferring the stored-trapped and/or accumulated ions upstream, filtered by the second quadrupole mass filter, back to the segmented linear quadrupole ion trap; performing another processing step on the ions in the segmented linear quadrupole ion trap; and transferring these processed ions downstream, filtered by the second quadrupole mass filter, back to the collision cell for another processing step.

19. The ion analysis apparatus according to claim 1, wherein the second quadrupole mass filter is configured to filter the processed ions transferred from the segmented linear quadrupole ion trap and wherein the collision cell is configured to store-trap and/or accumulate the filtered ions.

20. An ion analysis method, comprising:
generating a beam of ions;
receiving, by a trapping device, the beam of ions and axially transferring ions downstream;
mass filtering, by a first quadrupole mass filter, at least a first subset of the transferred ions;
performing, by a segmented linear quadrupole ion trap, a first processing step on the mass filtered at least first subset of ions;
mass filtering, by a second quadrupole mass filter, at least a second subset of the processed at least first subset of ions;
performing, by a collision cell, a second processing step on the mass filtered at least second subset of ions; and
mass analyzing, by a mass analyzer, the processed at least second subset of ions.

* * * * *